US012390021B2

(12) United States Patent
Chandrashekaraiah et al.

(10) Patent No.: US 12,390,021 B2
(45) Date of Patent: Aug. 19, 2025

(54) DISPLAY CASE DOOR

(71) Applicant: Anthony, Inc., Sylmar, CA (US)

(72) Inventors: Praveen Chandrashekaraiah, Bangalore (IN); Shriram Kumar, Bangalore (IN); David Briggs Baugh, Palmdale, CA (US); Adrian Rodriguez, Santa Clarita, CA (US); Dexter Maluto, Los Angeles, CA (US)

(73) Assignee: Anthony, Inc., Sylmar (CA)

(*) Notice: Subject to any disclaimer, the term of this patent is extended or adjusted under 35 U.S.C. 154(b) by 0 days.

(21) Appl. No.: 18/402,922

(22) Filed: Jan. 3, 2024

(65) Prior Publication Data

US 2024/0148165 A1 May 9, 2024

Related U.S. Application Data

(63) Continuation of application No. 17/698,960, filed on Mar. 18, 2022, now Pat. No. 11,896,147.

(30) Foreign Application Priority Data

Mar. 19, 2021 (IN) ............................ 202141011736
Dec. 30, 2021 (IN) ............................ 202141061813

(51) Int. Cl.
*A47F 3/04* (2006.01)
*E05F 1/10* (2006.01)

(52) U.S. Cl.
CPC ................ *A47F 3/043* (2013.01); *E05F 1/10* (2013.01); *E05Y 2900/31* (2013.01)

(58) Field of Classification Search
CPC ........ A47F 3/043; E05Y 2900/31; E05F 1/10; E05C 17/16; Y10T 292/289; Y10T 292/285; Y10T 74/2151
See application file for complete search history.

(56) References Cited

U.S. PATENT DOCUMENTS 902,730 A * 11/1908 Hill .......................... E05C 17/30 292/268
1,410,902 A 3/1922 Eustege
(Continued)

FOREIGN PATENT DOCUMENTS

KR 10-2006-0124953 12/2006

OTHER PUBLICATIONS

Hussman, "Eco Vision Door Upgrade: for RGD Merchandisers," Installation & Operation Manual, P/N 0559646 A, Dec. 2015, 22 pages.

(Continued)

*Primary Examiner* — Jason W San
*Assistant Examiner* — Matthew J Sullivan
(74) *Attorney, Agent, or Firm* — Fish & Richardson P.C.

(57) ABSTRACT

A display case including a frame with a first fastener, a door with a second fastener, and a bracket coupling the door to the frame is described. The bracket has a first end coupled a second end. The first end is pivotably coupled to the frame by the first fastener. The first end includes a first pair of spring arms having a first slot to couple to the first fastener and to allow the door to pivot between open and closed positions. The second end is slideably coupled to the door by the second fastener. The second end has detents on a second pair of spring arms and a second slot to allow the second fastener of the door to slide as the door is pivoted between open and closed positions. A first detent is positioned further from the first end of the bracket than a second detent.

22 Claims, 42 Drawing Sheets

(56) References Cited

U.S. PATENT DOCUMENTS

| | | | | | |
|---|---|---|---|---|---|
| 1,960,024 | A * | 5/1934 | Paris | E05C 17/16 | 292/268 |
| 3,103,692 | A * | 9/1963 | Ruck, Jr. | E05C 17/16 | 16/93 R |
| 3,125,390 | A * | 3/1964 | Woolley | E05D 3/04 | 16/374 |
| 3,369,833 | A * | 2/1968 | Schaldenbrand | E05C 17/16 | 292/268 |
| 3,980,331 | A * | 9/1976 | Kennedy | E05C 17/16 | 292/268 |
| 4,259,811 | A * | 4/1981 | Davis | E05C 17/16 | 292/268 |
| 5,244,273 | A * | 9/1993 | Kaspar | F25D 23/028 | 312/405 |
| 8,776,315 | B2 | 7/2014 | Wach et al. | | |
| 11,896,147 | B2 * | 2/2024 | Chandrashekaraiah | E05C 17/18 | |
| 2003/0132689 | A1 | 7/2003 | Shin | | |
| 2020/0370351 | A1 | 11/2020 | Lee | | |
| 2022/0338645 | A1 | 10/2022 | Chandrashekaraiah et al. | | |

OTHER PUBLICATIONS

Hussman, "EcoVision Door Upgrade: for RGD Merchandisers," Installation & Operation Manual, P/N 0559646 A, Dec. 2015, p. 11.

International Search Report and Written Opinion in International Appln. No. PCT/US2022/021045, dated Jun. 22, 2022, 12 pages.

* cited by examiner

DISPLAY CASE DOOR

CROSS-REFERENCE TO RELATED APPLICATIONS

This application is a continuation application of and claims priority under 35 U.S.C. § 120 to U.S. application Ser. No. 17/698,960, filed on Mar. 18, 2022, which claims the benefit of Indian Application No. 202141011736, filed Mar. 19, 2021 and Indian Application No. 202141061813, filed Dec. 30, 2021, the contents of which are hereby incorporated by reference.

TECHNICAL FIELD

This disclosure relates to thermally insulated doors for temperature-controlled enclosures.

BACKGROUND

Refrigerated enclosures are used in commercial, institutional, and residential applications for storing and/or displaying refrigerated or frozen objects. Refrigerated enclosures may be maintained at temperatures above freezing (e.g., a refrigerator) or at temperatures below freezing (e.g., a freezer). Refrigerated enclosures have one or more thermally insulated doors or windows for viewing and accessing refrigerated or frozen objects within a temperature-controlled space. Doors for refrigerated enclosures generally include thermally insulated glass panel assemblies.

SUMMARY

The present disclosure relates to a bracket for a display case door for a refrigerated enclosure. The bracket separates from a frame of the refrigerated enclosure to protect the display case door.

Implementations of the present disclosure include a display case including a frame coupled to the display case, a door mounted to the frame, and a bracket. The frame includes a first fastener. The door includes a second fastener coupled to a surface of the door. The bracket includes a first end pivotably coupled to the frame by the first fastener. The bracket includes a first end and a second end coupled to the first end. The first end includes first pair of spring arms, the first pair of spring arms includes a first slot therebetween configured to couple to the first fastener and to allow the door to pivot between open and closed positions. The second end is slideably coupled to the door by the second fastener. The second end includes a second pair of spring arms and a plurality of detents. The second pair of spring arms including a second slot therebetween configured to allow the second fastener of the door to slide as the door is pivoted between open and closed positions. A first detent of the plurality of detents is positioned further from the first end of the bracket than a second detent of the plurality of detents.

In some implementations, the plurality of detents extend into the second slot between the second pair of spring arms, thereby, reducing a width of the first slot to a distance that is narrower than a diameter of the second fastener.

In some implementations, the first detent extends a first distance into the second slot between the second pair of spring arms, the second detent extends a second distance into the second slot between the second pair of spring arms, and the second distance is greater than the first distance.

In some implementations, the second pair of spring arms are configured to flex as a force is applied to the door, the force sufficient to overcome the first holding force and permit the second fastener to slide past the first detent.

In some implementations, the display case further includes the second pair of spring arms are configured to flex when sufficient force is applied to the door to overcome the second holding force and permit the second fastener to slide past the second detent.

In some implementations, the second holding force is greater than the first holding force.

In some implementations, the first open angle is less than 90 degrees.

In some implementations, the first open angle is less than 80 degrees, and the second open angle is 80 degrees or greater.

In some implementations, the first detent includes a first pair of detents each extending from one of the second pair of spring arms into the second slot between the second pair of spring arms.

In some implementations, the second detent includes a second pair of detents each extending from one of the second pair of spring arms into the second slot between the second pair of spring arms.

In some implementations, the display case further includes a terminating end of at least one of the second pair of spring arms includes a third pair of detents each extending into the second slot between the second pair of spring arms, the third pair of detents defining an opening through which the second fastener passes to disconnect from the bracket.

In some implementations, the first pair of detents is configured to apply a first holding force to the second fastener, the first holding force resisting further movement of the door beyond a first open angle. The second pair of detents is configured to apply a second holding force to the second fastener, the second holding force resisting further movement of the door beyond a second open angle. The third pair of detents is configured to apply a third holding force to the second fastener, the third holding force resisting further movement of the door beyond a third open angle.

In some implementations, the first open angle is less than 80 degrees, the second open angle is 80 degrees or greater and less than degrees, and the third open angle is degrees or greater.

In some implementations, the second slot between the second pair of spring arms is approximately 0.320 inches, a first gap between the first pair of detents is approximately 0.174 inches, a second gap between the second pair of detents is approximately 0.100 inches, and the opening between the third pair of detents is approximately 0.140 inches.

In some implementations, a longitudinal axis of the opening is parallel with a longitudinal axis of the second slot.

In some implementations, a longitudinal axis of the opening is offset from a longitudinal axis of the second slot.

In some implementations, a first portion of the first slot is configured to be placed about the first fastener.

In some implementations, an inner diameter of the first portion of the first slot is greater than an outer diameter of the first fastener.

In some implementations, the first portion of the first slot is ovoid shaped.

In some implementations, a terminating end of at least one of the first pair of spring arms includes a fourth pair of detents each extending into the first slot between the first pair of spring arms, the fourth pair of detents defining an opening through which the first fastener passes to disconnect from the bracket.

In some implementations, the fourth pair of detents is configured to apply a fourth holding force to the first fastener, the fourth holding force resisting further movement of the door.

In some implementations, a longitudinal axis of the opening is parallel with a longitudinal axis of the first slot.

In some implementations, a longitudinal axis of the opening is substantially aligned with a longitudinal axis of the first slot.

In some implementations, a longitudinal axis of the opening is offset from a longitudinal axis of the first slot.

In some implementations, a second portion of the first slot is configured to hold the first fastener in the first slot when the force on the door is less than the fourth holding force.

In some implementations, the first fastener includes a backing plate configured to couple to the frame; a shaft extending from a surface of the backing plate; and a knob coupled to an end of the shaft opposite the backing plate.

In some implementations, the first fastener further includes a plurality of screws, the backing plate further includes a plurality of voids configured to allow the screws to pass through the backing plate and couple the backing plate to the frame.

In some implementations, an outer diameter of the knob is less than an inner dimension of the first portion of the first slot.

In some implementations, an outer diameter of the shaft is less than an inner dimension of a second portion of the first slot.

In some implementations, a terminating end of at least one of the first pair of spring arms includes an outer surface, the outer surface defined, in part, by a first outer portion defined by a first outer radius; and a second outer portion adjoined to the first outer portion, the second outer portion defined by a second outer radius less than the first outer radius, the second outer portion closer to the terminating end than the first outer portion.

In some implementations, the first fastener includes a shaft extending from a horizontal member of the frame; and a knob coupled to an end of the shaft opposite the horizontal member.

In some implementations, the first slot includes a first portion and a second portion. The first portion of the first slot is configured to allow the knob of the first fastener to pass through, and the second portion of the first slot includes a seat configured to hold the shaft of the first fastener so that the bracket is pivotally coupled on the shaft.

In some implementations, the display case further includes a fifth pair of detents between the first portion and the second portion of the first slot, the fifth pair of detents are configured to resist the shaft from engaging in the seat unless a sufficient force to overcome the fifth pair of detents is applied to the bracket.

In some implementations, the display case further includes a sixth pair of detents between the first portion and the second portion of the first slot, the sixth pair of detents are configured to hold the shaft in engagement in the seat.

In some implementations, the seat includes two or more concave portions configured to engage an outer surface of the shaft.

In some implementations, the bracket includes an offset between a first portion of the bracket and a second portion of the bracket. The first portion adjoins the first end of the bracket. The second portion of the bracket adjoins the second end of the bracket.

In some implementations, the display case further includes a door-side backing plate, a frame-side backing plate, and a pivot standoff. The door-side backing plate is coupled to the door. The frame-side backing plate is coupled to the frame. The second fastener includes a detent bolt. The detent bolt is coupled to the door-side backing plate. The pivot standoff is coupled between the first fastener and the frame-side backing plate.

Further implementations of the present disclosure includes a method of installing a bracket in a display case including a frame and a door, including positioning the bracket such that a knob of a fastener of the frame passes through a first portion of a slot in the bracket; moving the bracket relative to the fastener such that a shaft of the fastener moves along the slot; and engaging a shaft of the fastener in a seat in a second portion of the slot, such that when the shaft of the fastener is engaged in the seat, the bracket is pivotally coupled on the shaft of the fastener and the knob inhibits the bracket from separating from the fastener.

In some implementations, the method further includes coupling a first end of the bracket with the frame of the display case.

In some implementations, the first end of the bracket is coupled to the frame of the display case before positioning the bracket such that the knob of the fastener of the frame passes through the first portion of the slot.

In some implementations, the method further includes moving the bracket relative to the fastener includes applying a sufficient force to the bracket to overcome at least one detent between the first portion and the second portion of the slot.

In some implementations, the method further includes, before positioning the bracket such that the knob of the fastener of the frame passes through the first portion of the slot, coupling the fastener with a frame member of the frame of the display case.

Further implementations of the present disclosure include a display case including a frame, a door coupled to the frame, and a bracket. The frame includes a first fastener. The door includes a second fastener coupled to a surface of the door. The bracket is pivotably coupled to the frame at a first end of the bracket by the first fastener and the door at a second end of the bracket by the second fastener. The bracket includes a first pair of spring arms at the first end of the bracket and a second part of spring arms at the second end of the bracket. Each spring arm of the first pair of spring arms includes a first aperture configured to be placed about the first fastener, a plurality of concave regions, and a first opening coupled to the plurality of concave regions. The plurality of concave regions together form a second aperture sized to accept the first fastener. The second aperture is configured to receive and accept a portion of the first fastener from the first aperture. The first opening is coupled to the plurality of concave regions. The first fastener is permitted to pass through the first opening upon application of a first holding force sufficient to overcome the first pair of spring arms and, thereby, disconnect the bracket from the frame. The second pair of spring arms at the second end of the bracket includes a slot therebetween in which the second fastener of the door slides as the door is pivoted between open and closed positions, and a first detent on at least one of the spring arms of the second pair of spring arms.

In some implementations, the first detent is configured to apply a first holding force to the first fastener, the first holding force resisting further movement of the door beyond a first open angle.

In some implementations, the first detent extends into the slot between the second pair of spring arms, thereby, reducing a width of the slot to a distance that is narrower than a diameter of the second fastener.

In some implementations, an inner diameter of the first aperture of the first pair of spring arms is greater than an outer diameter of the second fastener.

In some implementations, a first portion of the first aperture is ovoid shaped.

In some implementations, a terminating end of at least one of the first pair of spring arms includes a second pair of detents each extending into the first opening between the first pair of spring arms, the second pair of detents defining the first opening through which the first fastener passes to disconnect from the bracket.

In some implementations, the second pair of detents is configured to apply a second holding force to the first fastener, the second holding force resisting further movement of the door.

In some implementations, a longitudinal axis of the first opening is parallel with a longitudinal axis of the first aperture.

In some implementations, a longitudinal axis of the first opening is substantially aligned with a longitudinal axis of the first aperture.

In some implementations, a longitudinal axis of the first opening is offset from a longitudinal axis of the first aperture.

In some implementations, a second portion of the first aperture is configured to hold the first fastener in the first aperture when a force on the door is less than a third holding force.

In some implementations, the first fastener includes a backing plate configured to couple to the frame; a shaft extending from a surface of the backing plate; and a knob coupled to an end of the shaft opposite the backing plate.

In some implementations, the first fastener further includes a plurality of screws, the backing plate further includes a plurality of voids configured to allow the screws to pass through the backing plate and couple the backing plate to the frame.

In some implementations, an outer diameter of the knob is less than an inner dimension of a first portion of the first aperture.

In some implementations, an outer diameter of the shaft is less than an inner dimension of a second portion of the first aperture.

In some implementations, a terminating end of at least one of the first pair of spring arms includes an outer surface, the outer surface defined, in part, by a first outer portion defined by a first outer radius; and a second outer portion adjoined to the first outer portion, the second outer portion defined by a second outer radius less than the first outer radius, the second outer portion closer to the terminating end than the first outer portion.

In some implementations, the first fastener includes a shaft extending from a horizontal member of the frame; and a knob coupled to an end of the shaft opposite the horizontal member.

In some implementations, the first pair of spring arms includes a first portion and a second portion, the first portion of the first pair of spring arms is configured to allow the knob of the first fastener to pass through, and the second portion of the first pair of spring arms includes a seat configured to hold the shaft of the first fastener so that the bracket is pivotally coupled on the shaft.

In some implementations, further including a third pair of detents between the first portion and the second portion of the slot of the first pair of spring arms, the third pair of detents are configured to resist the shaft from engaging in the seat unless a sufficient force to overcome the third pair of detents is applied to the bracket.

In some implementations, further including a fourth pair of detents between the first portion and the second portion of the first pair of spring arms, the fourth pair of detents are configured to hold the shaft in engagement in the seat.

In some implementations, the seat includes two or more concave portions configured to engage an outer surface of the shaft.

In some implementations, the first fastener includes a threaded fastener coupled to the horizontal member of the frame, the knob includes a head of the threaded fastener.

Further implementations of the present disclosure include a display case door bracket include a first pair of spring arms at a first end of the bracket and a second pair of spring arms at a second end of the bracket. Each spring arm of the first pair of spring arms includes a plurality of concave regions that together form a first aperture sized to accept a first fastener, and a second aperture coupled to the first aperture. The second aperture is configured to be placed about the first fastener. The second pair of spring arms includes a slot therebetween and a first detent on at least one of the spring arms of the second pair of spring arms. The slot is configured to allow a second fastener to slide.

In some implementations, the first pair of spring arms further includes a first opening, the first opening coupled to the plurality of concave regions, through which the first fastener is permitted to pass, upon application of a force sufficient to overcome the first pair of spring arms, and, thereby, disconnect the bracket from a door frame.

In some implementations, the second fastener slides in the slot of the second pair of spring arms a door coupled to the second fastener is pivoted between an open position and a closed position.

In some implementations, the first detent is configured to apply a first holding force to the second fastener, the first holding force resisting further movement of the door beyond a first open angle.

In some implementations, the first detent extends into the slot between the first pair of spring arms, thereby, reducing a width of the slot to a distance that is narrower than a diameter of the second fastener.

In some implementations, the first pair of spring arms are configured to apply a second holding force to the first fastener, and the first pair of spring arms are configured to flex as sufficient force is applied to the door to overcome the second holding force and permit the first fastener to slide past through the first opening, thereby, disconnecting the bracket from the door frame.

In some implementations, the second pair of spring arms are configured to flex when sufficient force is applied to the door to overcome the first holding force and permit the second fastener to slide past the first detent.

In some implementations, the second holding force is greater than the first holding force.

In some implementations, a first portion of the second aperture is configured to be placed about the first fastener.

In some implementations, an inner diameter of the first portion of the second aperture is greater than an outer diameter of the first fastener.

In some implementations, the first portion of the second aperture is ovoid shaped.

In some implementations, a terminating end of at least one of the first pair of spring arms includes a second pair of detents each extending into the first aperture between the first pair of spring arms. The second pair of detents defining an opening through which the first fastener passes to disconnect from the bracket.

In some implementations, the second pair of detents is configured to apply a third holding force to the first fastener, the third holding force resisting further movement of the door.

In some implementations, a longitudinal axis of the opening is parallel with a longitudinal axis of the second aperture.

In some implementations, a longitudinal axis of the opening is substantially aligned with a longitudinal axis of the second aperture.

In some implementations, a longitudinal axis of the opening is offset from a longitudinal axis of the second aperture.

In some implementations, the first aperture is configured to hold the first fastener in the first pair of spring arms when a force on the door is less than the third holding force.

In some implementations, a terminating end of at least one of the first pair of spring arms includes an outer surface, defined, in part, by a first outer portion defined by a first outer radius; and a second outer portion adjoined to the first outer portion. The second outer portion defined by a second outer radius less than the first outer radius, the second outer portion closer to the terminating end than the first outer portion.

In some implementations, the second aperture includes a first portion and a second portion. The first portion of the second aperture is configured to allow a knob of the first fastener to pass through. The second portion of the second aperture includes a seat configured to hold a shaft of the first fastener so that the bracket is pivotally coupled on the shaft.

In some implementations, that bracket further includes a third pair of detents between the first portion and the second portion of the slot. The third pair of detents are configured to resist the shaft from engaging in the seat unless a sufficient force to overcome the third pair of detents is applied to the bracket.

In some implementations, the bracket further includes a fourth pair of detents between the first portion and the second portion of the slot. The fourth pair of detents are configured to hold the shaft in engagement in the seat.

Further implementations of the present disclosure include a bracket including an aperture and a slot. The aperture includes a first portion and a second portion coupled to the first portion. The first portion configured to allow a door to pivot about a first fastener coupled to a door frame. The second portion is configured to be placed about the first fastener. The slot is configured to allow a second fastener coupled to the door to slide in the slot as the door is pivoted between an open position and a closed position.

Further implementations of the present disclosure include a display case including a frame, a door coupled to the frame, and a bracket. The frame includes a first fastener. The door includes a second fastener coupled to a surface of the door. The bracket is pivotably coupled to the frame at a first end of the bracket by the first fastener and the door at a second end of the bracket by the second fastener. The bracket includes a first pair of spring arms at the first end of the bracket and a second part of spring arms at the second end of the bracket. Each spring arm of the first pair of spring arms includes a first aperture configured to be placed about the first fastener, a plurality of concave regions, and a first opening coupled to the plurality of concave regions. The plurality of concave regions together form a second aperture sized to accept the first fastener. The second aperture is configured to receive and accept a portion of the first fastener from the first aperture. The first opening is coupled to the plurality of concave regions. The first fastener is permitted to pass through the first opening upon application of a first holding force sufficient to overcome the first pair of spring arms and, thereby, disconnect the bracket from the frame. The second pair of spring arms at the second end of the bracket includes a slot therebetween in which the second fastener of the door slides as the door is pivoted between open and closed positions, and a first detent on at least one of the spring arms of the second pair of spring arms. The first detent is configured to provide a mechanical tactile feedback to a user that the door is approaching an angle from the frame and to warn the user and reduce a force on the door.

In some implementations, the mechanical tactile feedback provided to the user is a first holding force. The first holding force resisting further movement of the door beyond a first open angle by the first detent contacting the first fastener.

In some implementations, the first detent extends into the slot between the second pair of spring arms, thereby, reducing a width of the slot to a distance that is narrower than a diameter of the second fastener.

In some implementations, a first portion of the first aperture is ovoid shaped.

In some implementations, a terminating end of at least one of the first pair of spring arms includes a second detent each extending into the first opening between the first pair of spring arms, the second detent defining the first opening through which the first fastener passes to disconnect from the bracket, the second detent configured to provide a second mechanical tactile feedback to the user that the door is approaching an second angle from the frame and to warn the user and reduce the force on the door.

In some implementations, the second mechanical tactile feedback provided to the user is a second holding force resisting further movement of the door beyond a second open angle by the second detent contacting the first fastener.

Further implementations of the present disclosure include a display case including a frame, a door coupled to the frame, and a bracket. The frame includes a first fastener. The door includes a second fastener coupled to a surface of the door. The bracket is pivotably coupled to the frame at a first end of the bracket by the first fastener and the door at a second end of the bracket by the second fastener. The second end includes a slot configured to allow the second fastener of the door to slide as the door is pivoted between open and closed positions. At least one of the first end and the second end includes a pair of spring arms includes one or more detents, and one or more openings between the spring arms distal to the one or more detents. At least one of the one or more detents is configured to provide a mechanical tactile feedback to a user to warn the user to reduce a force on the door. At least one of the first fastener or the second fastener is permitted to pass, upon application of a sufficient holding force, through the opening between the spring arms such that the bracket disconnects from the frame or the door.

Particular implementations of the subject matter described in this specification can be implemented so as to realize one or more of the following advantages. Implementations of the present disclosure may increase the life of a display case door. For example, when a user accidentally opens the display case door beyond a limit of a hold-open bracket, component(s) of the door, such as glass in the display case door can be damaged. In some cases, the glass can crack or even shatter. The glass cracking or shattering can be a safety hazard to the user. User safety can be improved. For example, torsional stress and flexing of the door frame in excess of design or material limits can be reduced. Additionally, implementations of the present disclosure can increase maintainability of a display case door. For example, implementations of the present disclosure may provide for easy re-attachment of the bracket to the display case door or the frame. Additionally, the bracket can be replaced or re-attached to the display case door or the frame without the need to remove an entire display case door. For example, re-attaching the bracket is simplified so a repair technician is no longer necessary to re-attach the bracket to the display case door or the frame.

Additionally, implementations of the present disclosure may reduce a risk of structural failure of a hold open bracket or the hardware associated with a hold open system. Implementations of the present disclosure may allow for vertical misalignment or differences in size between a display case door and the frame in which the display case door is mounted. Implementations of the present disclosure may provide a robust hold open system that can be used with heavier display doors without failure of the bracket or associated hardware or other structural elements of the display case. For example, hold open systems as described herein can prevent failure due to impact forces resulting from swinging loads The details of one or more embodiments of the present disclosure are set forth in the accompanying drawings and the description below. Other features, objects, and advantages of the invention will be apparent from the description and drawings, and from the claims. The features described below in separate embodiments can be combined in alternate embodiments.

DETAILED DESCRIPTION

FIGS. 1A-6 illustrate an exemplary display case 100. The display case 100 includes a frame 102. The display case 100 includes a display case door 104 rotatably coupled to the frame 102. The display case 100 includes a bracket 106 pivotably coupled to the frame 102 and the display case door 104.

Figure 1A:
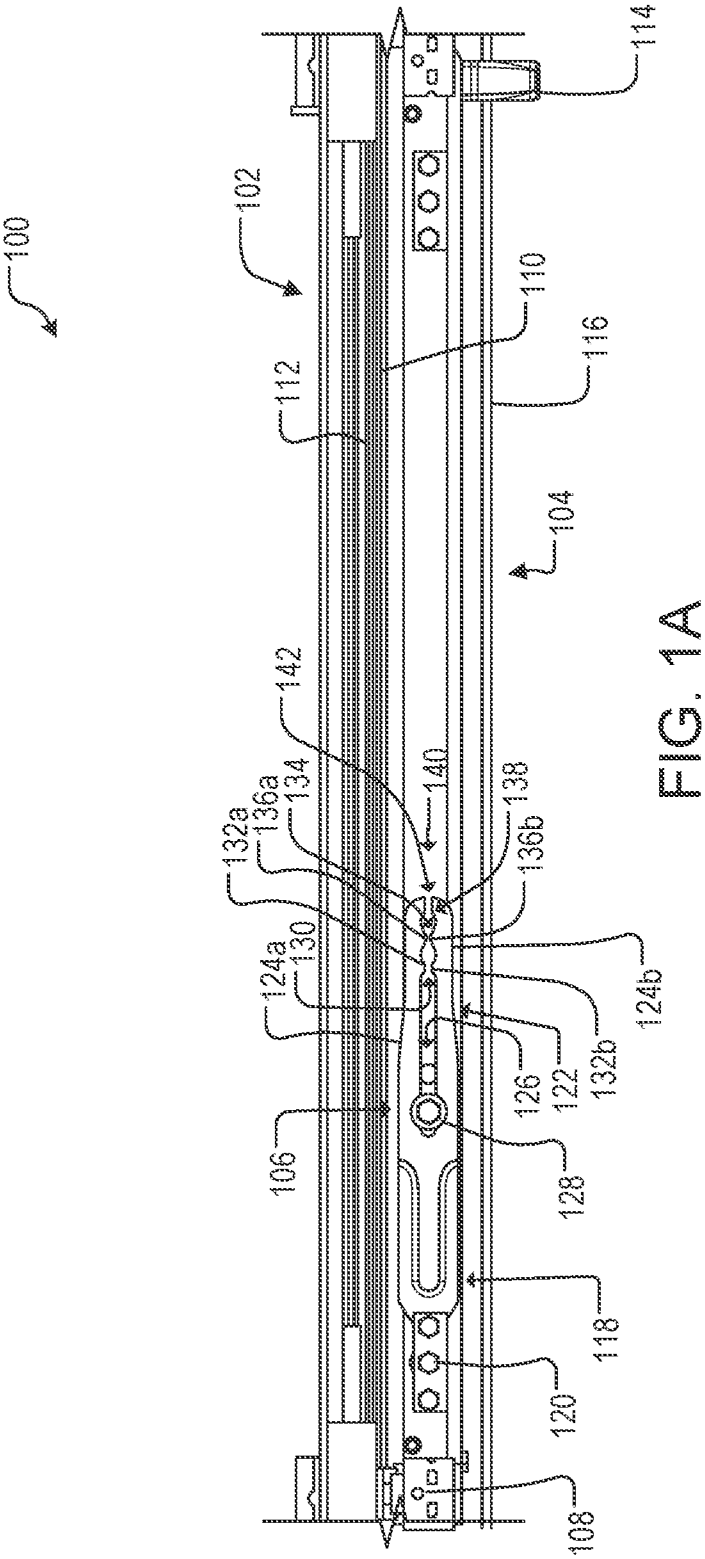
FIG. 1A is a top view of an example display case with a display case door shut.
Figure 1B:
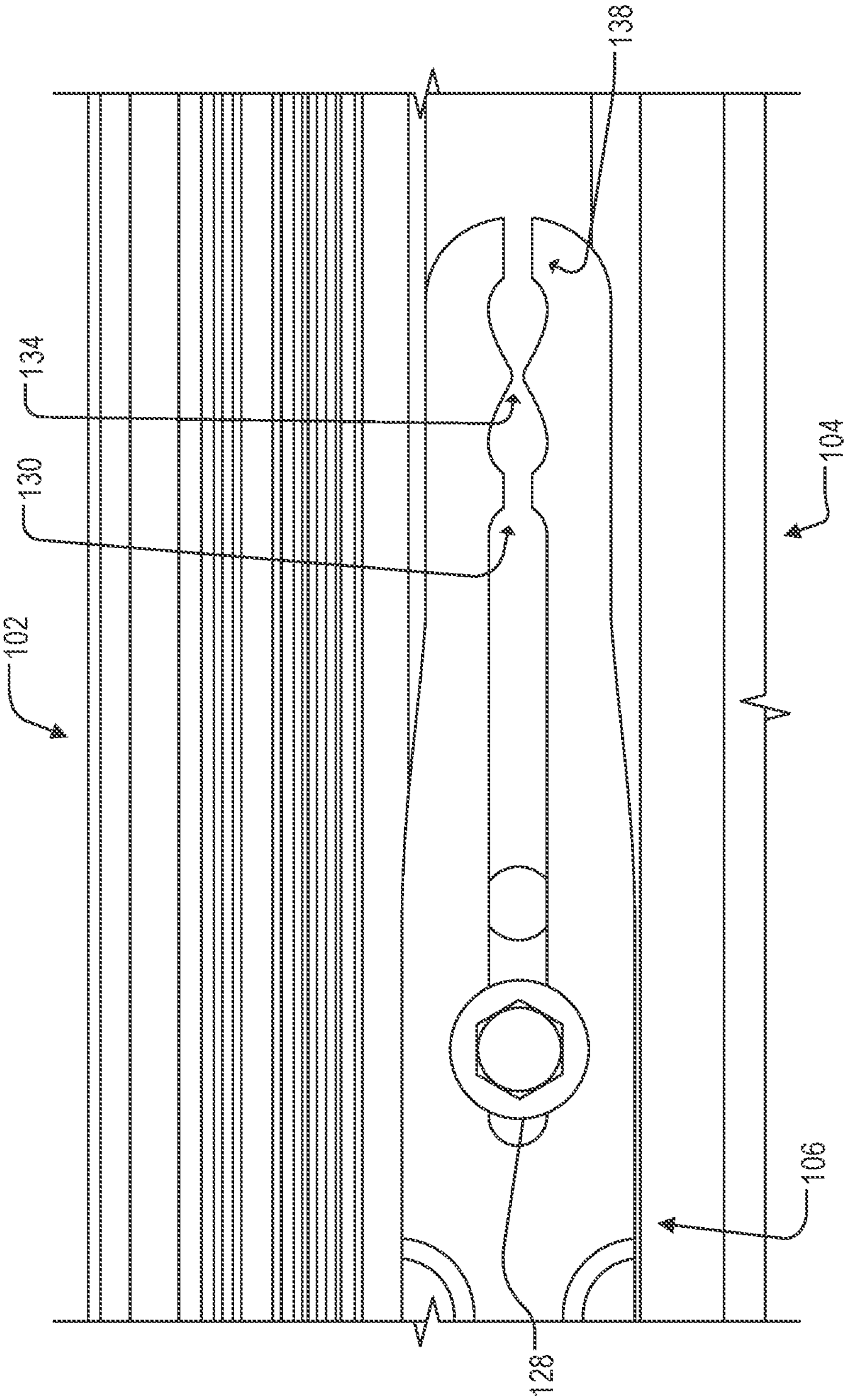
FIG. 1B is a top detailed view of the example display case with the display case door shut of FIG. 1A.

FIG. 1A is a top view of an example display case 100 with a display case door 104 shut. Referring to FIG. 1A, the display case 100 can be a refrigerated display case such as a refrigerator, a freezer, or other enclosure defining a temperature-controlled space.

The display case door 104 is rotatably coupled (secured) to the frame 102 by at least one hinge 108. The hinge 108 can be one or multiple hinges. A seal 110 can be mechanically coupled to the frame 102. Alternatively or in addition, a seal 112 can be mechanically coupled to the display case door 104. The seals 110 and 112 hold refrigerated air or heated air within the display case 100 when the display case door 104 is shut.

The display case door 104 includes a handle 114. A user (not shown) opens the display case door 104 by pulling on the handle 114. The display case door 104 separates from the frame 102 by rotating about the hinge 108. The bracket 106 limits the distance the display case door 104 moves from the frame 102 when opened by the user. The display case door 104 includes a transparent panel 116. The transparent panel 116 can be glass or a clear composite. In some cases, when the transparent panel 116 is glass the user can open the display case door 104 too far, too hard, or too quickly, creating a force on the display case door 104 which can cause the transparent panel 116 to crack or shatter.

The bracket 106 has mechanical features which can both provide mechanical tactile feedback to the user that the door is approaching to warn the user and reduce the force on the door. FIG. 7A is a top view of an example display case door bracket 106. FIG. 7B is a side view of an example display case door bracket 106. Referring to FIGS. 1A-7B, the bracket 106 is pivotably coupled to the frame 102 at a first end 118 of the bracket. As shown in FIGS. 7A-7B, the bracket 106 includes an aperture 702. The aperture 702 is sized to accept a pivot bolt 120 (shown in FIGS. 1A-6B. The pivot bolt 120 passes through the aperture 702 and mechanically couples the bracket 106 to the frame 102 to allow the bracket 106 to rotate when the display case door 104 is opened or closed by the user.

The bracket 106 includes a second end 122. The second end 122 includes a pair of spring arms **124*a* and 124*b*. The spring arms 124*a* and 124*b* define a slot 126. The display case 100 includes a bolt 128. The slot 126 is sized to accept the bolt 128 (shown in FIGS. 1A-6B. The bolt 128 passes through the slot 126 and mechanically couples the bracket 106 to the display case door 104 to allow the bolt 128 to slide through the slot 126 when the display case door 104** is opened or closed by the user.

The bracket 106 includes a first detent 130. The first detent 130 can include a first detent portion **132*a* mechanically coupled to the spring arm 124*a* and a second detent portion 132*b* mechanically coupled to the spring arm 124*b* which extend into the slot 126. The first detent portion 132*a* and the second detent portion 132*b* extending into the slot 126 reduces a width 704 (shown in FIG. 7A) of the slot 126 to a distance that is narrower than a diameter of the bolt 128**.

Figure 2A:
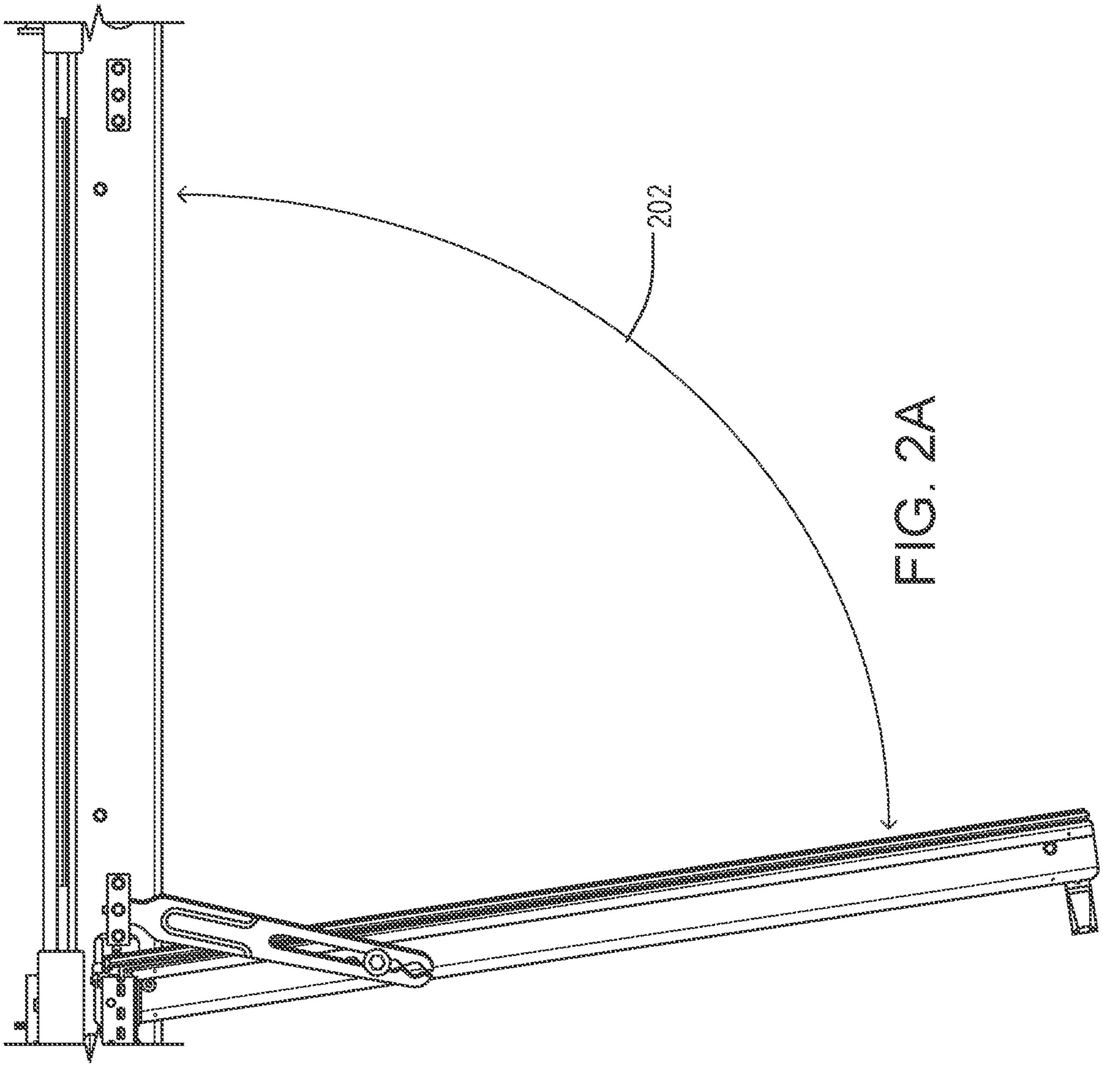
FIG. 2A is a top view of the example display case with the display case door open in a first position.
Figure 2B:
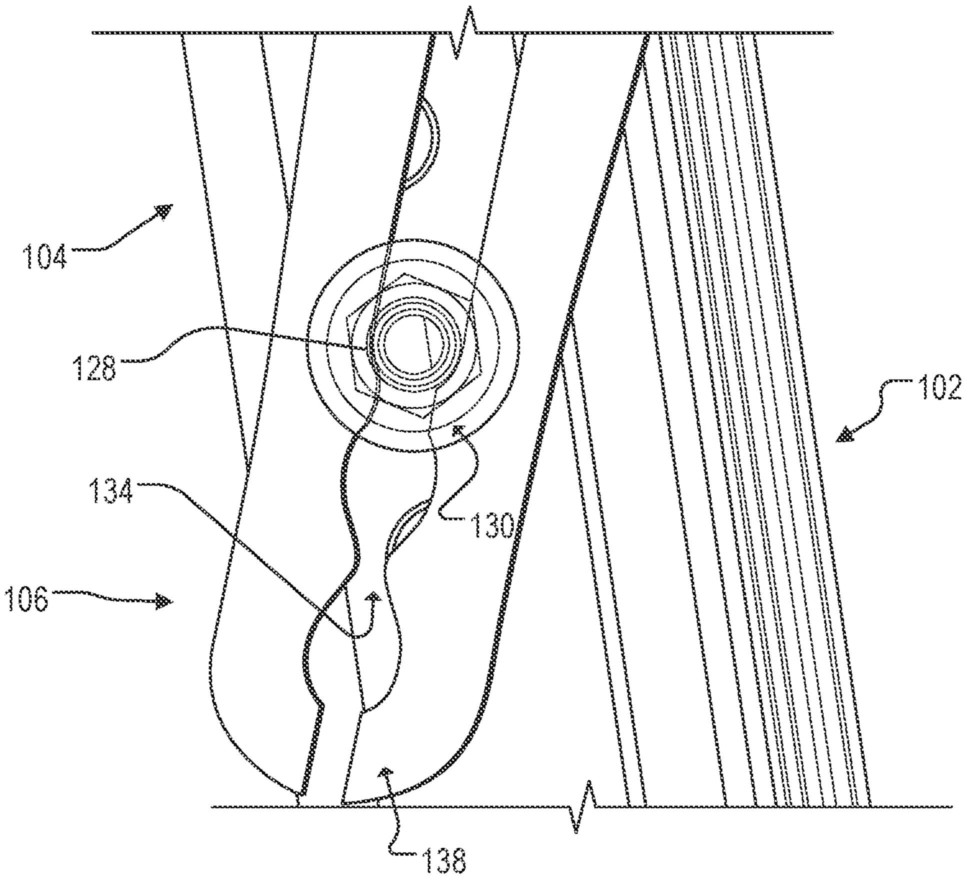
FIG. 2B is a top detailed view of the example display case with the display case door open in the first position of FIG. 2A.

FIG. 2A is a top view of an example display case 100 with the display case door 104 open in a first position. FIG. 2B is a top detailed view of an example display case 100 with the display case door 104 open in the first position of FIG. 2A. Referring to FIGS. 2A-2B, the first detent 130 (the first detent portion **132*a* and the second detent portion 132*b*) apply a first holding force to the bolt 128 when the user opens the display case door 104 to engage the bolt 128 to the first detent 130. The first holding force is applied to the bolt 128 by the first detent 130 resists further movement of the display case door 104 beyond a first open angle 202. The first open angle 202 is the angle of the door 104 relative to the frame 102 as the display case door 104 rotates about the hinge 108. In some cases, the first open angle 202** is less than 90 degrees.

The spring arms **124*a* and 124*b* apply a sufficient force to the display case door 104 to overcome the first holding force and permit the bolt 128 to slide past the first detent 130 to provide mechanical tactile feedback to the user that the user is moving the display case door 104 too far, too hard, or too quickly, creating a force on the display case door 104 which can cause the transparent panel 116 to crack or shatter. The spring arms 124*a* and 124*b* flex when the bolt 124 slides past the first detent 130**.

The bracket 106 includes a second detent 134. The second detent 134 is positioned further from the first end 118 of the bracket than the first detent 130. The second detent 134 can include a first detent portion **136*a* mechanically coupled to the spring arm 124*a* and a second detent portion 136*b* mechanically coupled to the spring arm 124*b* which extend into the slot 126. The first detent portion 136*a* and the second detent portion 136*b* extending into the slot 126 reduces a width 706 (shown in FIG. 7A) of the slot 126 to a distance that is narrower than a diameter of the bolt 128**.

Figure 3A:
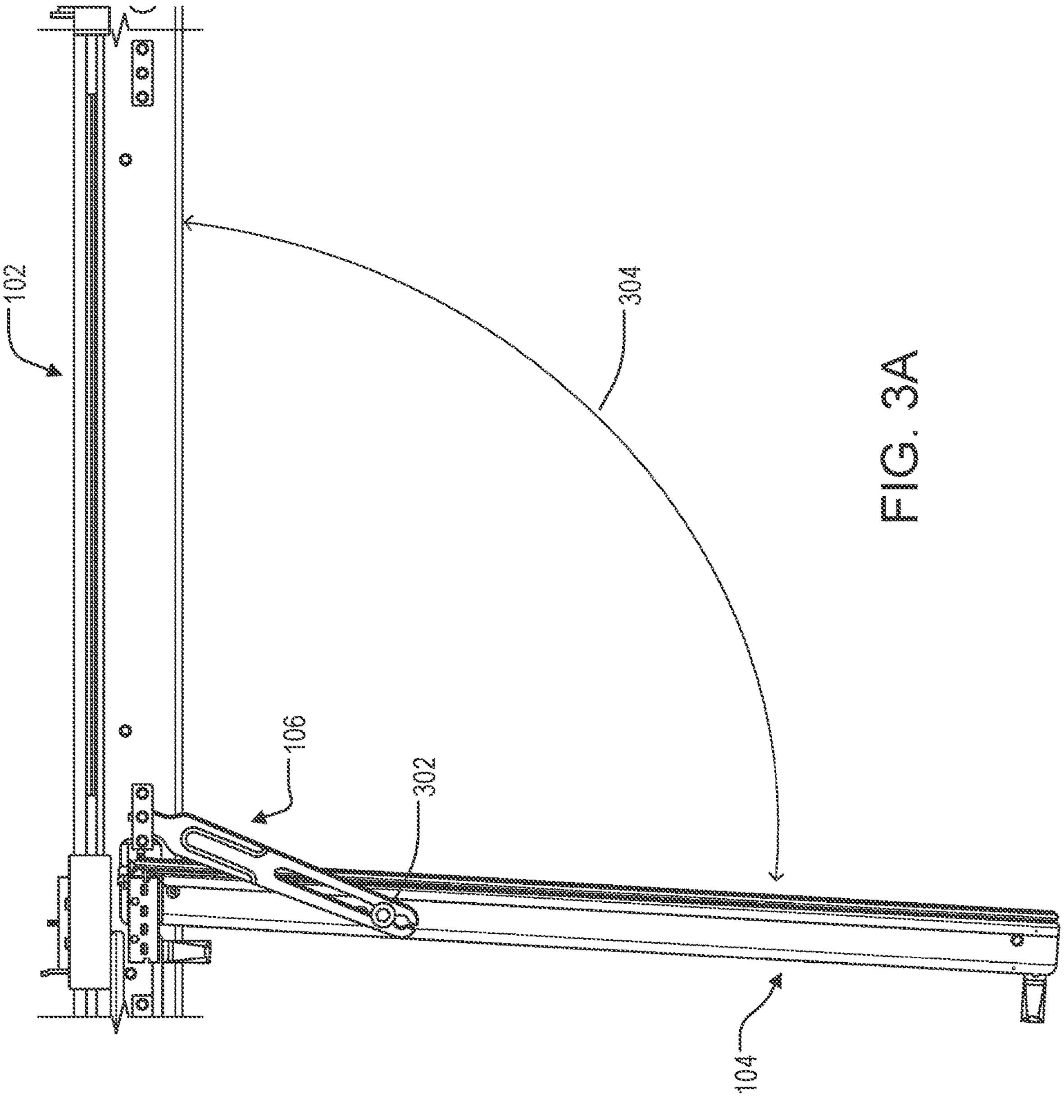
FIG. 3A is a top view of the example display case with the display case door open in a second position.
Figure 3B:
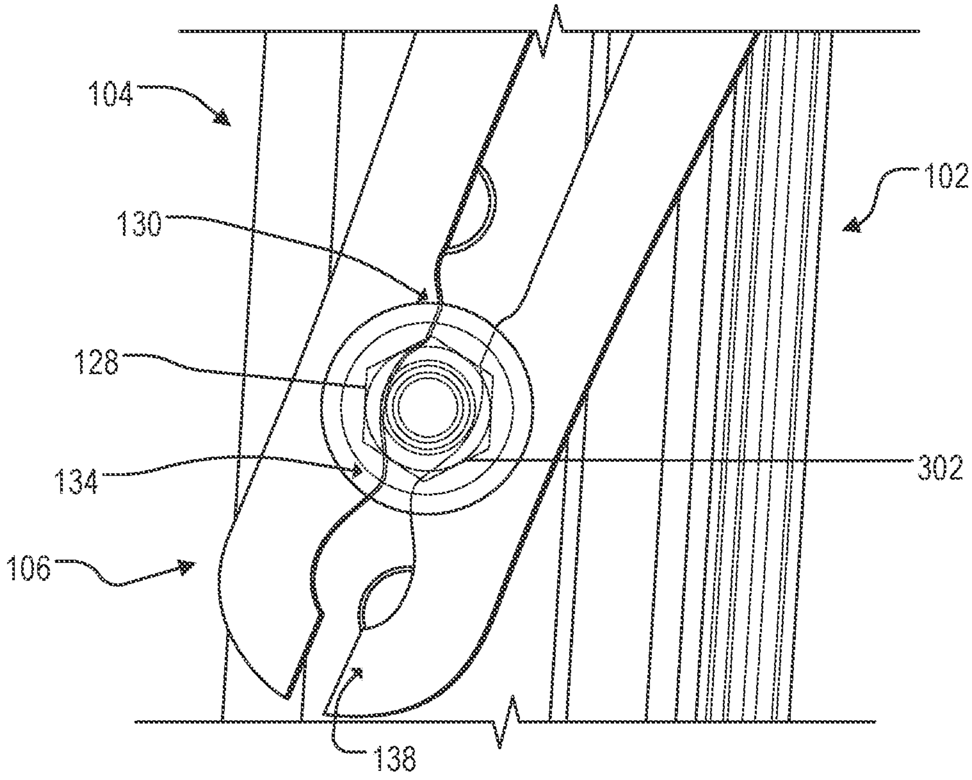
FIG. 3B is a top detailed view of the example display case with the display case door open in the second position of FIG. 3A.

FIG. 3A is a top view of the example display case 100 with the display case door open in a second position. FIG. 3B is a top detailed view of the example display case 100 with the display case door 104 open in the second position of FIG. 3A. Once the bolt 128 passes the first detent 130 it is in a void 302 in between the first detent and the second detent 134. No force is applied to the bolt 128 when the bolt 128 is the void 302. The door 104 is open at a third open angle 304 which is the angle of the door 104 relative to the frame 102 as the display case door 104 is in the void 302 while the door 104 rotates about the hinge 108.

Figure 4A:
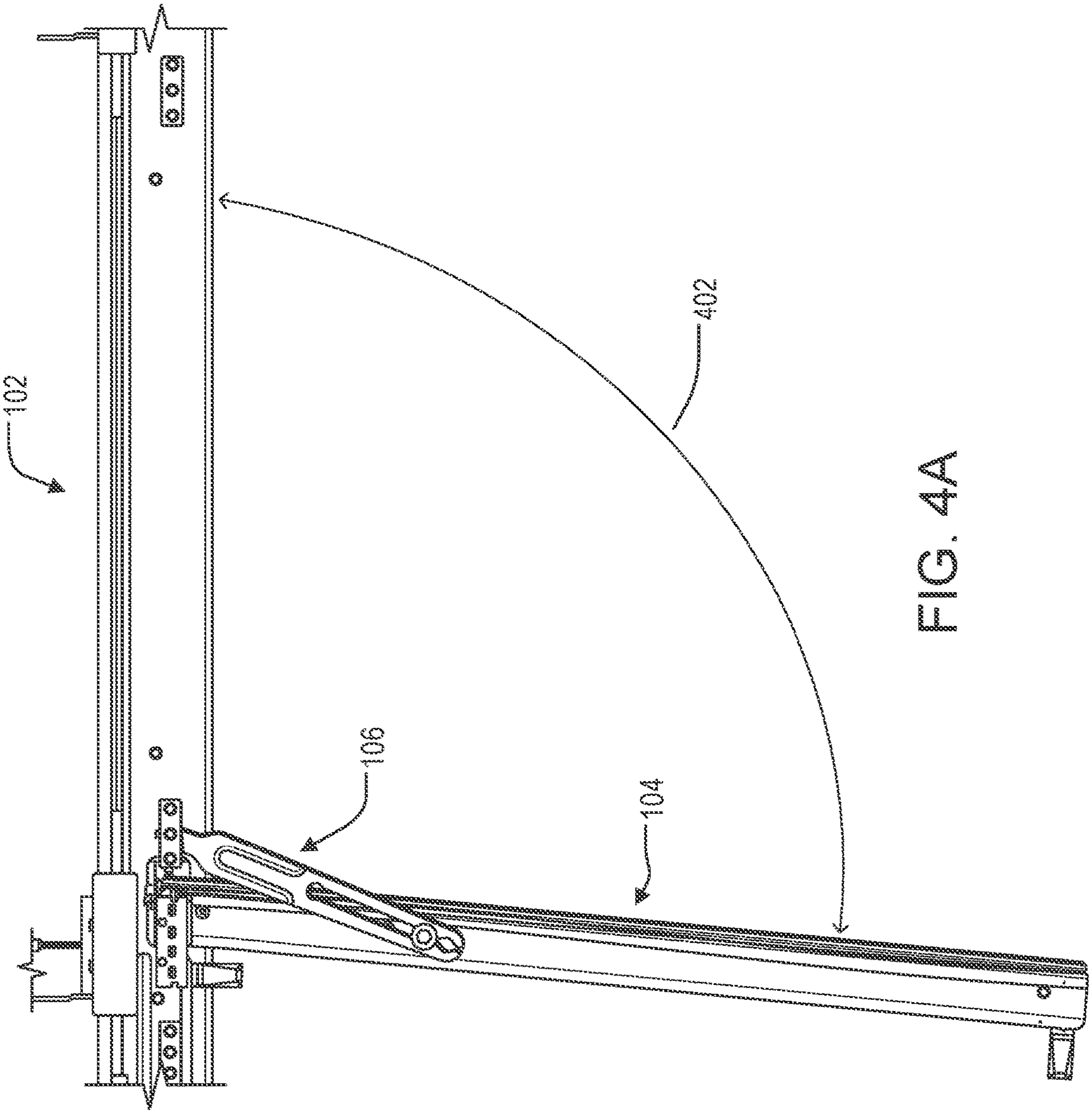
FIG. 4A is a top view of the example display case with the display case door open in a third position.
Figure 4B:
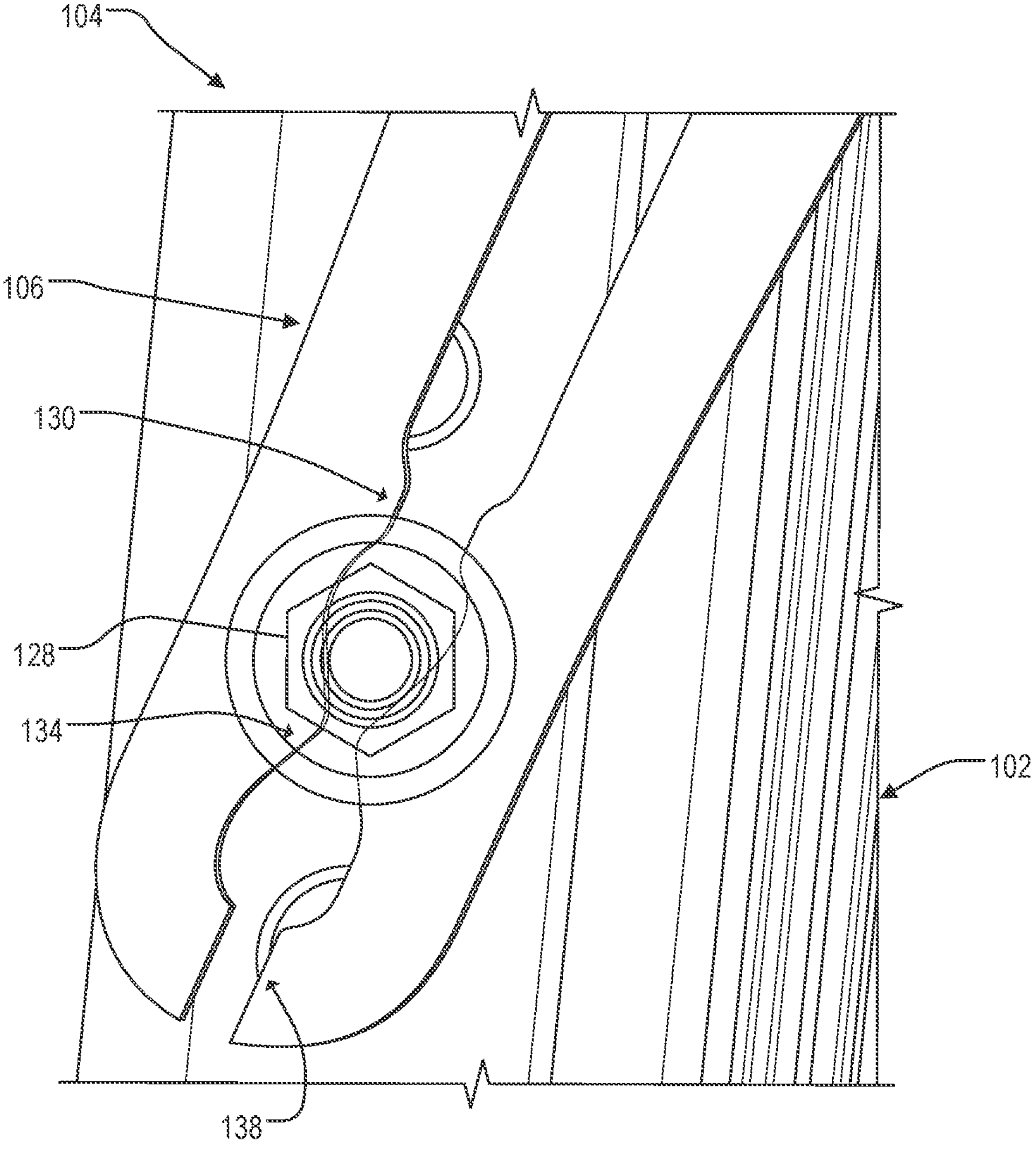
FIG. 4B is a top detailed view of the example display case with the display case door open in the third position of FIG. 4A.

FIG. 4A is a top view of the example display case 100 with the display case door 104 open in a third position. FIG. 4B is a top detailed view of the example display case 100 with the display case door 104 open in the third position of FIG. 4A. Referring to FIGS. 1A and 4A-4B, the second detent 134 (the first detent portion **136*a* and the second detent portion 136*b*) applies a second holding force to the bolt 128 when the user continues to open the display case door 104 past the first detent 130 (e.g., by the user a applying a force to the handle of the door) to engage the bolt 128 to the second detent 134. The second holding force applied to the bolt 128 by the second detent 134 resists further movement of the display case door 104 beyond a second open angle 304. The second open angle 304 is the angle of the door 104 relative to the frame 102 as the display case door 104 rotates about the hinge 108. In some cases, the first open angle 202 is less than 90 degrees. In some cases, the first open angle 202 is less than 80 degrees and the second hold open angle 402** is greater than 80 degrees.

The spring arms **124*a* and 124*b* apply a sufficient force to the display case door 104 by the user to overcome the second holding force and permit the bolt 128 to slide past the second detent 134 to provide mechanical tactile feedback to the user that the user is moving the display case door 104** too far, too hard, or too quickly, creating a force on the display case door 104 which can cause the transparent panel 116 to crack or shatter. The spring arms 124*a* and 124*b* flex when the bolt 124 slides past the second detent 134. In some cases, the second holding force is greater than the first holding force. For example, the first holding force can be less than seven pounds force, and the second holding force can be greater than seven pounds force but less than fifteen pounds force.

Figure 5A:
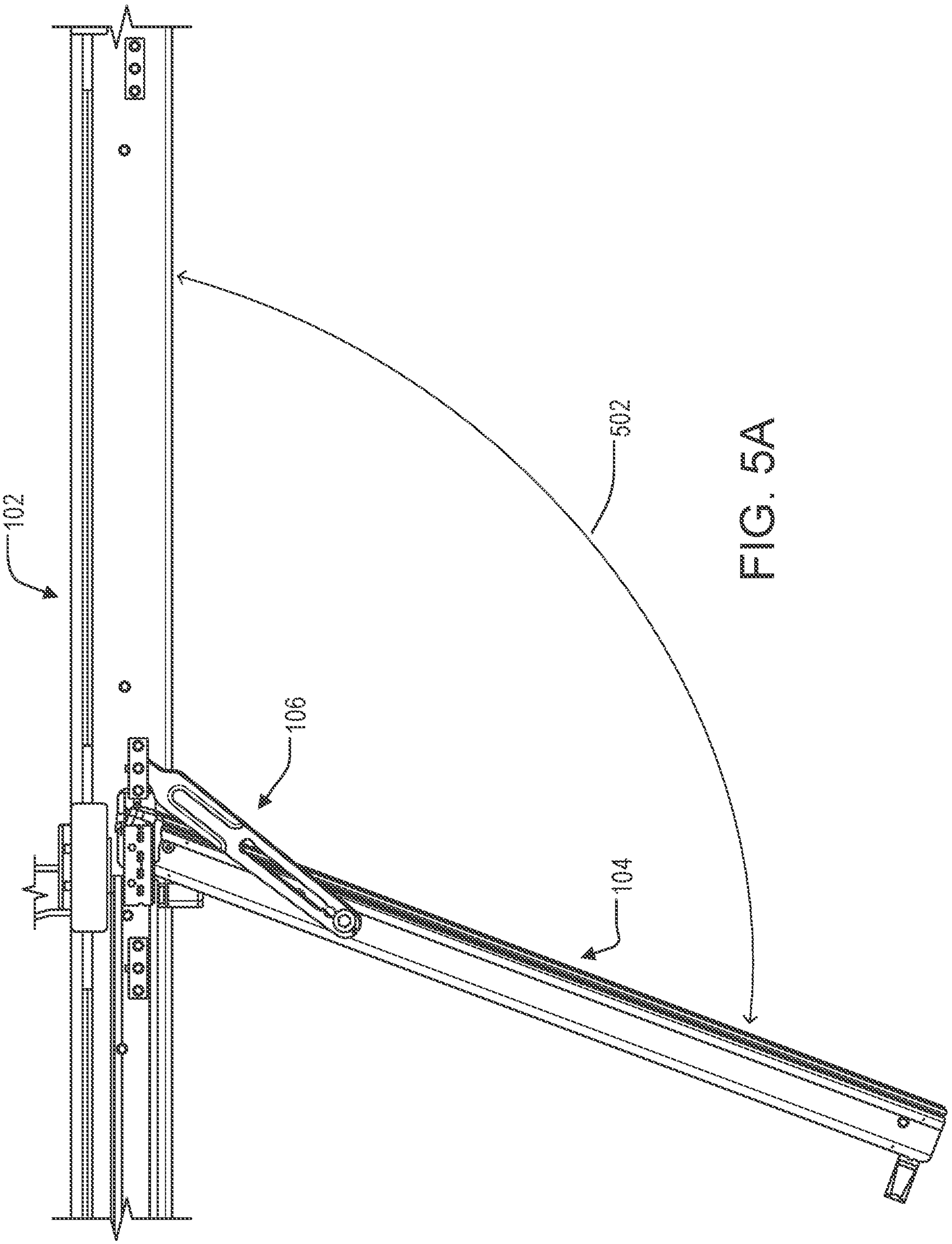
FIG. 5A is a top view of the example display case with the display case door open in a fourth position.
Figure 5B:
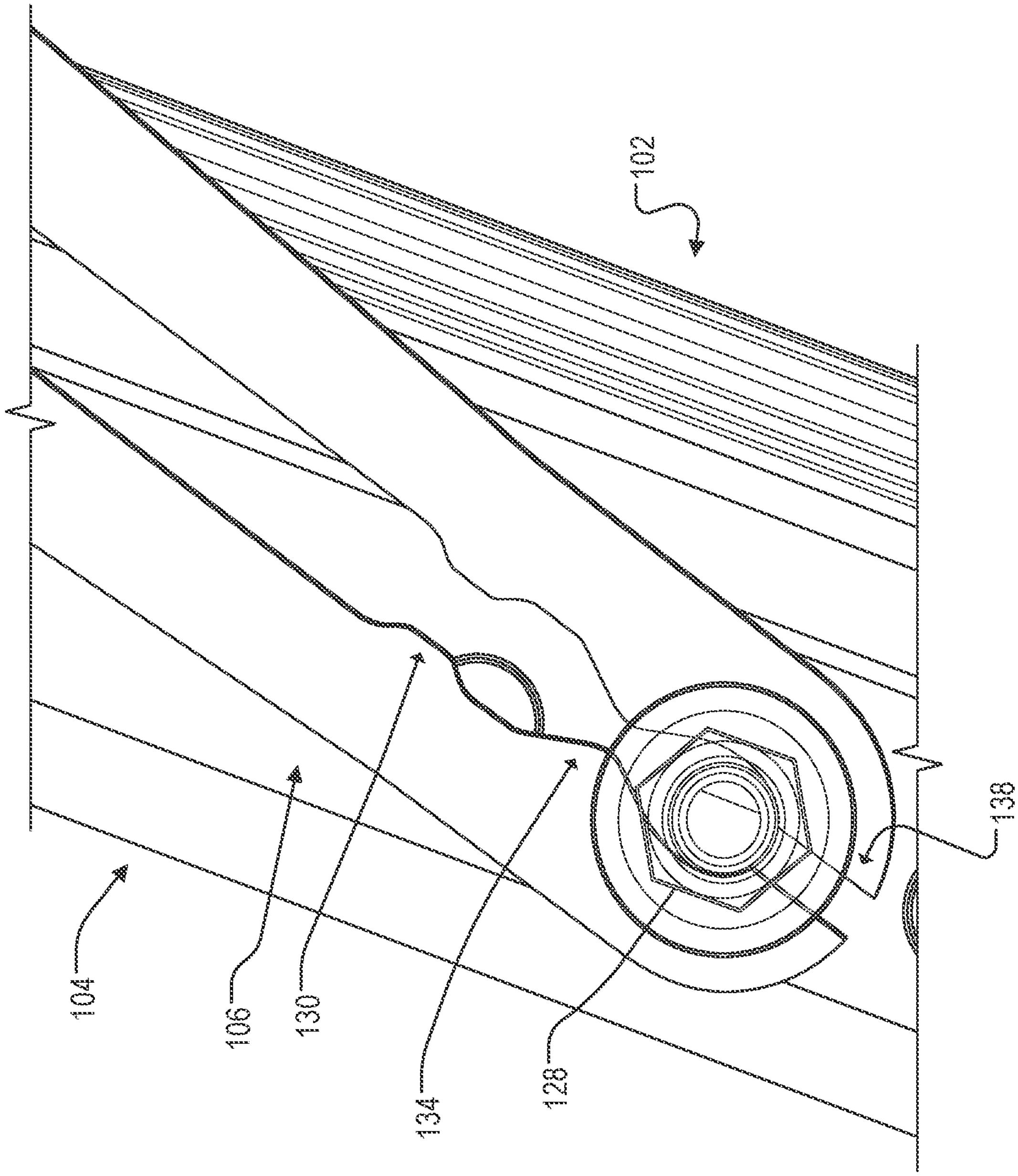
FIG. 5B is a top detailed view of the example display case with the display case door open in the fourth position of FIG. 5A.

FIG. 5A is a top view of the example display case 100 with the display case door 104 open in a fourth position. FIG. 5B is a top detailed view of the example display case 100 with the display case door 104 open in the fourth position of FIG. 5A. Referring to FIGS. 1A, 5A-5B, and 7A-7B, the bracket 106 includes a third detent 138. The third detent 138 is positioned at a terminating end 140 of the first spring arm 124*a* and the second spring arm 124*b*. The third detent 138 defines an opening 142 through which the bolt 128 passes to disconnect from the bracket 106 (as described later in reference to FIG. 6).

Referring to FIG. 7A, the third detent 138 can include a first detent portion 708*a* and the second detent portion 708*b*. The third detent 138 (the first detent portion 136*a* and the second detent portion 136*b*) apply a third holding force to the bolt 128 when the user continues to open the display case door 104 past the first detent 130 and the second detent 134 to engage the bolt 128 to the third detent 138. The third holding force applied to the bolt 128 by the third detent 138 resists further movement of the display case door 104 beyond a fourth open angle 502. The fourth open angle 502 is the angle of the door 104 relative to the frame 102 as the display case door 104 rotates about the hinge 108. In some cases, the fourth open angle 502 is greater than 90 degrees.

The spring arms 124*a* and 124*b* apply a sufficient force to the display case door 104 by the user to overcome the third holding force and permit the bolt 128 to slide past the third detent 138 to provide mechanical tactile feedback to the user that the user is moving the display case door 104 too far, too hard, or too quickly (e.g., through a force applied by the user to the handle of the door), creating a force on the display case door 104 which can cause the transparent panel 116 to crack or shatter. The spring arms 124*a* and 124*b* flex when the bolt 124 slides past the third detent 138. In some cases, the third holding force is greater than the second holding force and the first holding force. For example, the first holding force can be less than seven pounds force, the second holding force can be greater than seven pounds force but less than fifteen pounds force, and the third holding force can be greater than fifteen pounds force.

Figure 6:
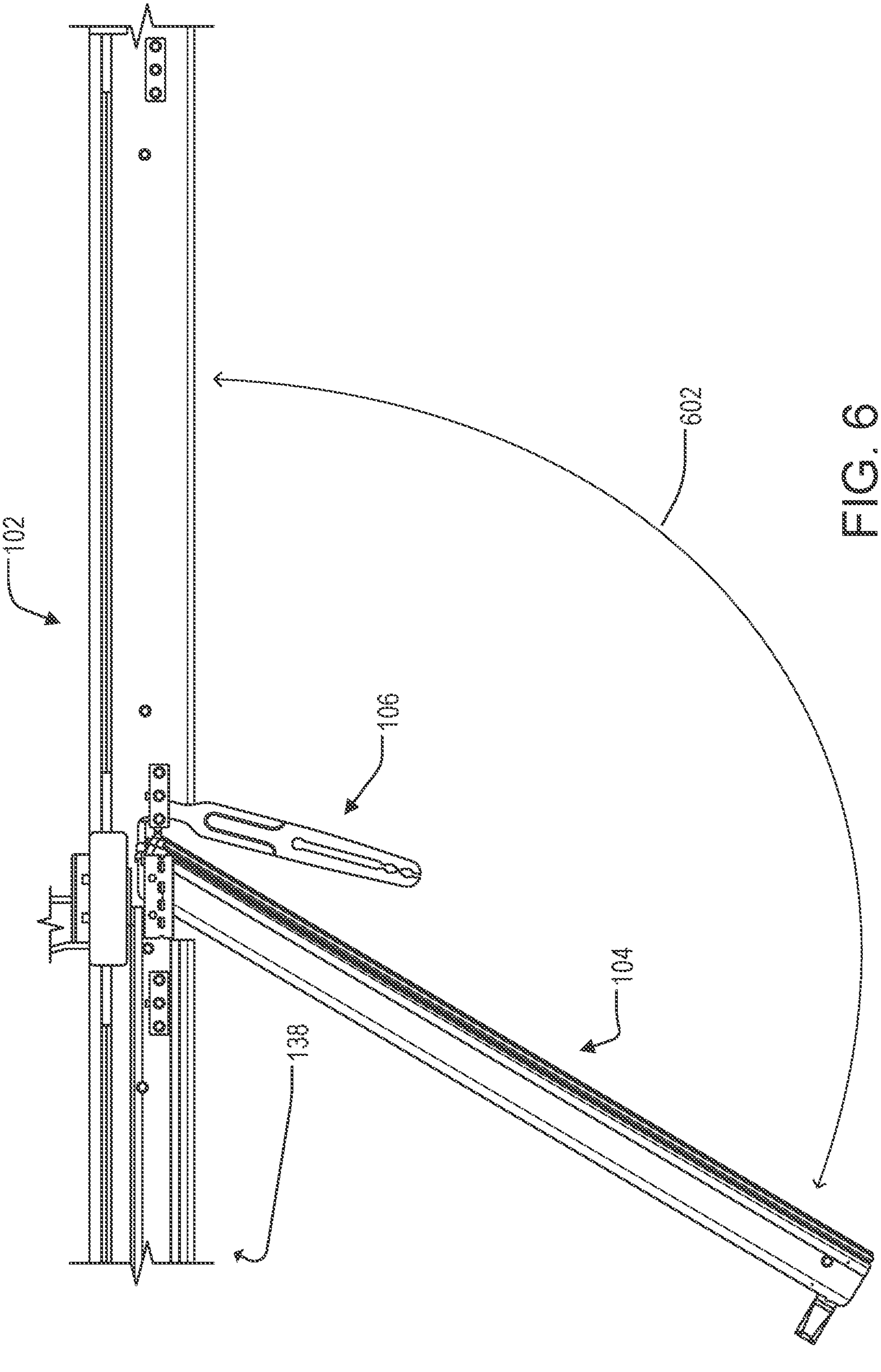
FIG. 6 is a top view of the example display case with the display case door open in a fifth position.
Figure 7A:
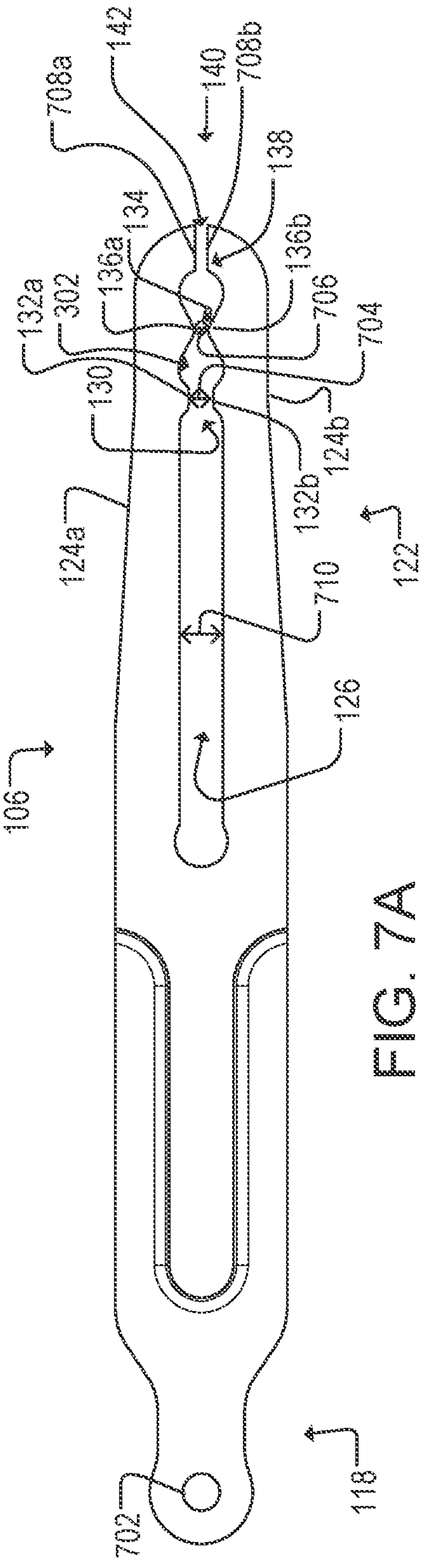
FIG. 7A is a top view of an example display case door bracket.
Figure 7B:
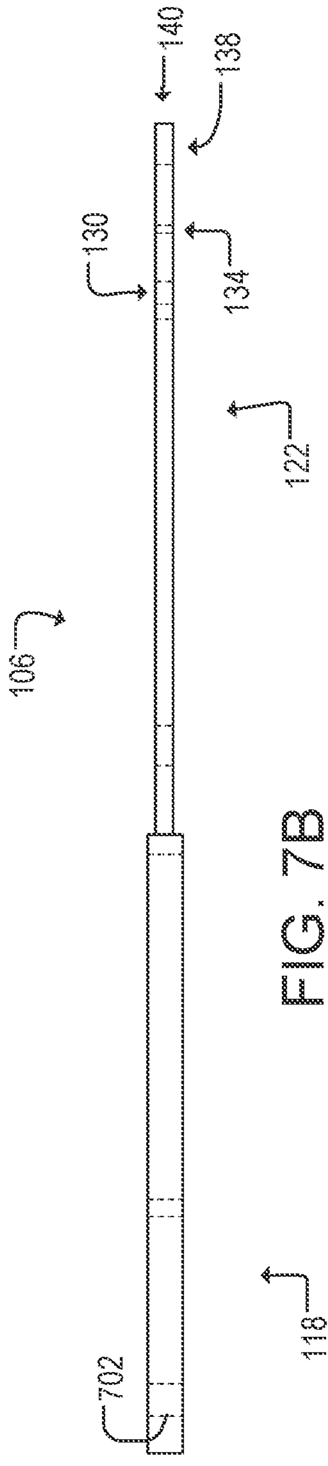
FIG. 7B is a side view of the example display case door bracket of FIG. 7A.

FIG. 6 is a top view of the example display case 100 with the display case door 104 open in a fifth position. Referring to FIGS. 6-7B, when the user opens the door 104 past the third detent 138, the bolt 128 passes through the opening 142 to disconnect the bracket 106 from the door 104.

Referring to FIG. 7, in some implementations, the slot 126 width 710 (the distance between the spring arms 124*a* and 124*b*) is approximately 0.320 inches. In some implementations, the width 704 (a first gap between the first detent portion 132*a* and second portion of the first detent 132*b*) is approximately 0.174 inches. In some implementations, the width 706 (a second gap between the second detent first portion and the second detent second portion) is approximately 0.100 inches. In some implementations, the opening 142 between the first detent portion 708*a* of the third detent 138 and the second detent portion 708*b* of the third detent 138 is approximately 0.140 inches.

Figure 8:
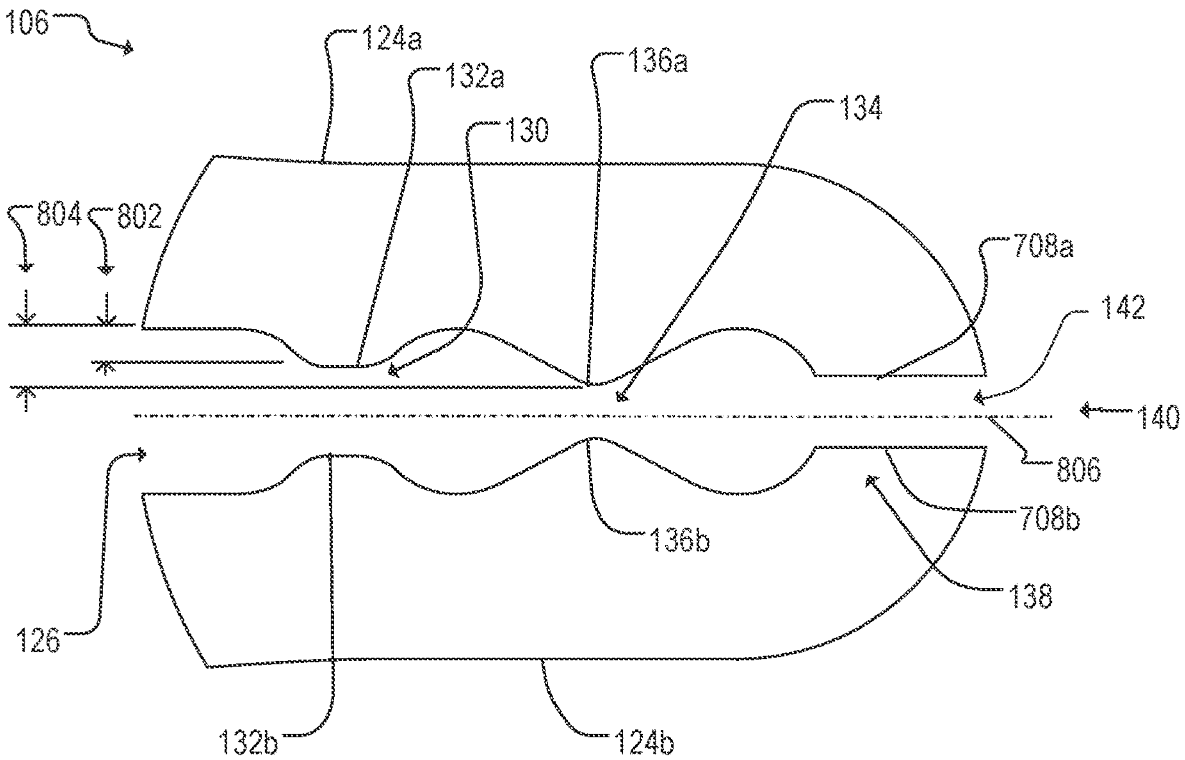
FIG. 8 is a top view of a portion of the display case door bracket of FIG. 7A.

FIG. 8 is a top view of a portion of the display case door bracket 106. In some cases, as shown in FIG. 8, the first detent 130 extends a first distance 802 into the slot 126 between the spring arms 124*a* and 124*b*. The second detent 134 extends a second distance 804 into the slot 126 between the spring arms 124*a* and 124*b*. The second distance 804 is greater than the first distance 802. The opening 142 and the slot 126 share a longitudinal axis 806.

Figure 9:
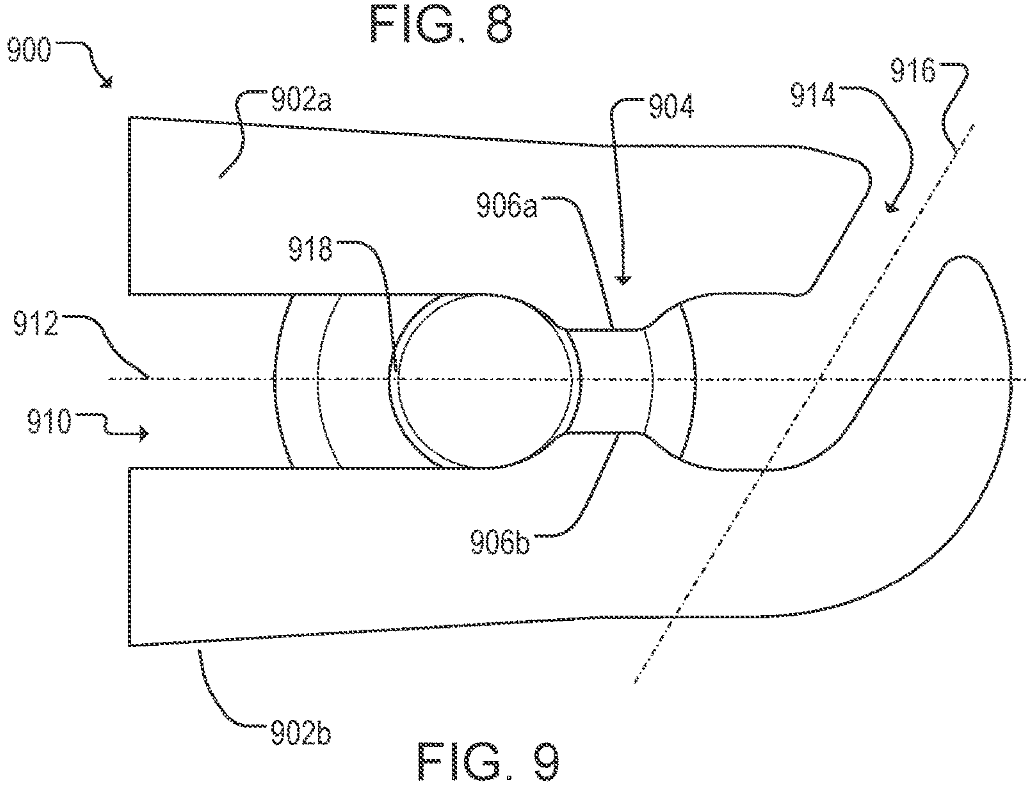
FIG. 9 is a top view of a portion of another example display case door bracket.

FIG. 9 is a top view of a portion of a second example display case door bracket 900. The bracket 900 includes a first spring arm 902*a* and a second spring arm 902*b*, substantially similar to the spring arms described previously. The bracket 900 includes a first detent 904 substantially similar to the first detent described earlier, including a first detent portion 906*a* and a second detent portion 906*b*.

The bracket 900 includes a slot 910. The slot 910 is defined by the first spring arm 902*a* and the second spring arm 902*b*. The slot 910 is substantially similar to the slot described previously. The slot 910 has a longitudinal axis 912.

The bracket 900 includes an opening 914. The opening 914 is substantially similar to the opening described earlier. The opening 914 has a longitudinal axis 916. The longitudinal axis 916 of the opening 914 is offset from the longitudinal axis 912 of the slot 910.

FIG. 9 shows a bolt 918, substantially similar to the bolt described earlier. The bolt 918 is engaged to the first detent 904, within the slot 910.

FIGS. 10A-17 illustrate another exemplary display case 1000. The display case 1000 includes a frame 1002. The display case 1000 includes a display case door 1004 rotatably coupled to the frame 1002. The display case 1000, the frame 1002, and the display case door 1004, are substantially similar to the display case, the frame, and the display case door previously described.

The display case 1000 includes a bracket 1006 pivotably coupled to the frame 1002 and the display case door 1004. The bracket 1006 is generally similar to the bracket described earlier.

Figure 10A:
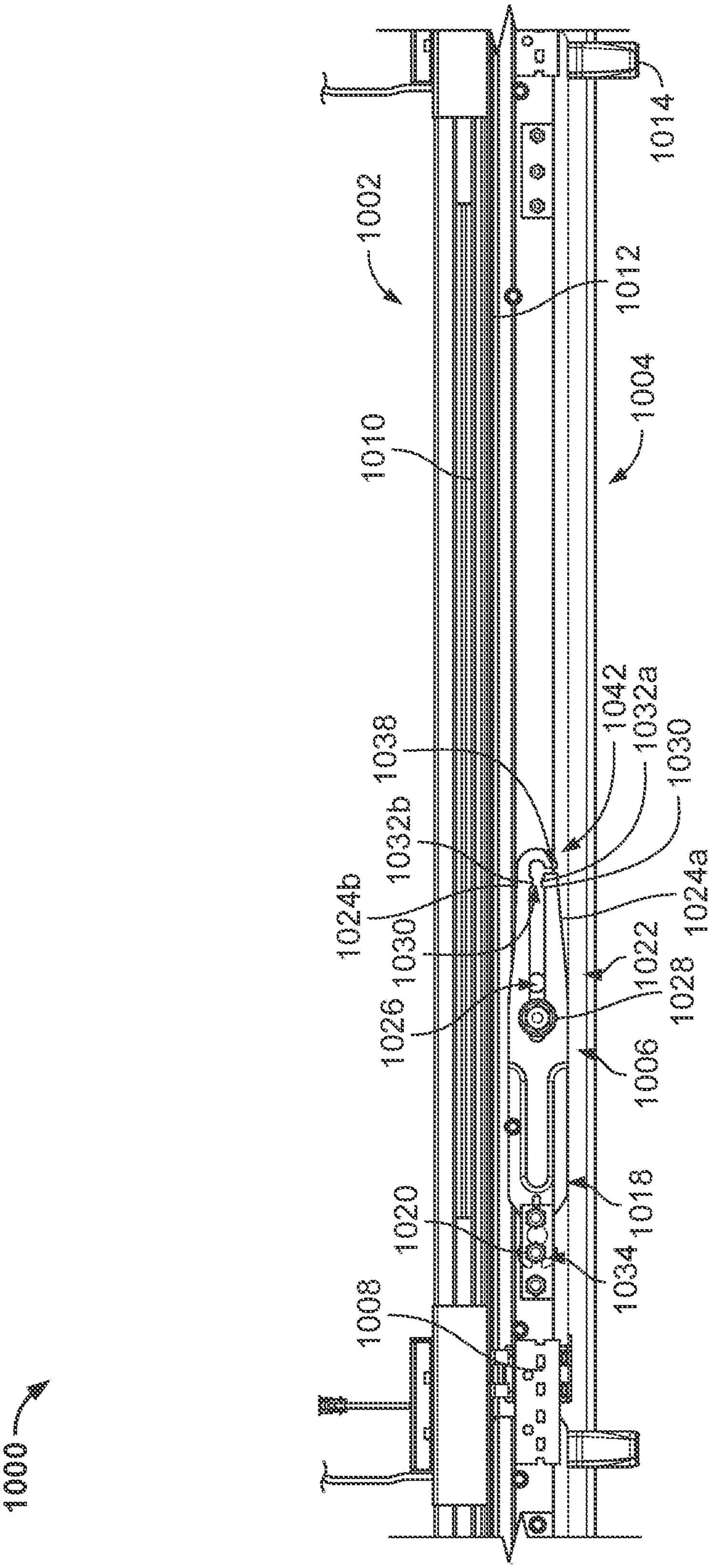
FIG. 10A is a top view of another example display case with a display case door shut.
Figure 10B:
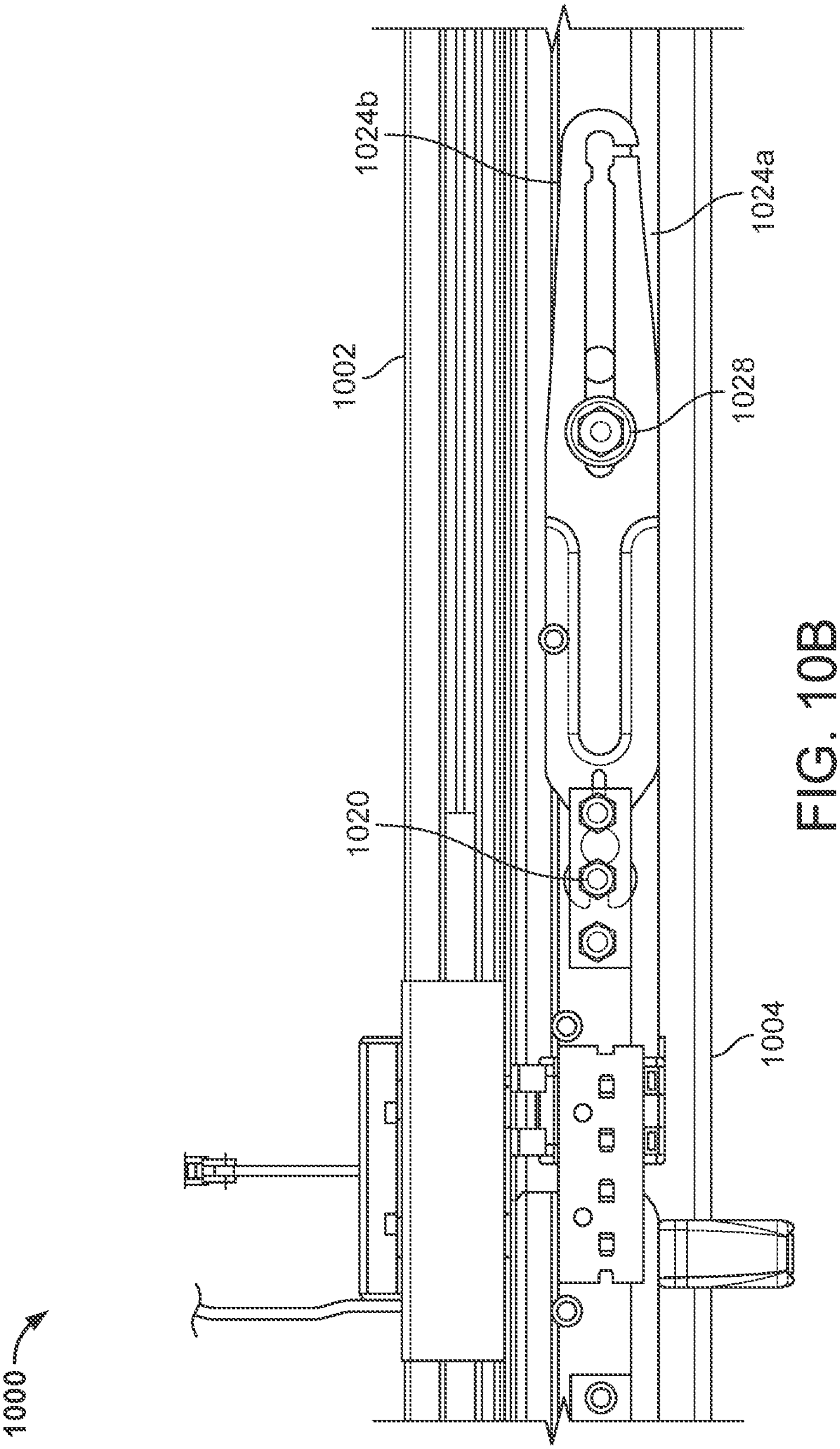
FIG. 10B is a top detailed view of the example display case with the display case door shut of FIG. 10A.

FIG. 10A is a top view of another example display case 1000 with a display case door 1004 shut. FIG. 10B is a top detailed view of the example display case 1000 with the display case door 1004 shut of FIG. 10A.

The display case door 1004 is rotatably coupled (secured) to the frame 1002 by at least one hinge 1008. The hinge 1008 can be one or multiple hinges. A seal 1010 can be mechanically coupled to the frame 1002. Alternatively or in addition, a seal 1012 can be mechanically coupled to the display case door 1004. The seals 1010 and 1012 hold refrigerated air or heated air within the display case 1000 when the display case door 1004 is shut.

The display case door 1004 includes a handle 1014. The user opens the display case door 1004 by pulling on the handle 114. The display case door 1004 separates from the frame 1002 by rotating about the hinge 1008. The bracket 1006 limits the distance the display case door 1004 moves from the frame 1002 when opened by the user. The display case door 1004 includes a transparent panel 1016. The transparent panel 1016 can be glass or a clear composite. In some cases, when the transparent panel 1016 is glass the user can open the display case door 1004 too far, too hard, or too quickly, creating a force on the display case door 1004 which can cause the transparent panel 1016 to crack or shatter.

Figure 15B:
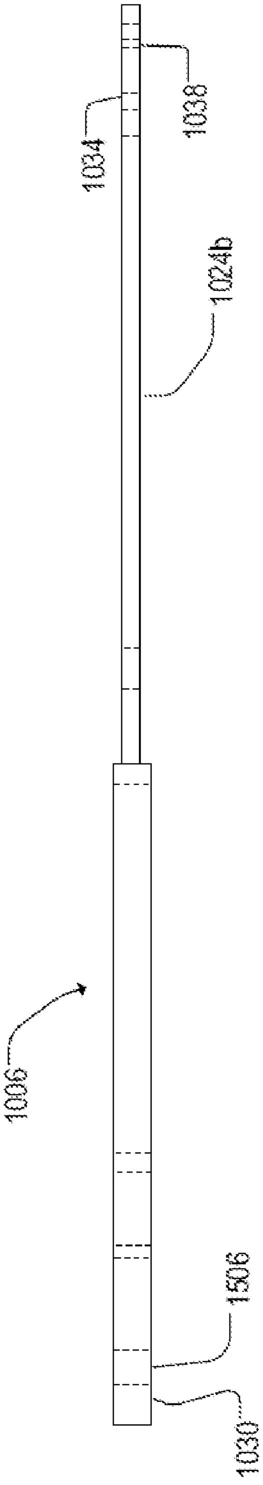
FIG. 15B is a side view of the example display case door bracket of FIG. 15B.
Figure 15A:
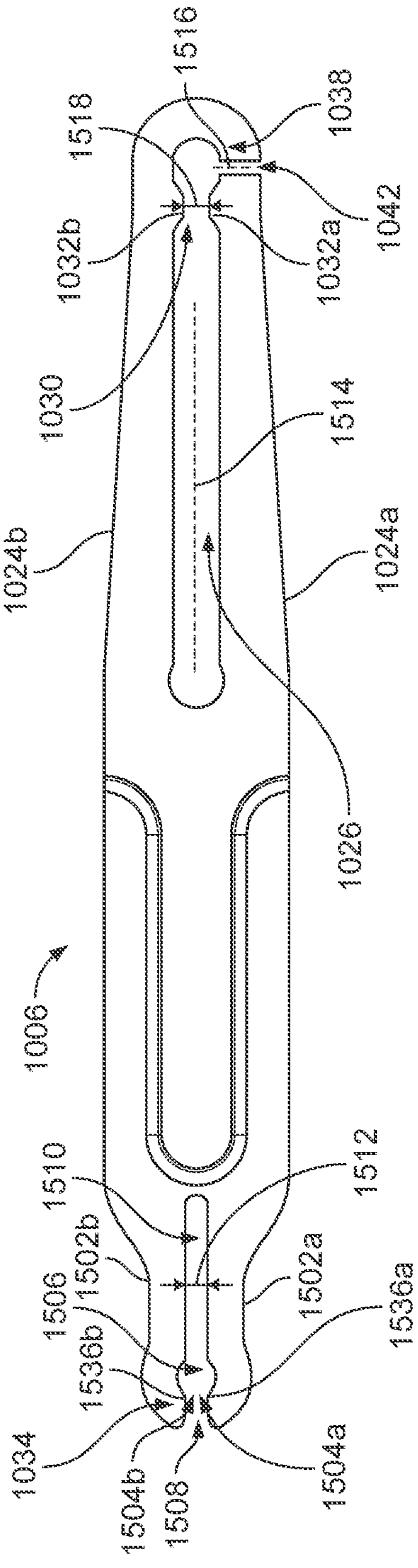
FIG. 15A is a top view of the example display case door bracket of FIG. 10A.

The bracket 1006 has mechanical features which can both provide mechanical tactile feedback to the user that the door is approaching to warn the user and reduce the force on the door. FIG. 15A is a top view of another example display case door bracket 1006. FIG. 15B is a side view of an example display case door bracket 1006. Referring to FIGS. 10A-

16B, the bracket 1006 is pivotably coupled to the frame 1002 at a first end 1018 of the bracket by a threaded fastener 1020.

Figure 16:
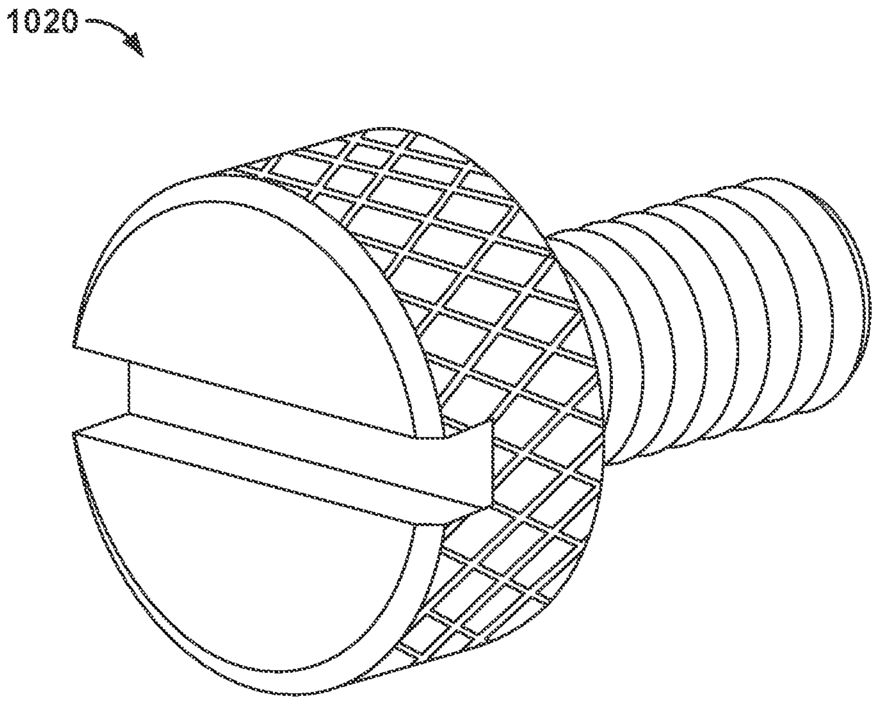
FIG. 16 is a perspective view of the thumb screw of example display case of FIG. 10A.

FIG. 16 is a perspective view of the threaded fastener 1020 of example display case 1000 of FIG. 10A. As shown in FIG. 16, in some implementations, the threaded fastener 1020 is a thumb screw.

As shown in FIGS. 10A-10B and 15A-15B, the bracket 1006 includes a first pair of spring arms 1502*a* and 1502*b* at the first end 1018 of the bracket 1006. Each of the first pair of spring arms 1502*a* and 1502*b* include respective concave regions 1504*a* and 1504*b*, respectively. The concave regions 1504*a* and 1504*b* together form an aperture 1506 sized to accept the threaded fastener 1020.

The bracket 1006 includes a first opening 1508 at the first end 1018 defined by the first pair of spring arms 1502*a* and 1502*b* through which the threaded fastener 1020 is permitted to pass, upon application of a first holding force sufficient to overcome the first pair of spring arms 1502*a* and 1502*b*, and, thereby, disconnect the bracket 1006 from the frame 1002.

The bracket 1006 includes a second end 1022. The second end 1022 includes a second pair of spring arms 1024*a* and 1024*b* (shown in FIGS. 10A and 15A). The spring arms 1024*a* and 1024*b* define a slot 1026. The display case 1000 includes a bolt 1028. The slot 1026 is sized to accept the bolt 128 (shown in FIGS. 10A-14B. The bolt 1028 passes through the slot 1026 and mechanically couples the bracket 1006 to the display case door 1004 to allow the bolt 1028 to slide through the slot 1026 when the display case door 1004 is opened or closed by the user.

Referring to FIGS. 10A-15B, the bracket 1006 includes a first detent 1030. The first detent 1030 can include a first detent portion 1032*a* mechanically coupled to the spring arm 1024*a* and a second detent portion 1032*b* mechanically coupled to the spring arm 1024*b* which extend into the slot 1026. The first detent portion 1032*a* and the second detent portion 1032*b* extend into the slot 1026 and reduce a width 1518 (shown in FIG. 15A) of the slot 1026 to a distance that is narrower than a diameter of the bolt 1028.

Figure 11A:
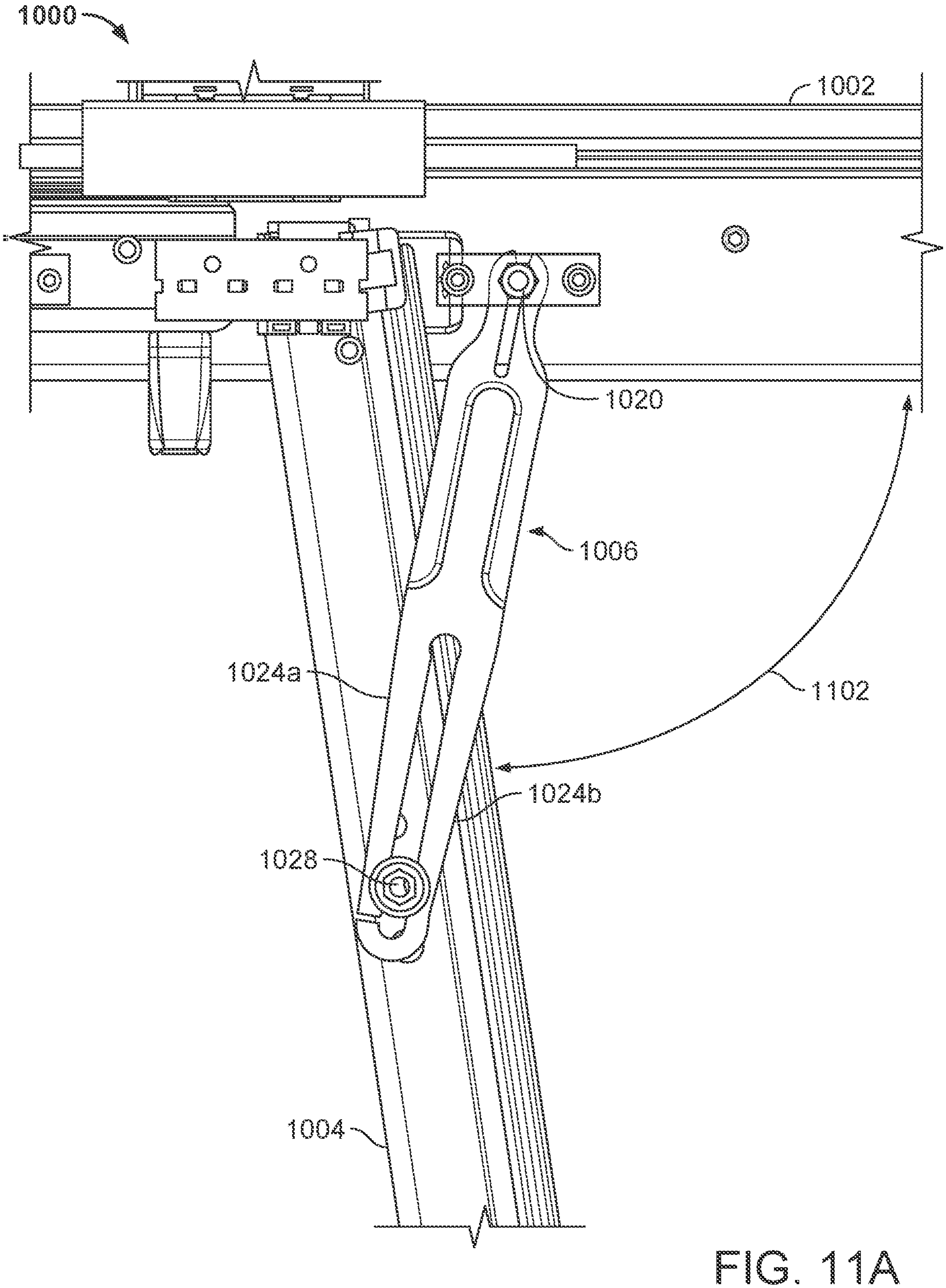
FIG. 11A is a top view of the example display case of FIG. 10A with the display case door open in a first position.
Figure 11B:
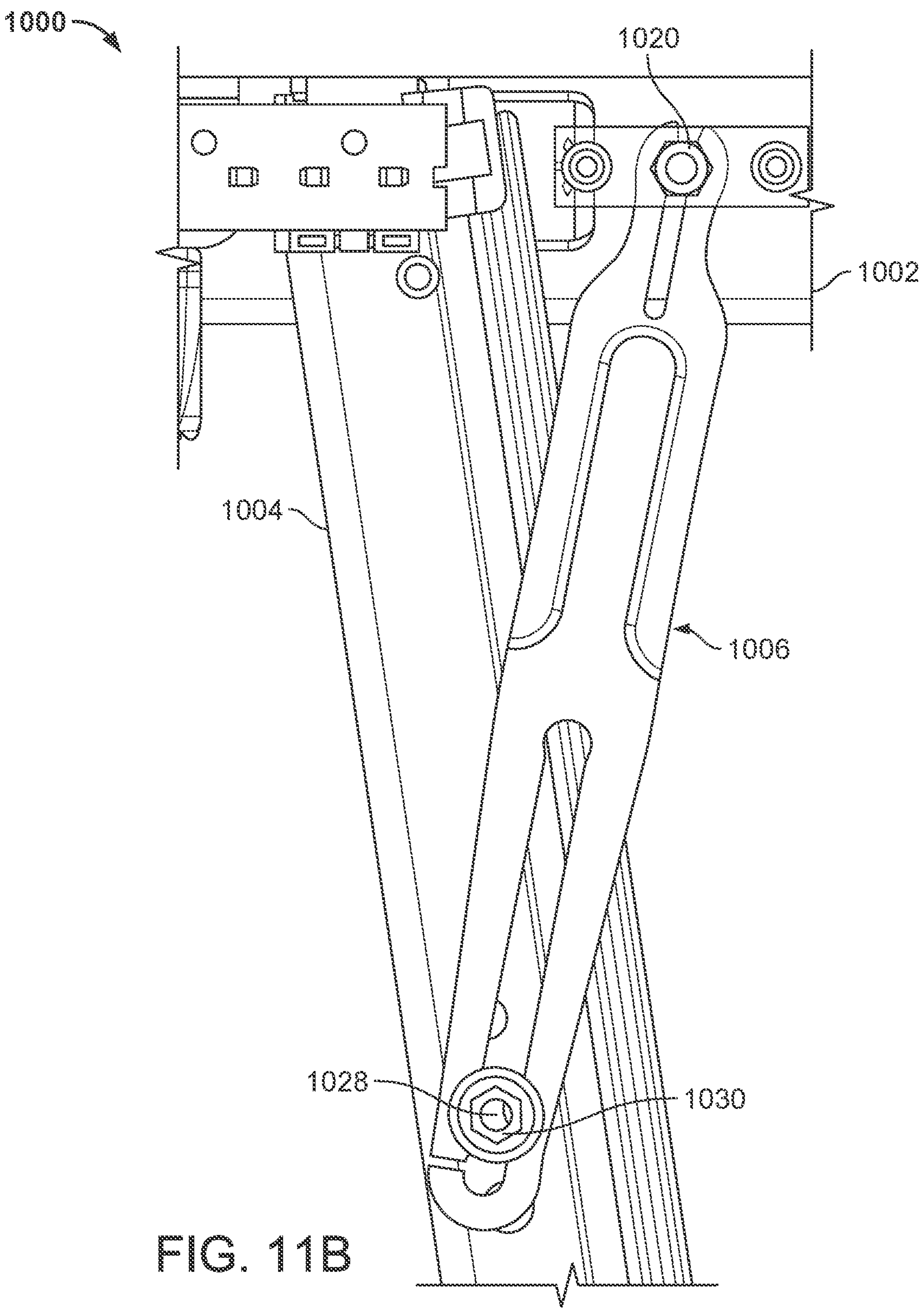
FIG. 11B is a top detailed view of the example display case of FIG. 10A with the display case door open in the first position of FIG. 11A.

FIG. 11A is a top view of an example display case 1000 with the display case door 1004 open in a first position. FIG. 11B is a top detailed view of an example display case 100 0 with the display case door 1004 open in the first position of FIG. 11A. Referring to FIGS. 11A-11B, the first detent 1030 (the first detent portion 1032*a* and the second detent portion 1032*b*) apply a second holding force to the bolt 1028 when the user opens the display case door 104 to engage the bolt 1028 to the first detent 1030. The first holding force is applied to the bolt 1028 by the first detent 1030 resists further movement of the display case door 1004 beyond a first open angle 1102. The first open angle 1102 is the angle of the door 1004 relative to the frame 1002 as the display case door 1004 rotates about the hinge 1008. In some cases, the first open angle 1102 is less than 82 degrees.

The spring arms 1024*a* and 1024*b* apply a sufficient force to the display case door 1004 to overcome the second holding force and permit the bolt 1028 to slide past the first detent 1030 to provide mechanical tactile feedback to the user that the user is moving the display case door 1004 too far, too hard, or too quickly, creating a force on the display case door 1004 which can cause the transparent panel 1016 to crack or shatter. The spring arms 1024*a* and 1024*b* flex when the bolt 1024 slides past the first detent 1030.

The first set of spring arms 1502*a* and 1502*b* include a second detent 1034. The second detent 1034 can include a first detent portion 1536*a* mechanically coupled to the spring arm 1502*a* and a second detent portion 1536*b* mechanically coupled to the spring arm 1502*b* which extend into a second slot 1510. The first detent portion 1536*a* and the second detent portion 1536*b* extending into the slot 1510 to reduce a width 1512 (shown in FIG. 15A) of the second slot 1510 to a distance that is narrower than a diameter of the threaded fastener 1020.

Figure 12A:
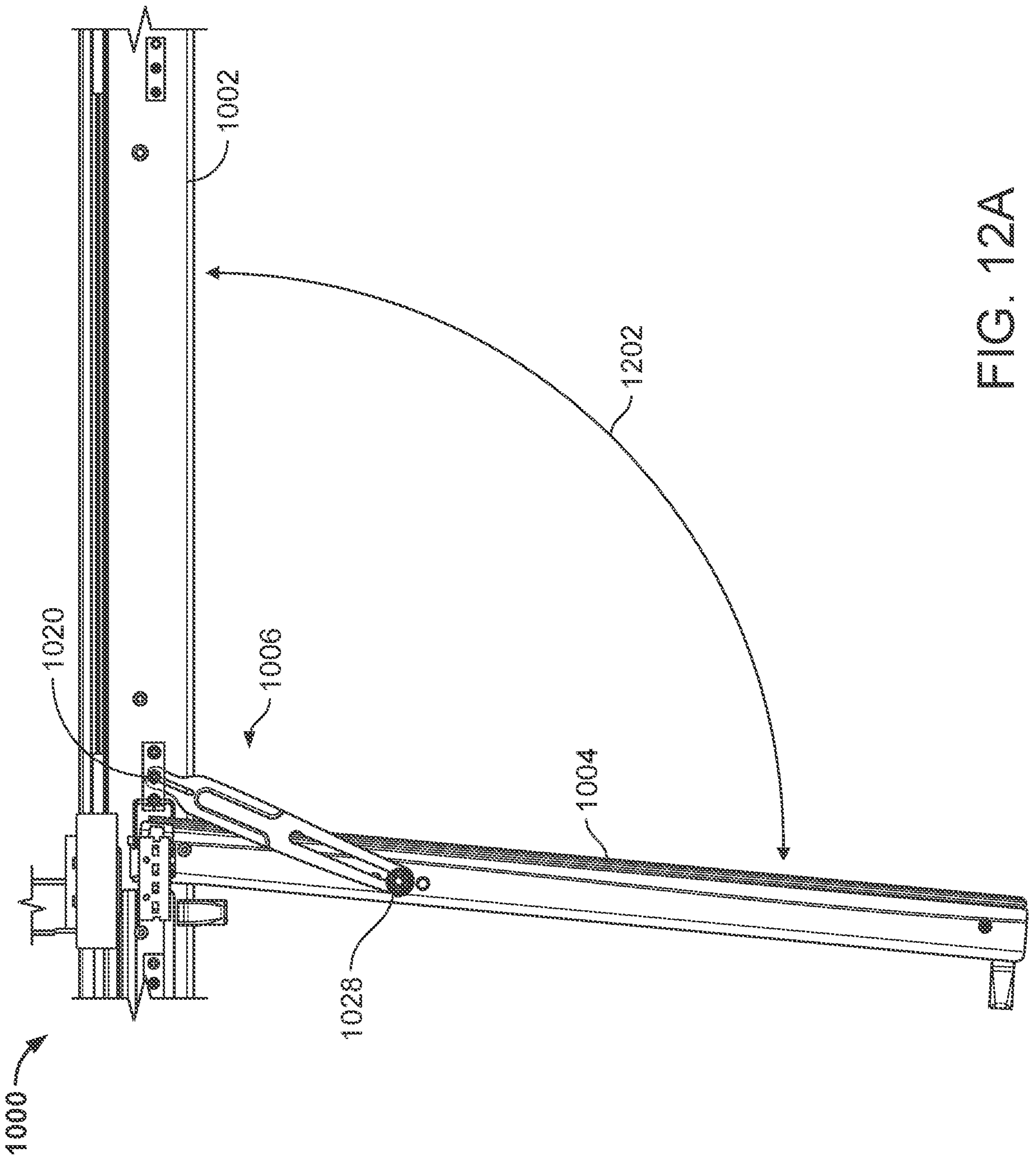
FIG. 12A is a top view of the example display case of FIG. 10A with the display case door open in a second position.
Figure 12B:
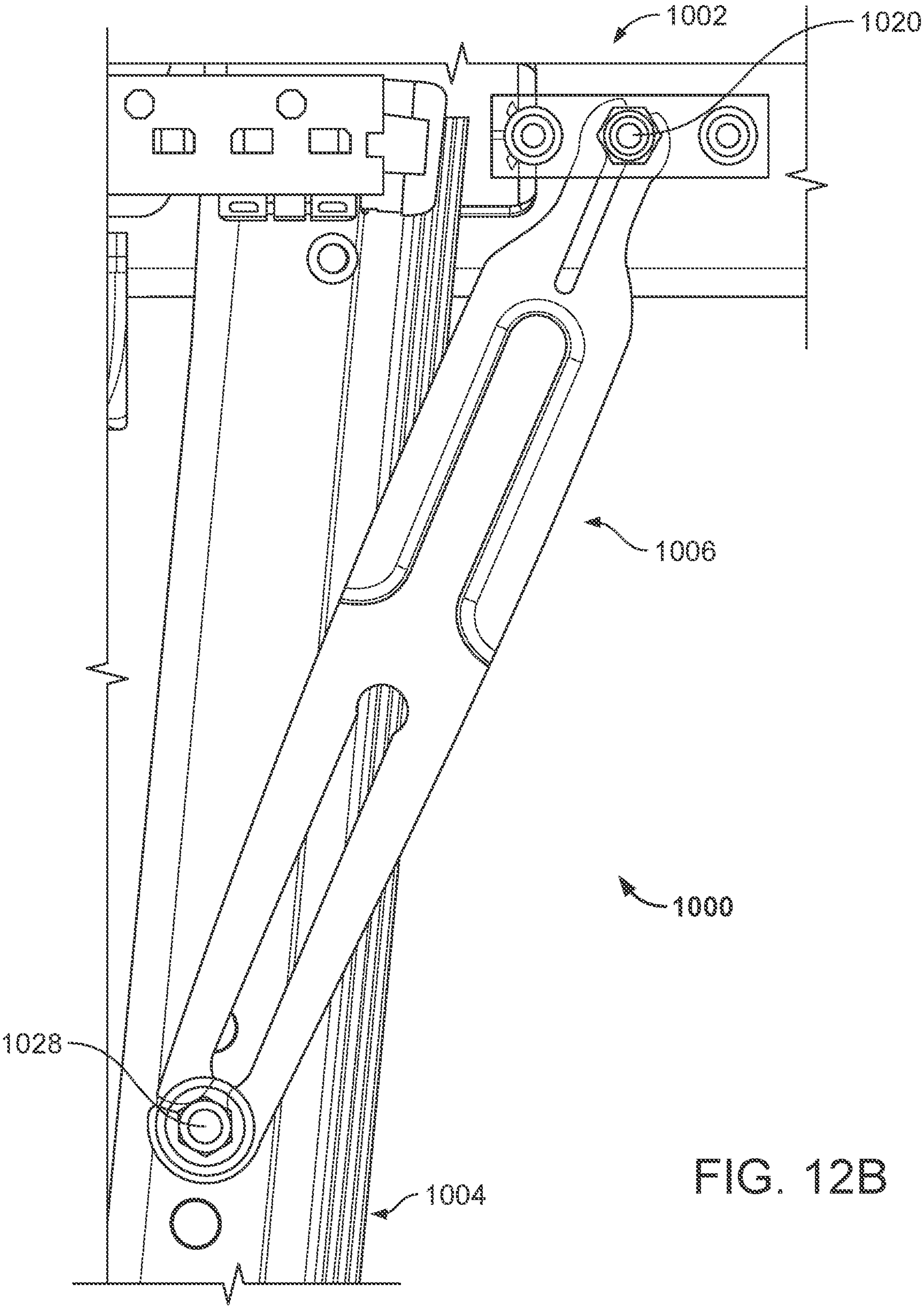
FIG. 12B is a top detailed view of the example display case of FIG. 10A with the display case door open in the second position of FIG. 12A.

FIG. 12A is a top view of the example display case 1000 with the display case door 1004 open in a second position. FIG. 12B is a top detailed view of the example display case 1000 with the display case door 1004 open in the second position of FIG. 12A. Once the bolt 1028 passes the first detent 1030 it is in a void 302 in between the first detent and a third detent 138. The third detent 1038 is positioned at a terminating end 140 of the second spring arm 1024*a* and the second spring arm 1024*b*. The third detent 1038 defines an opening 1042 through which the bolt 1028 passes to disconnect from the bracket 1006 (as described later in reference to FIG. 15A-15B).

Referring to FIGS. 10A, 12A, and 15A, the third detent 1038 can include a first detent portion 1032*a* and the second detent portion 1032*b*. The third detent 1038 (the first detent portion 1032*a* and the second detent portion 1032*b*) apply a third holding force to the bolt 1028 when the user continues to open the display case door 1004 past the first detent 1030 0 to engage the bolt 1028 to the third detent 1038. The third holding force applied to the bolt 1028 by the third detent 1038 resists further movement of the display case door 1004 beyond a second open angle 1202. The second open angle 1202 is the angle of the door 1004 relative to the frame 1002 as the display case door 1004 rotates about the hinge 1008. In some cases, the second open angle 1202 is greater than 90 degrees.

The spring arms 1024*a* and 1024*b* apply a sufficient force to the display case door 1004 by the user to overcome the third holding force and permit the bolt 1028 to slide past the third detent 1038 to provide mechanical tactile feedback to the user that the user is moving the display case door 1004 too far, too hard, or too quickly, creating a force on the display case door 1004 which can cause the transparent panel 1016 to crack or shatter. The spring arms 1024*a* and 1024*b* flex when the bolt 1024 slides past the third detent 1038. In some cases, the third holding force is greater than the second holding force and the first holding force. For example, the first holding force can be less than seven pounds force, the second holding force can be greater than seven pounds force but less than fifteen pounds force, and the third holding force can be greater than fifteen pounds force. In the preceding example, as the bolt passes between the spring arms toward the distal end of the bracket, each detent creates a progressively larger holding force. In this manner, the user receives progressive mechanical feedback warning the user that the user continued motion may cause separation from the bracket and/or damage to the door.

Figure 13A:
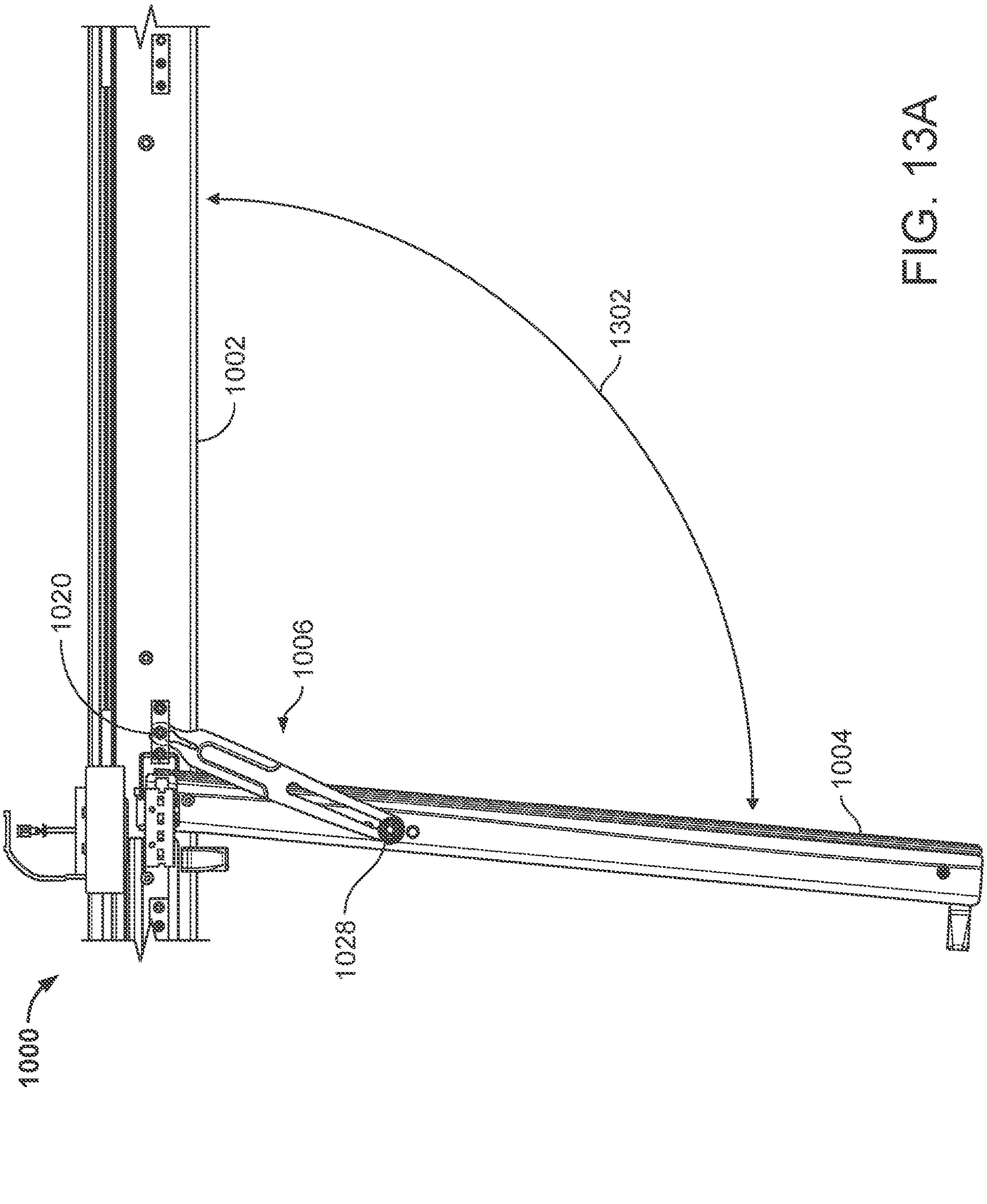
FIG. 13A is a top view of the example display case of FIG. 10A with the display case door open in a third position.
Figure 13B:
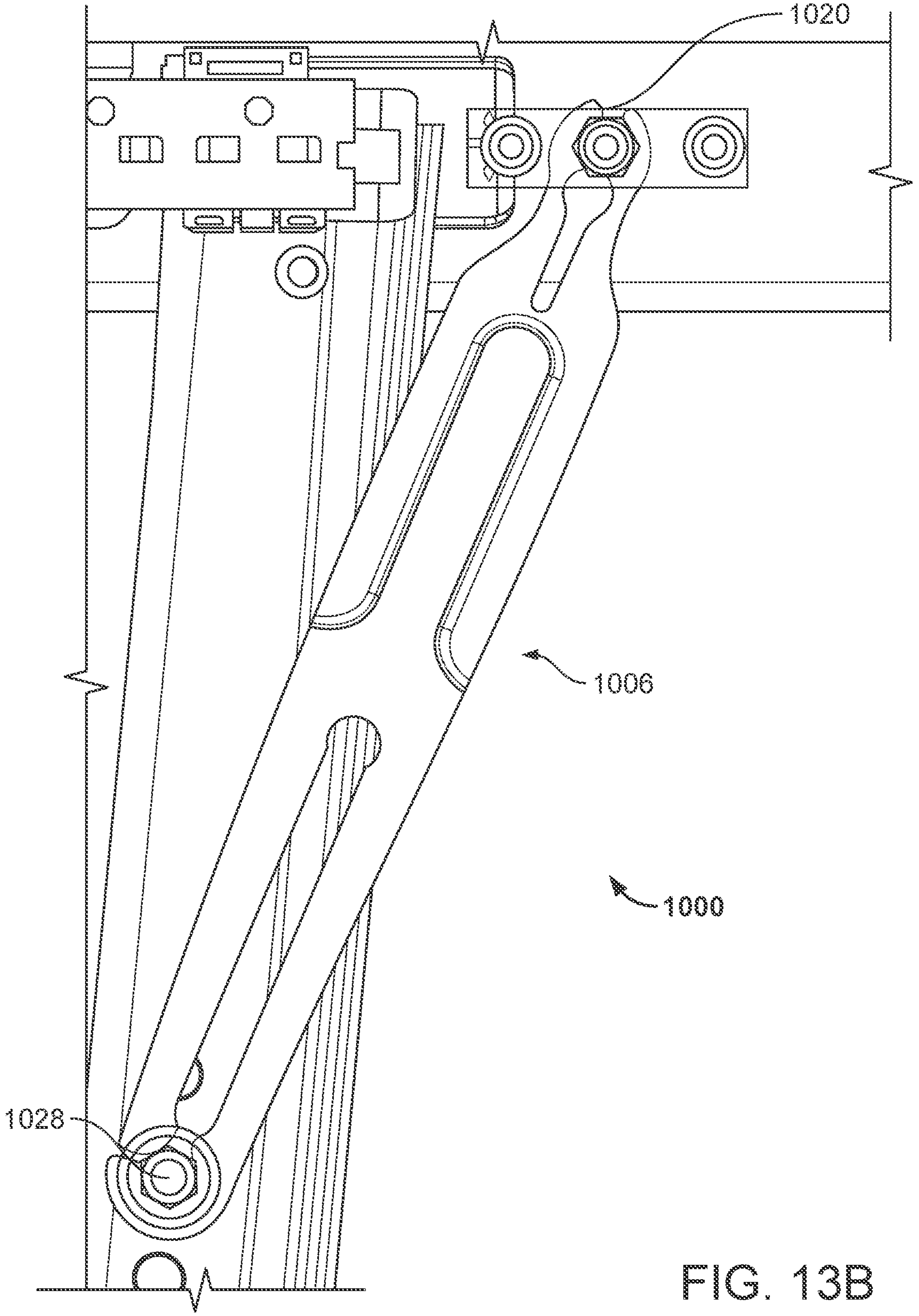
FIG. 13B is a top detailed view of the example display case of FIG. 10A with the display case door open in the third position of FIG. 13A.

FIG. 13A is a top view of the example display case 1000 of FIG. 10A with the display case door 1004 open in a third position. FIG. 13B is a top detailed view of the example display case 1000 of FIG. 10A with the display case door 1004 open in the third position of FIG. 13A. As the user continues to open the display case door 1004 to the third position at a third open angle 1302, the threaded fastener 1020 forces the first pair of spring arms 1502*a* and 1502*b* at the first end 1018 of the bracket 1006 to flex away from each other. The threaded fastener 1020 begins to move out of the aperture 1506 defined by the concave regions 1504*a* and 1504*b* of the first pair of spring arms 1502*a* and 1502*b*, respectively.

Figure 14A:
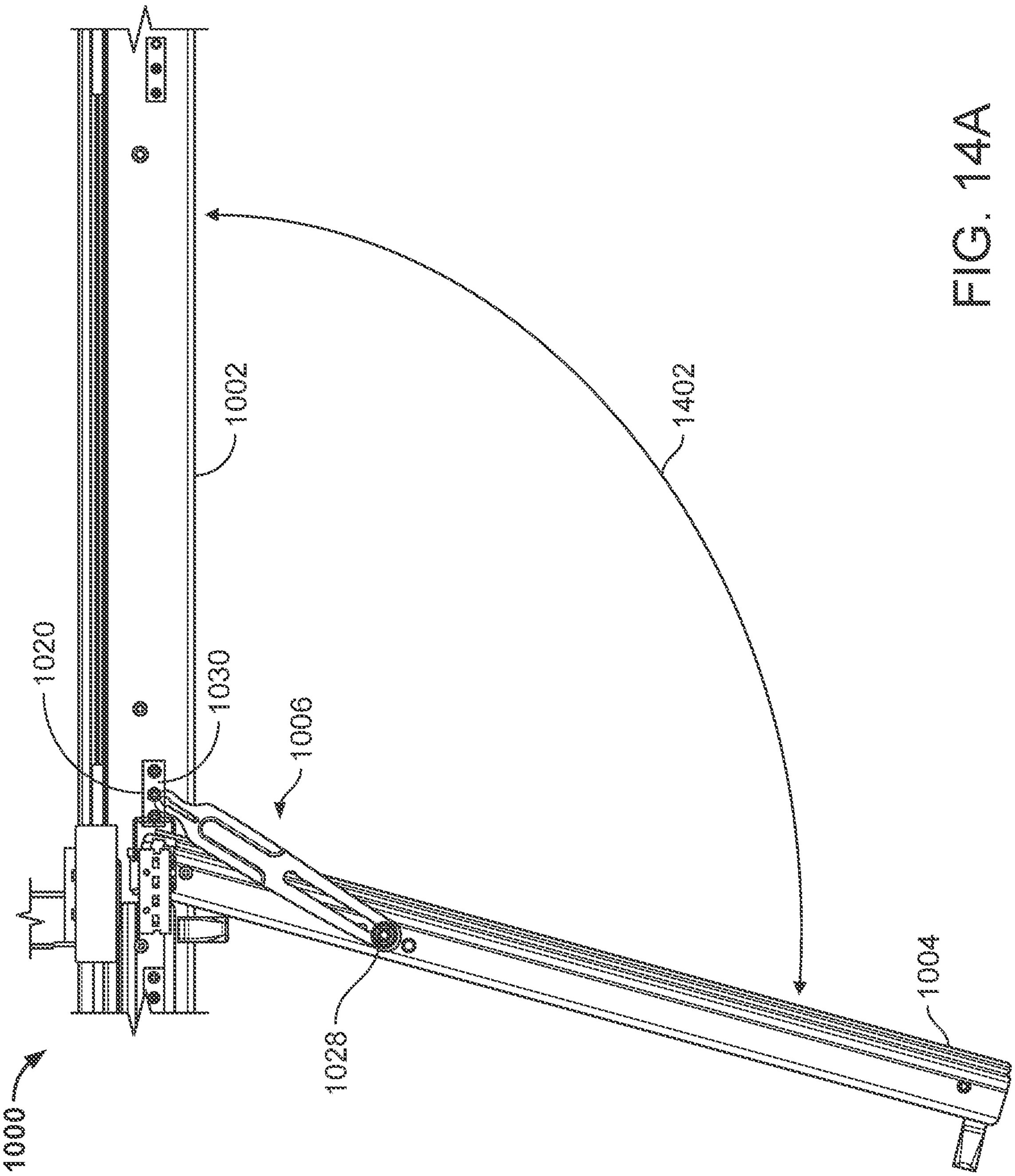
FIG. 14A is a top view of the example display case of FIG. 10A with the display case door open in a fourth position.
Figure 14B:
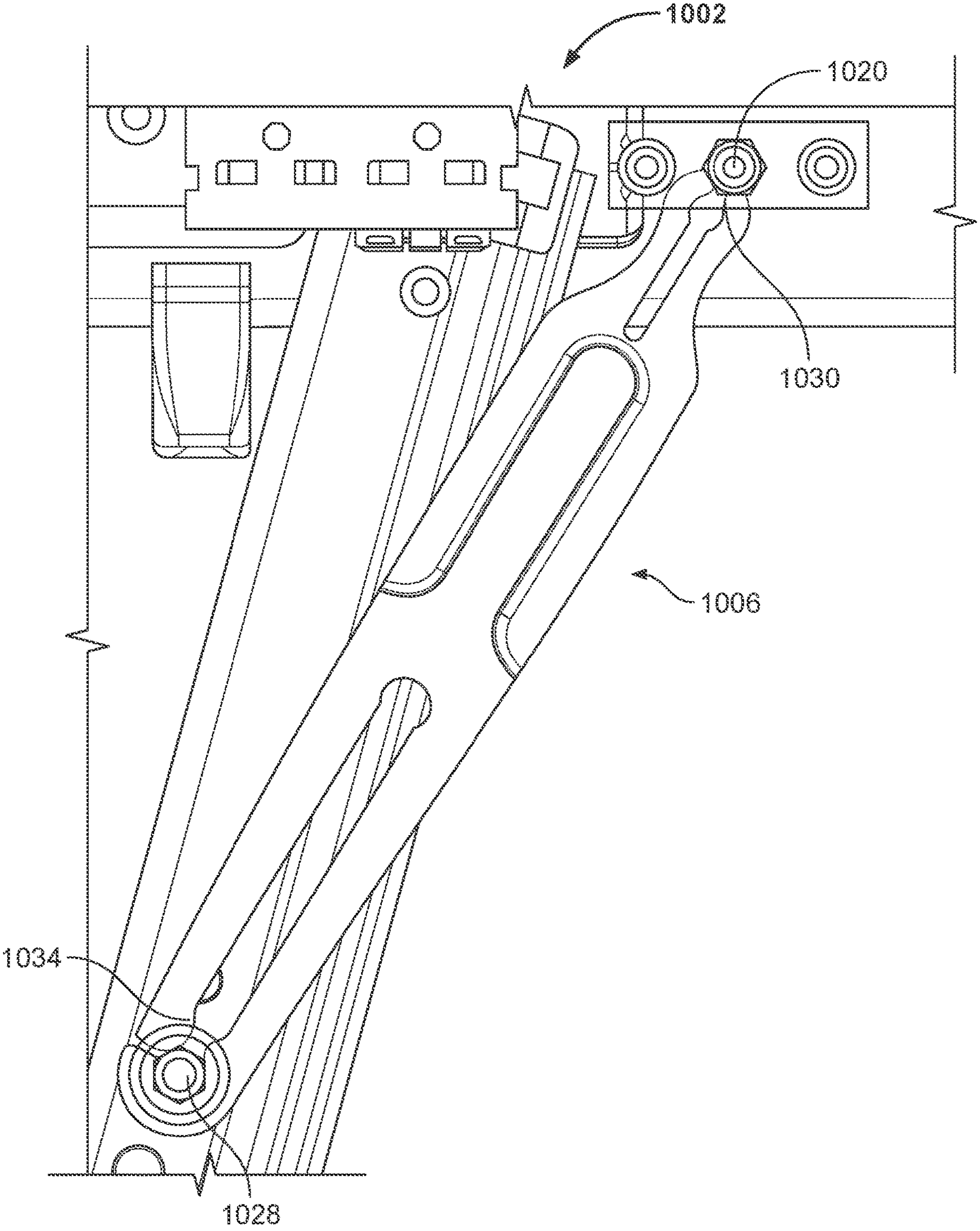
FIG. 14B is a top detailed view of the example display case of FIG. 10A with the display case door open in the fourth position of FIG. 14A.

In some implementations, the first holding force is greater than the second holding force. In some implementations, the first open angle 1102 is less than 82 degrees and the second open angle is greater than 82 degrees but less than 89 degrees. In some implementations, first open angle 1102 is less than 82 degrees, the second open angle 1202 is 82 degrees or greater and less than 89 degrees, and the third open angle 1302 is 89 degrees or greater FIG. 14A is a top view of the example display case 1000 of FIG. 10A with the display case door 1004 open in a fourth position. FIG. 14B is a top detailed view of the example display case 1000 of FIG. 10A with the display case door 1004 open in the fourth position of FIG. 14A.

Referring to FIGS. 14A-15B, when the user opens the door 1004 past the first detent 1030, the bolt 1028 engages in the opening 1042. The threaded fastener 1020 passes through the aperture 1506 to disconnect the bracket 1006 from the door 1004. The door 1004 is at an angle 1402 relative to the frame 1002.

Referring to FIGS. 15A-15B, in some implementations, the first slot 1026 between the pair of spring arms is approximately 0.320 inches. In some implementations, the width 1512 (the first gap between the first detent portion 1536*a* and first detent portion 1536*b*) is approximately 0.180 inches. In some implementations, the width 1518 (the second gap between the second pair of detent portions 1032*b* and 1032*b*) is approximately 0.185 inches. In some implementations, the second opening 1042 is approximately 0.140 inches.

The slot 1026 of the bracket 1006 has a longitudinal axis 1514. The opening 1042 has a longitudinal axis 1516. The longitudinal axis 1516 of the opening 1042 is offset from the longitudinal axis 1514 of the slot 1026. In other implementations, not shown, the opening 1042 and the slot 1026 share a longitudinal axis 1514.

FIGS. 17A-17D are perspective views of the display case door illustrating the steps for reassembling the door.

Figure 17A:
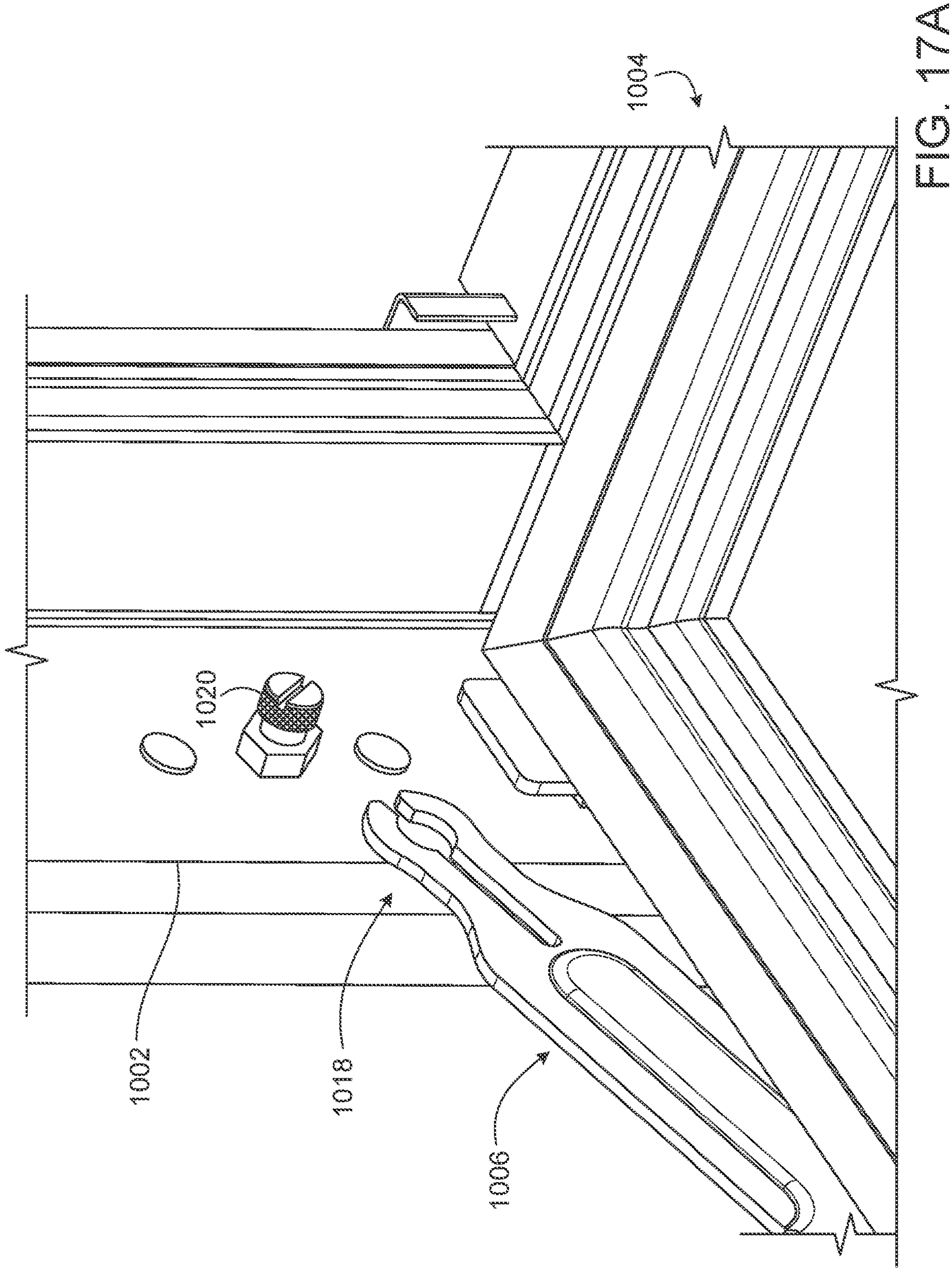
FIGS. 17A-17D are perspective views of the display case door illustrating the steps for reassembling the door.
Figure 17B:
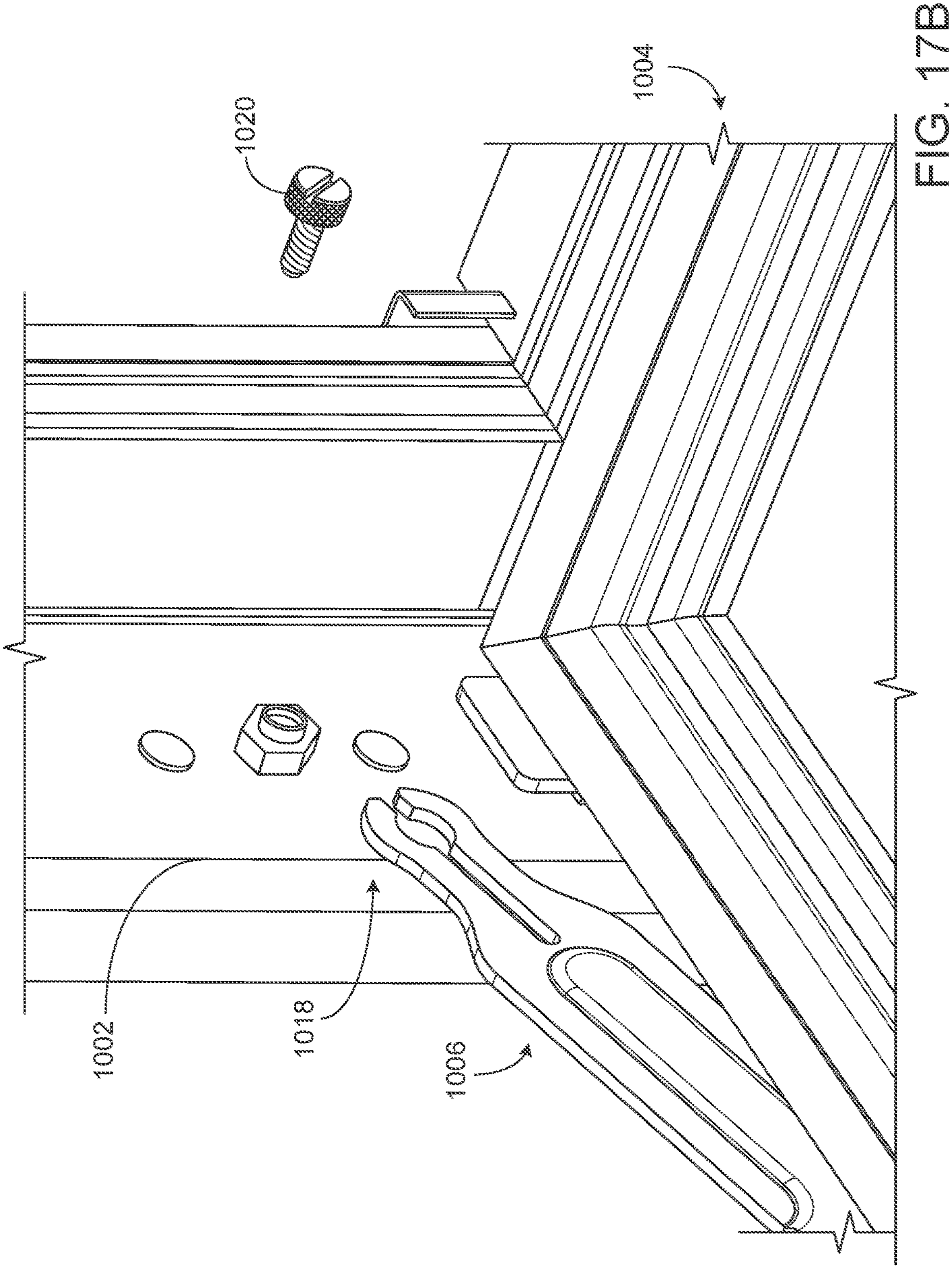

FIG. 17A shows the first end 1018 of the bracket 1006 disengaged from the threaded fastener 1020. The user has opened the door 1004 too far. Another user (a second user), for example, a store employee or a store manager, can reassemble the bracket 1006 to the frame 1002. Referring to FIG. 17B, the second user removes the threaded fastener 1020 from the frame 1002.

Figure 17C:
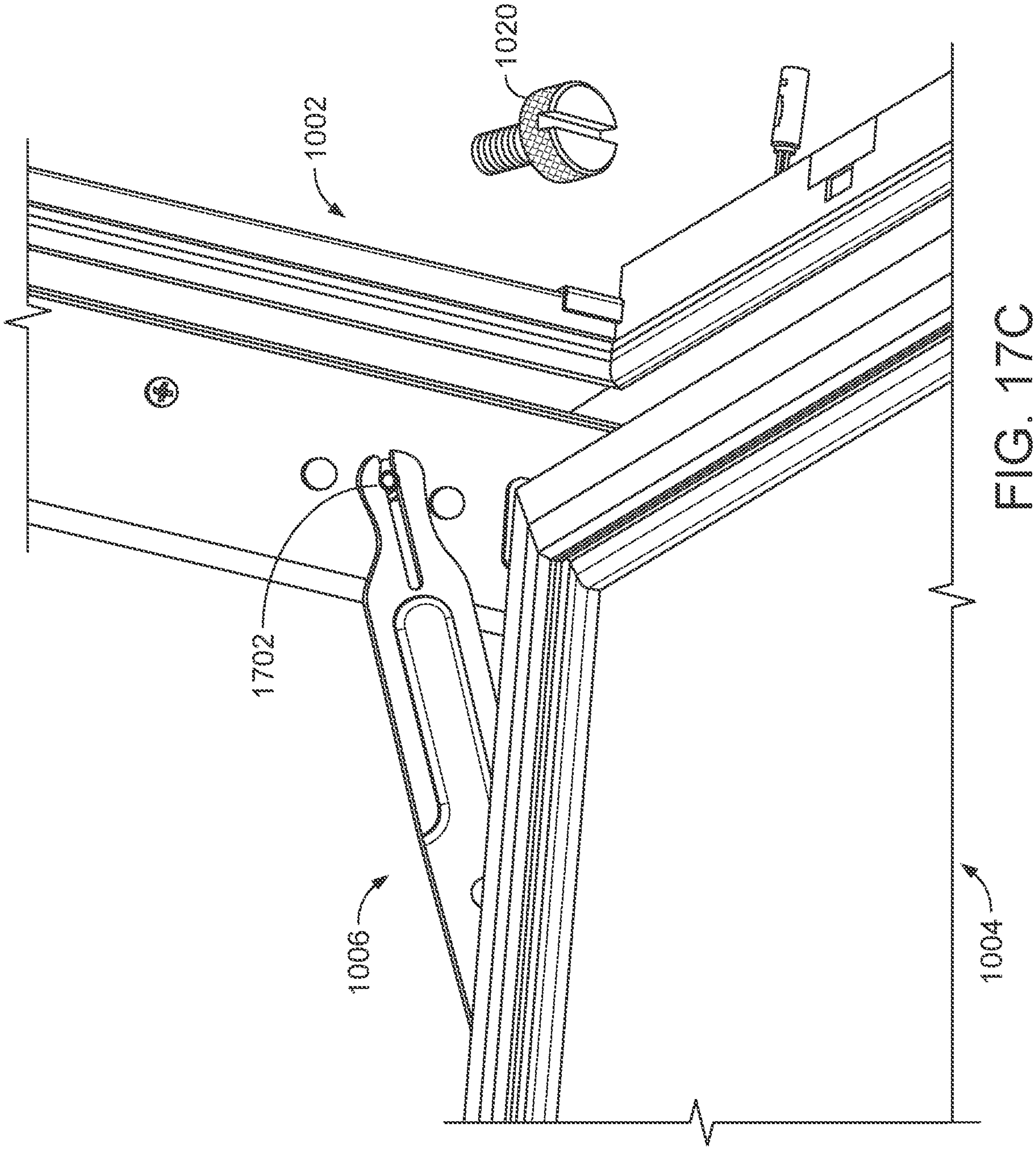

Referring to FIG. 17C, the second user places the aperture 1506 of the first end 1018 of the bracket 1006 over a threaded hole 1702 in the frame 1002. The threaded hole 1702 is sized to accept the threaded fastener 1020.

Figure 17D:
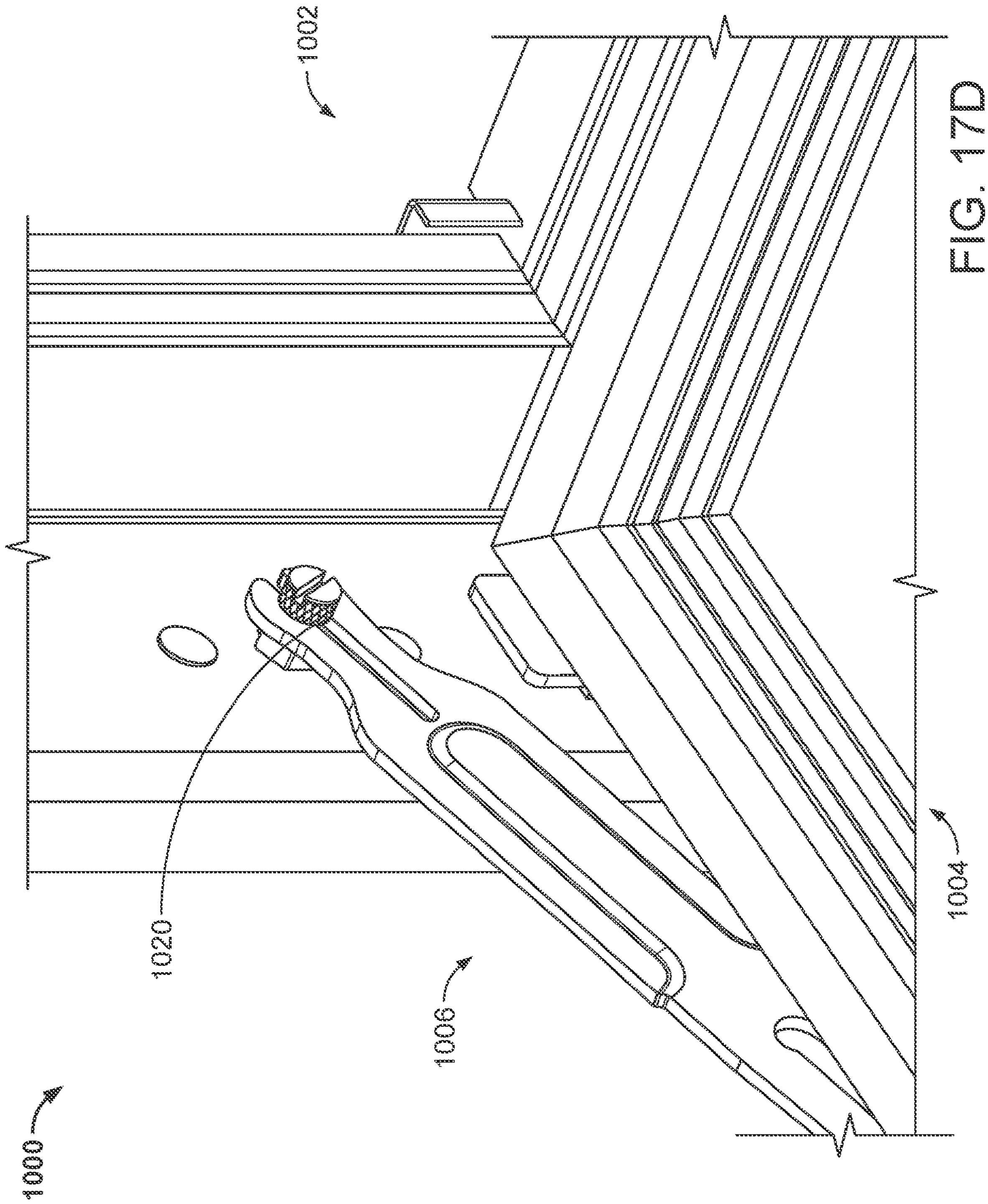

Referring to FIG. 17D, the second user places the threaded fastener 1020 through the aperture 1506. The second user then screws the threaded fastener 1020 into the threaded hole 1702 to secure the bracket 1006 to the frame 1002.

Figure 18A:
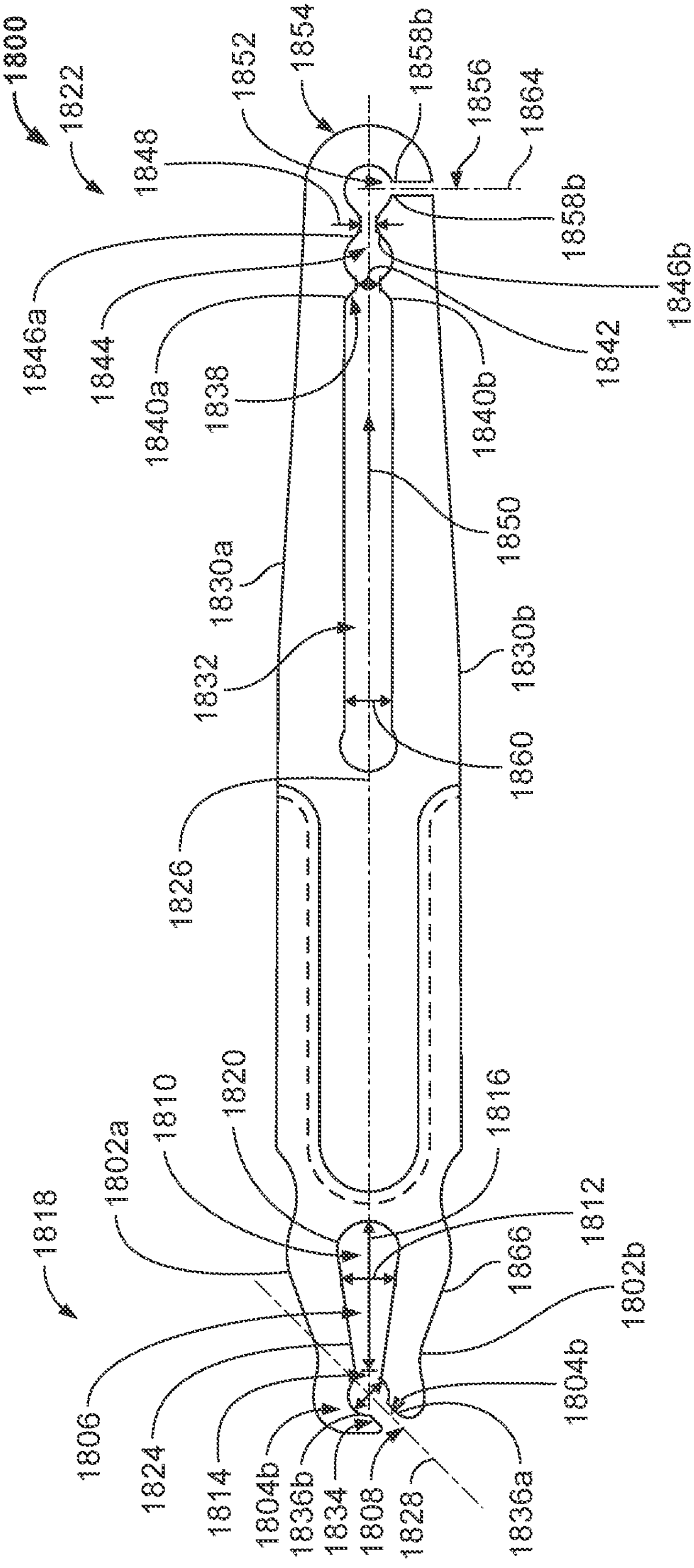
FIG. 18A is a top view of another example display case door bracket.
Figure 18B:
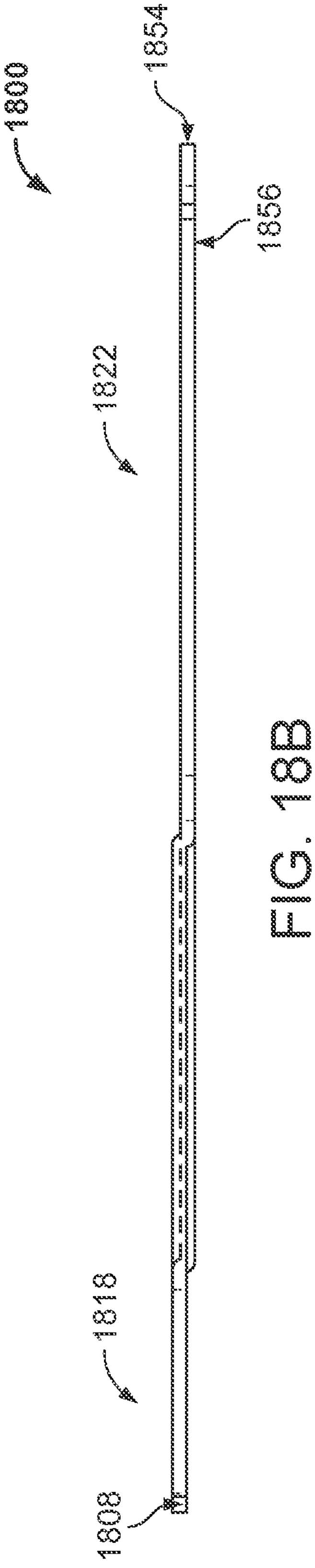
FIG. 18B is a side view of the example display case door bracket of FIG. 18A.

FIGS. 18A-18B are views of another exemplary display case door bracket 1800. Referring to FIGS. 18A-18B, the bracket 1800 is generally similar to the brackets previously described. The bracket 1800 has mechanical features which can provide mechanical tactile feedback to the user that the door is approaching a fully open position to warn the user and reduce the force on the door. The bracket 1800 also has mechanical features which can facilitate attachment of the bracket 1800 to a fastener 1900 (described later in reference to FIGS. 19A-19C) of the frame 102 (as shown in FIGS. 20A-20C). FIGS. 20A-20C are perspective views of the display case door illustrating the steps for reassembling the door with the display case door bracket 1800 and the fastener 1900. Referring to FIGS. 18A-18B and 20A-20C, the bracket 1800 has a first end 1818 and a second end 1822. As shown in FIG. 20A, the first end 1818 of the bracket 1800 is pivotably coupled to fastener 1900 on the frame 102. The second end 1822 of the bracket 1800 is coupled to the door 104.

Figure 20A:
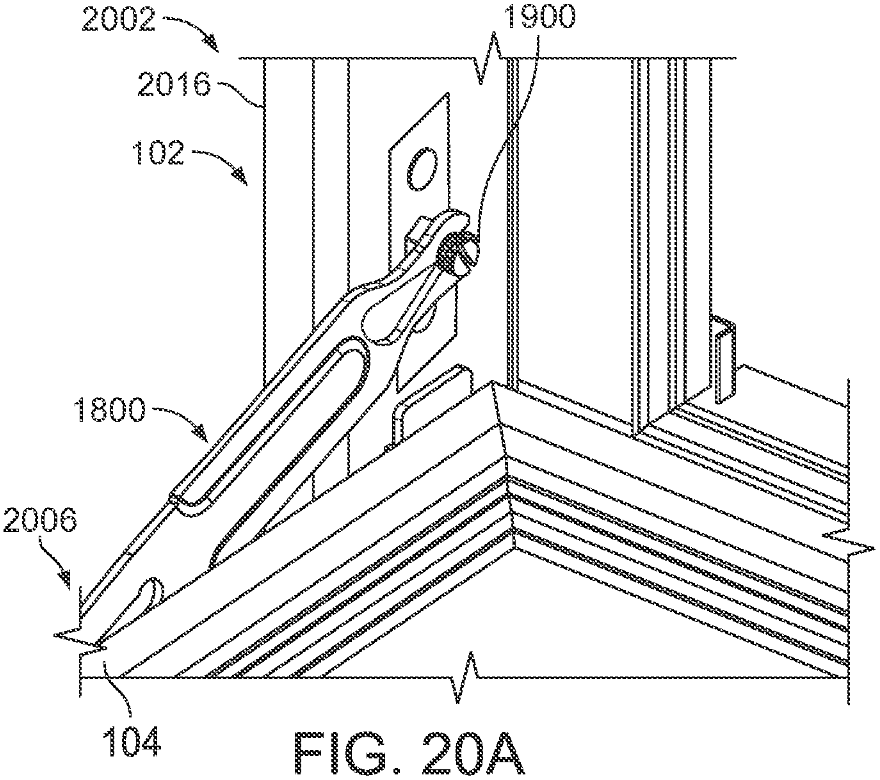
FIGS. 20A-20E are perspective views of the display case door illustrating the steps for reassembling the door with the display case door bracket of FIG. 18A and the fastener of FIG. 19A.
Figure 20B:
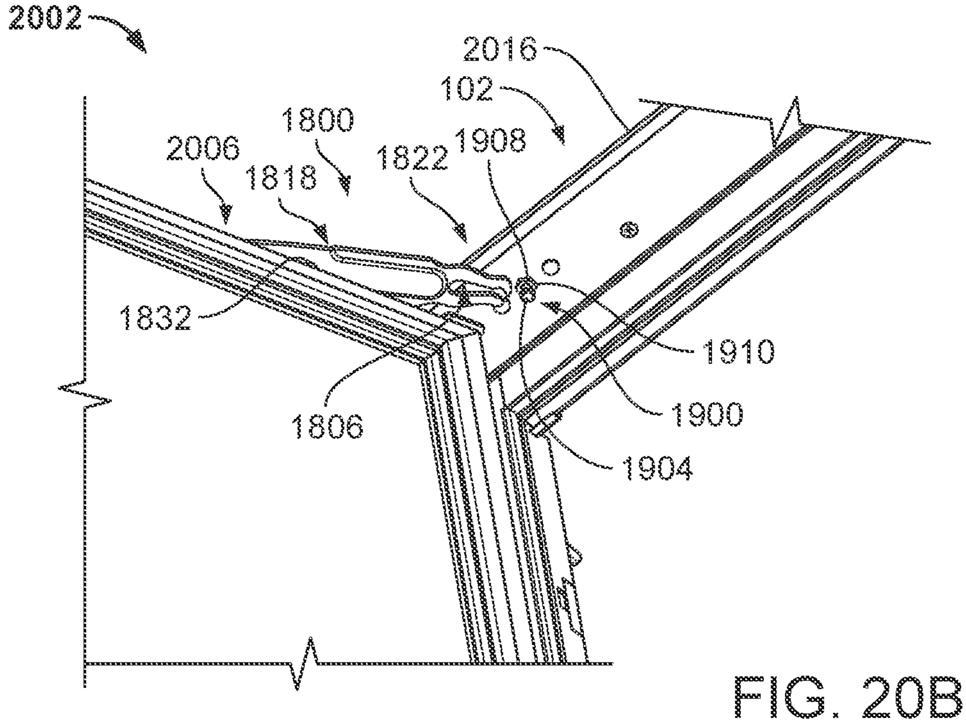
Figure 20C:
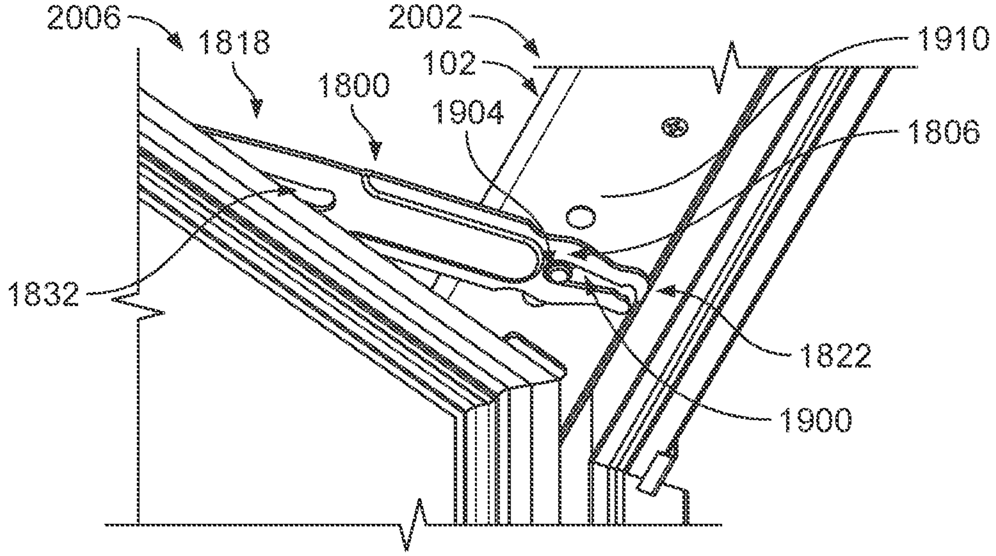
Figure 20D:
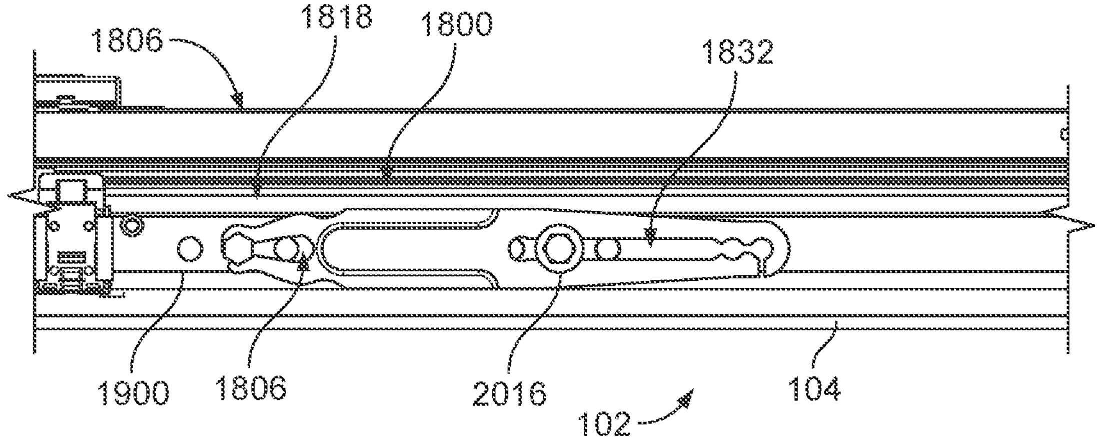
Figure 20E:
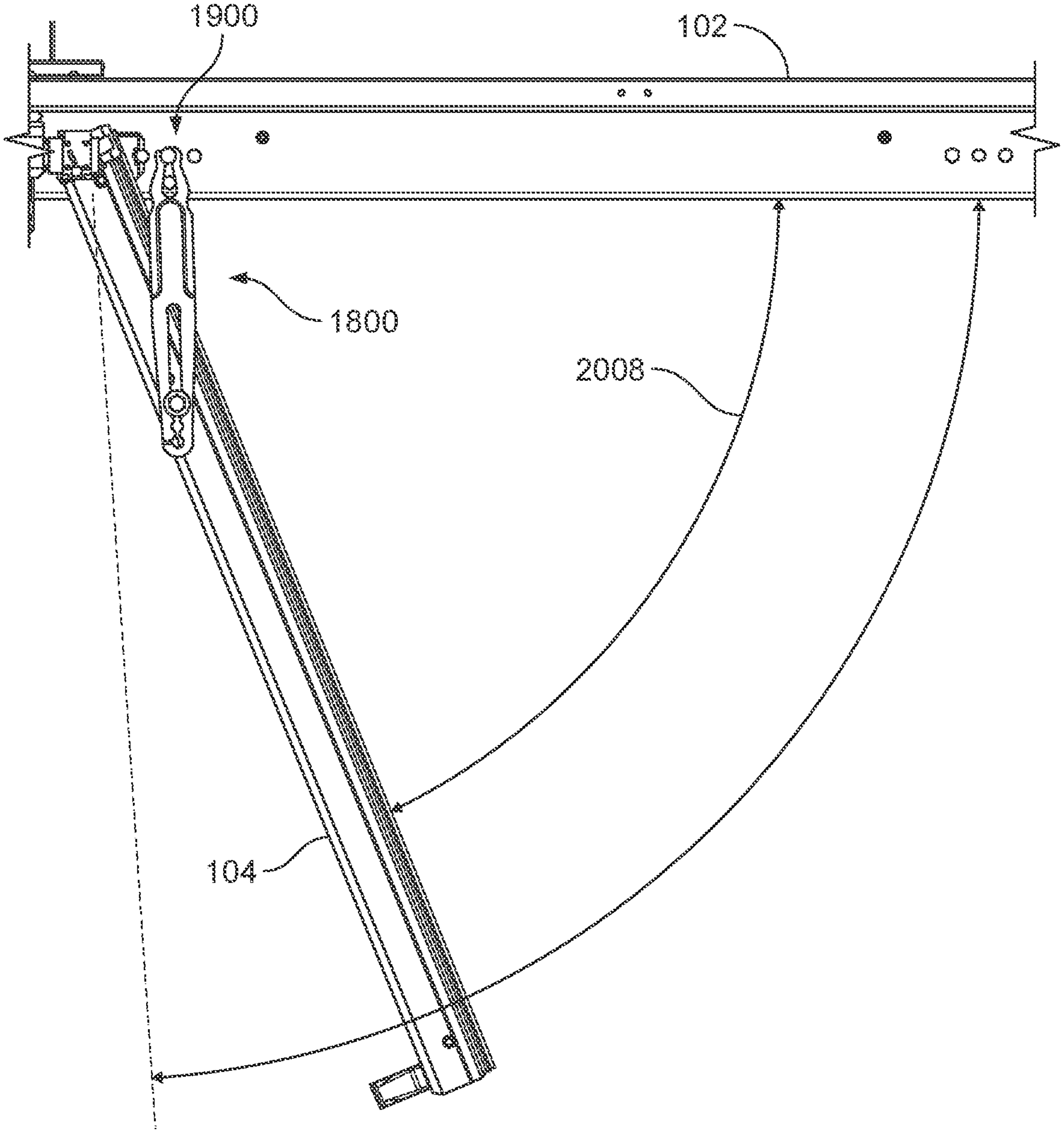

As shown in FIGS. 18A-18B, the first end 1818 of the bracket 1800 has a first pair of spring arms 1802*a* and 1802*b*. The first pair of spring arms 1802*a* and 1802*b* define a first slot 1806 in the first end 1818. The first slot 1806 couples to the fastener 1900 and allows the door 104 to pivot between an open position 2002 (as shown in FIGS. 20A-20C) and a closed position 2004 (as shown in FIG. 20D).

The first slot 1806 has a first portion 1810. The first portion 1810 has a width 1812 and a length 1816. The width 1812 of the first portion 1810 can vary along the length 1816. As shown in FIG. 18A, the width 1812 at a first location 1820 is greater than an outer diameter 1902 of a knob 1904 of the fastener 1900. The width 1812 at a second location 1824 can be less than the outer diameter 1902 of the knob 1904. The difference in the width 1812 at the first location 1820 and the second location 1824 can result in the first portion 1810 being shaped. For example, the first portion 1810 can be ovoid (as shown in FIG. 18), circular, pear-shaped, triangular, or lobular. When the width 1812 at location 1820 is greater than the outer diameter 1902 and is less than the outer diameter 1902 at location 1824, the fastener 1900 can be attached to the fastener 1900 by placing the knob 1904 through first portion 1810 of the first slot 1806 at the first location 1820 and sliding the fastener 1900 so that the knob 1904 moves from the first location 1820 to the second location 1824, capturing the knob 1904.

The first end 1818 includes a first detent 1834 coupled to the first portion 1810 of the can include a first portion 1836*a* mechanically coupled to the spring arm 1802*a* and a second portion 1836*b* mechanically coupled to the spring arm 1802*b*. The first portion 1836*a* and the second portion 1836*b* extend into a first slot 1806 to reduce a width 1812 of the first slot 1806 to a distance that is narrower than the outer diameter 1902 of the fastener 1900.

Each of the first pair of spring arms 1802*a* and 1802*b* include respective concave regions 1804*a* and 1804*b*, respectively. The concave regions 1804*a* and 1804*b* together form an aperture 1814 sized to accept the threaded fastener 1900 from the first portion and hold the fastener 1900 when the door 104 rotates.

The bracket 1800 includes a first opening 1808 at the first end 1818 defined by the first pair of spring arms 1802*a* and 1802*b* through which the fastener 1900 is permitted to pass, upon application of a first holding force sufficient to overcome the first pair of spring arms 1802*a* and 1802*b*, and, thereby, disconnect the bracket 1800 from the frame 1002. The fastener 1900 passes through the first portion 1836*a* and the second portion 1836*b*, which apply the first holding force to the fastener 1900, to move from the aperture 1814 into the opening 1808 and disconnect from the bracket 1800.

The first portion 1810 of the bracket 1800 has a longitudinal axis 1826 corresponding to the length 1816. The opening 1808 has a longitudinal axis 1828. The longitudinal axis 1828 of the opening 1808 is offset from the longitudinal axis 1828 of the first portion 1810 (in other words, they are not aligned). In other implementations, not shown, the opening 1808 and the first portion 1810 are not offset (in other words, they are aligned).

The bracket 1800 includes the second end 1822. The second end 1822 of the bracket 1800 is coupled to the door 104. The second end 1822 is generally similar to the second ends previously described in reference to FIGS. 7A-7B and 15A-15B. The second end 1822 includes a second pair of spring arms 1830*a* and 1830*b*. The spring arms 1830*a* and 1830*b* define a second slot 1832. Referring to FIGS. 20A-20E, the door 104 includes a second fastener 2006. The second fastener 2006 is substantially similar to the bolt 128 previously described in reference to FIGS. 10A-14B. The second slot 1832 is sized to accept the second fastener 2006. The second fastener 2006 passes through the second slot 1832 and mechanically couples the bracket 1800 to the display case door 104 to allow the second fastener 2006 to slide through the second slot 1832 when the display case door 104 is opened or closed by the user.

The second end 1822 of the bracket 1800 includes a first detent 1838 coupled to the second pair of spring arms 1830*a* and 1830*b*. The first detent 1838 can include a first portion 1840*a* mechanically coupled to the spring arm 1830*a* and a second portion 1840*b* mechanically coupled to the spring arm 1830*b* which extend into the second slot 1832. The first portion 1840*a* and the second portion 1840*b* extending into the second slot 1832 reduces a width 1842 (shown in FIG. 18A) of the second slot 1832 to a distance that is narrower than a diameter (not shown) of the second fastener 2006. The first detent 1838 applies a second holding force to the second fastener 2006 which must be overcome by the user moving the door 104 from the closed position 2004 to the open position 2002 so that the second fastener 2006 moves past the first detent 1838.

The second set of spring arms 1830*a* and 1830*b* include a second detent 1844. The second detent 1844 has a first portion 1846*a* mechanically coupled to the spring arm 1830*a* and a second portion 1846*b* mechanically coupled to the spring arm 1832*b*. The first portion 1846*a* and the second portion 1846*b* extend into the second slot 1832 to reduce a width 1848 of the second slot 1832 to a distance that is narrower than the diameter of the second fastener 2006. The second fastener 2006 slides in the second slot 1832 in the direction of arrow 1850 to move past the first detent 1838 to contact the second detent 1844 as the user opens the door from the closed position 2004 to the open position 2002, as shown in reference to FIGS. 20A-20E. The second detent 1844 applies a third holding force to the second fastener 2006 which must be overcome by the user moving the door 104 from the closed position 2004 to the open position 2002 so that the second fastener 2006 moves past the second detent 1844.

Referring to FIGS. 18A-18B, the bracket 1800 includes a third detent 1852. The third detent 1852 is positioned at a terminating end 1854 of the second set of spring arms 1830*a* and 1830*b*. The third detent 1852 defines an opening 1856 through which the second fastener 2006 passes to disconnect from the bracket 1800 (as described later in reference to FIGS. 20A-20E).

Referring to FIGS. 18A-18B, the third detent 1852 can include a first portion 1858*a* and the second portion 1858*b*. The third detent 1852 (the first portion 1858*a* and the second detent portion 1858*b*) apply a fourth holding force to the second fastener 2006 when the user continues to open the display case door 104 past the first detent 1838 and the second detent 1844 to engage the second fastener 2006 to the third detent 1852. The third holding force applied to the second fastener 2006 by the third detent 1852 resists further movement of the display case door 104 until a force equal to or greater than the fourth holding force is applied by the user to the door 104.

The second set of spring arms 1830*a* and 1830*b* apply a sufficient force to the display case door 104 by the user to overcome the fourth holding force and permit the second fastener 2006 to slide past the third detent 1852 to provide mechanical tactile feedback to the user that the user is moving the display case door 104 too far, too hard, or too quickly, creating a force on the display case door 104 which can cause the transparent panel 116 to crack or shatter. The second set of spring arms 1830*a* and 1830*b* flex when the second fastener 2006 slides past the third detent 1852. In some cases, the fourth holding force is greater than the third holding force and the second holding force. For example, the second holding force can be less than seven pounds force, the third holding force can be greater than seven pounds force but less than fifteen pounds force, and the fourth holding force can be greater than fifteen pounds force. When the user opens the door 104 past the third detent 1852, the second fastener 2006 passes through the opening 1856 to disconnect the bracket 1800 from the door 104.

Referring to FIGS. 20A-20E, the second detent 1844 (the first portion 1840*a* and the second portion 1840*b*) apply the second holding force to the second fastener 2006 when the user opens the display case door 104 to engage the second fastener 2006 to the first detent 1838. The first holding force is applied to the second fastener 2006 by the first detent 1838 resists further movement of the display case door 1004 beyond a first open angle 2008. The first open angle 2008 is the angle of the door 104 relative to the frame 102 as the display case door 104 rotates about the fastener 1900. In some cases, the first open angle 2008 is less than 82 degrees.

The third holding force applied to the second fastener 2006 by the second detent 1844 resists further movement of the display case door 104 beyond a second open angle 2010. The second open angle 2010 is the angle of the door 104 relative to the frame 102 as the display case door 104 rotates about the fastener 1900. In some cases, the second open angle 2010 is equal to or greater than 82 degrees and less than 90 degrees.

The second set of spring arms 1830*a* and 1830*b* flex when the second fastener 2006 slides past the third detent 1852. As the user continues to open the display case door 104 to a third open angle 2012, the second fastener 2006 forces the second pair of spring arms 1830*a* and 1830*b* at the second end 1822 of the bracket 1800 to flex away from each other. The second fastener 2006 begins to move out of the second slot 1832 past the third detent 1852 and out the opening 1856 to disconnect from the bracket 1800 from the frame 102 at a third open angle 2012.

In some implementations, the first holding force is greater than the second holding force. In some implementations, the first open angle 2008 is less than 82 degrees and the second open angle 2010 is greater than 82 degrees but less than 89 degrees. In some implementations, first open angle 2008 is less than 82 degrees, the second open angle 2010 is 80 degrees or greater and less than 90 degrees, and the third open angle 2012 is 90 degrees or greater.

As shown in FIGS. 18A-18B, a width 1860 between the second pair of spring arms 1830*a* and 1830*b* is approximately 0.320 inches, the width 1842 (a first gap) between the first and second portions 1840*a* and 1840*b* of the second detent 1844 is approximately 0.174 inches, the width 1848 (a second gap) between the second pair of detents is approximately 0.100 inches, and a width 1862 of the opening 1856 between the third pair of detents is approximately 0.140 inches.

A longitudinal axis 1864 of the opening 1856 is offset from the longitudinal axis 1826 of the second slot 1832. As shown in FIG. 18A, the longitudinal axis 1864 of the opening 1856 is perpendicular to the longitudinal axis 1826 of the second slot 1832.

Figure 21:
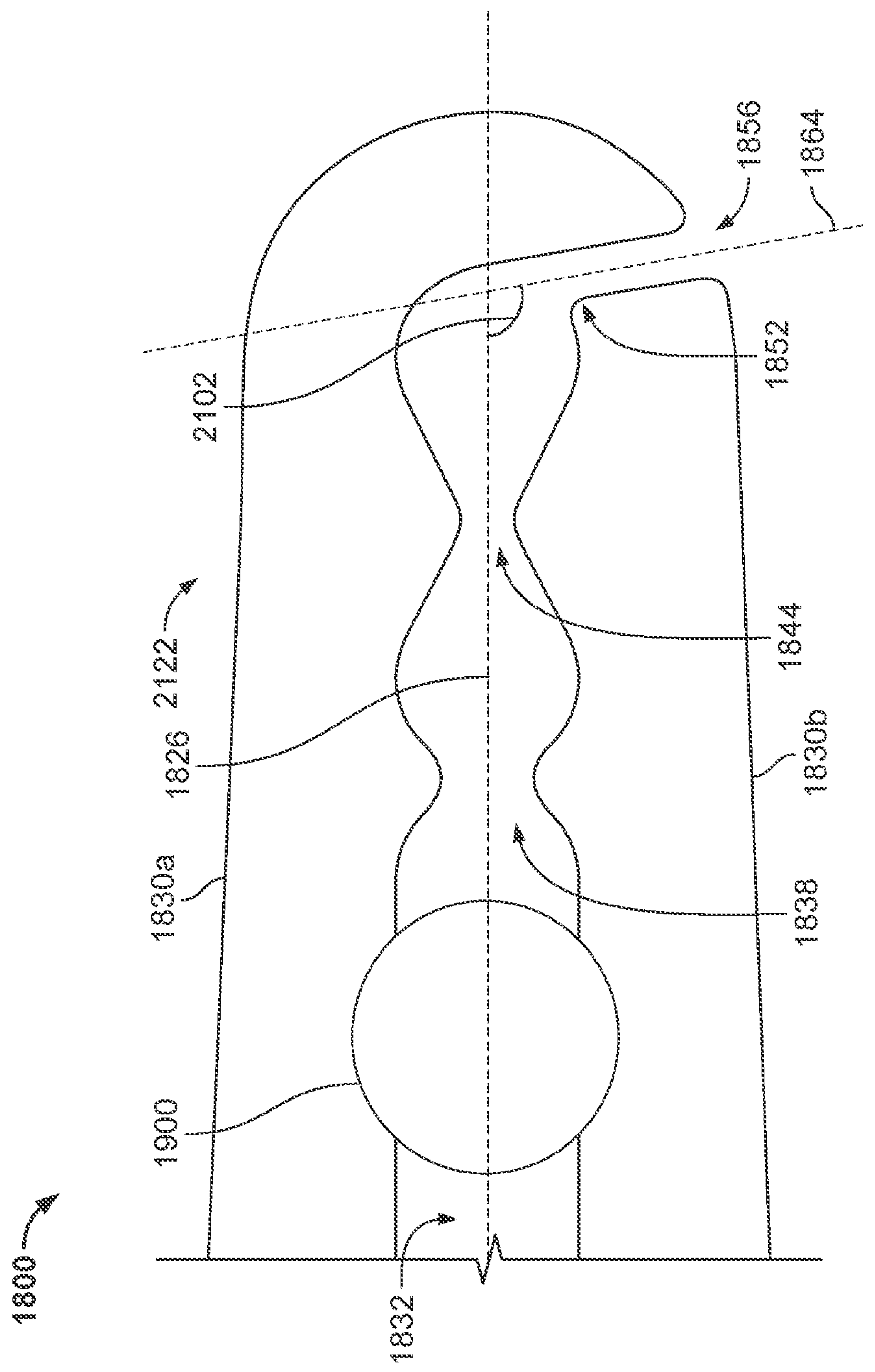
FIG. 21 is a top view of another example second end of the example display case door bracket of FIG. 18A.

FIG. 21 is a top view of another example second end 2122 of the example display case door bracket 1800 of FIG. 18A. Referring to FIG. 21, the bracket 1800 is placed about the fastener 1900, described in detail later. The second end 2122 is generally similar to the second end 1822 previously described. The second end 2122 includes the first spring arm 1830*a* and the second spring arm 1830*b* which define the slot 1832. The second end 2122 has the first detent first detent 1838, the second detent 1844, and the third detent 1852. The third detent 1852 defines the opening 1856 through which the fastener 1900 passes to disconnect from the second end 2122 of bracket 1800. The longitudinal axis 1864 of the opening 1856 can be at an angle 2102 with the longitudinal axis 1826 of the slot 1832. The angle 2102 can be between zero and three hundred and sixty degrees.

Figure 19A:
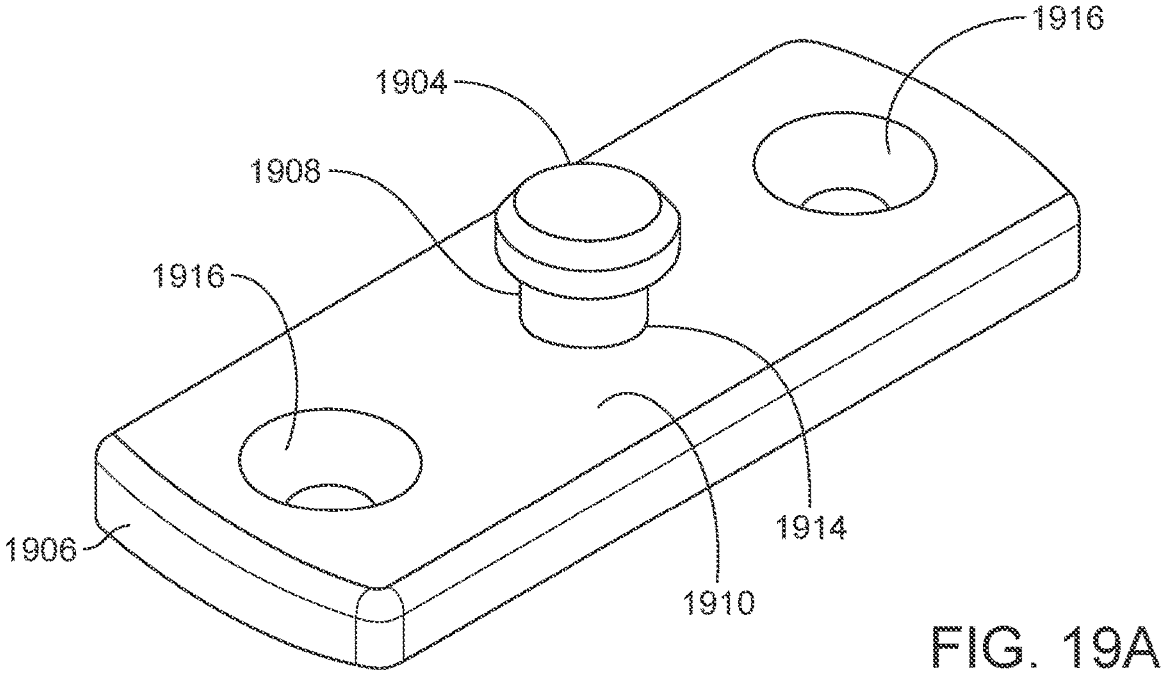
FIG. 19A is a perspective view of an example fastener of the display case.
Figure 19B:
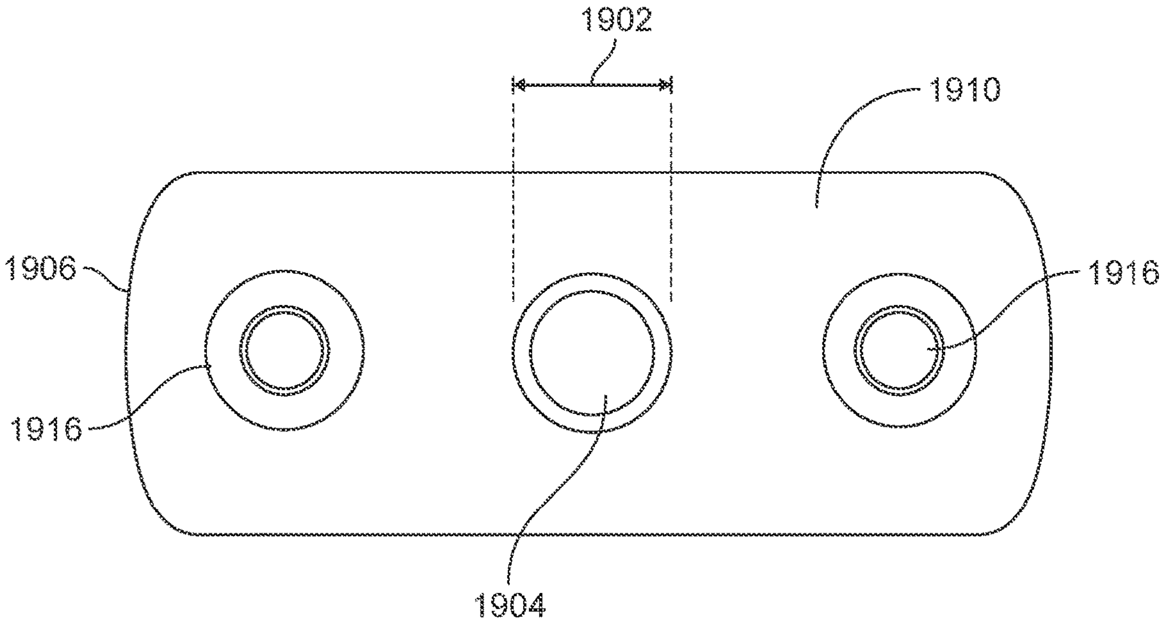
FIG. 19B is a top view of the fastener of the display case of FIG. 19A.
Figure 19C:
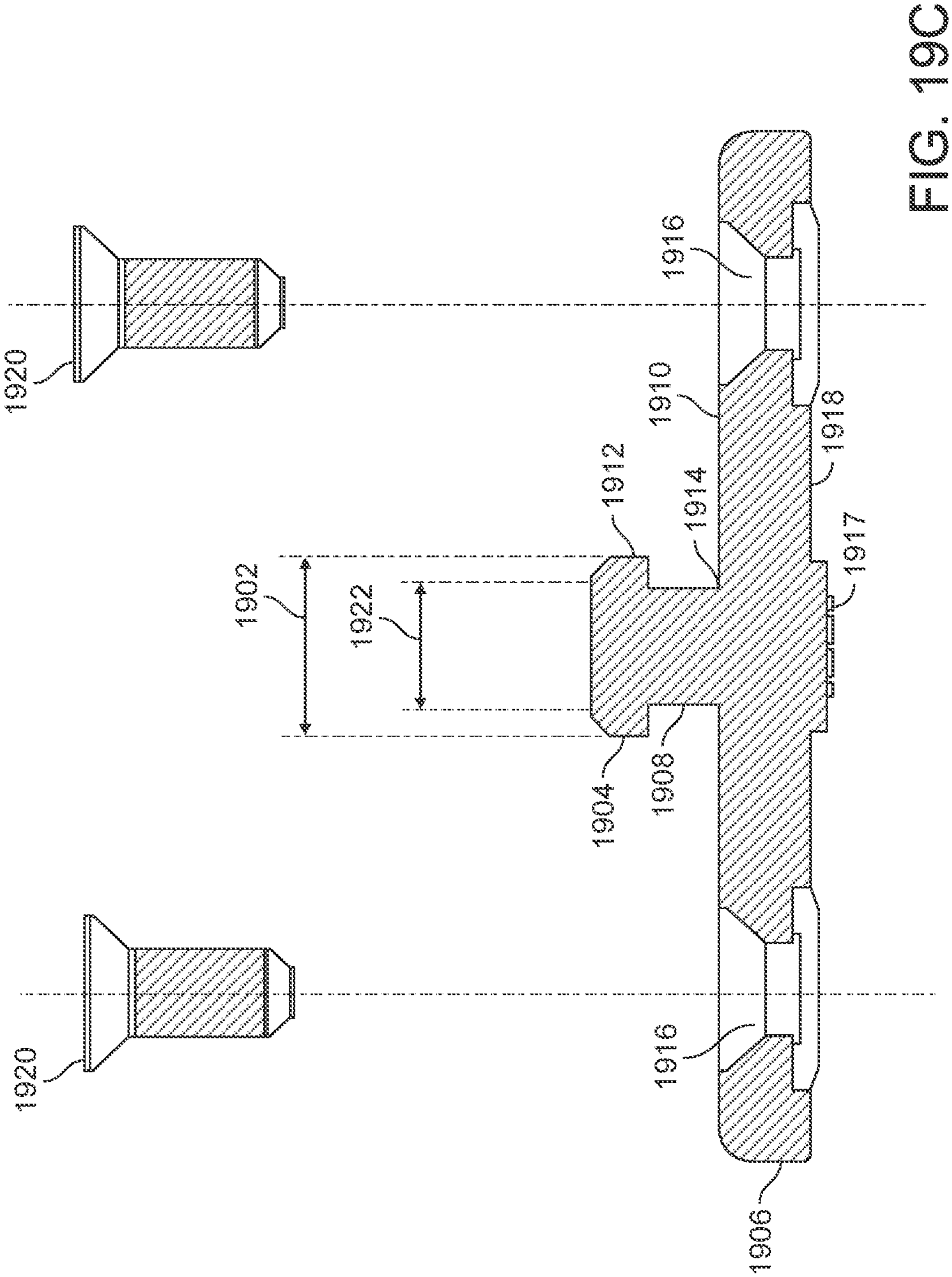
FIG. 19C is a side cross-section view of the fastener of the display case of FIG. 19A.

FIGS. 19A-19C are views of an example fastener 1900 of the display case. Referring to FIGS. 19A-19C, the fastener 1900 has a backing plate 1906, a shaft 1908, and the knob 1904. The backing plate 1906 couples to the frame 102. The shaft 1908 extends from a surface 1910 of the backing plate 1906. Shaft 1908 can be a smooth shaft. The knob 1904 is coupled to a first end 1912 of the shaft. A second end 1914 of the shaft 1908 is coupled to the surface 1910 of the backing plate 1906. The first end 1912 is opposite the second end 1914 of the shaft 1908.

The backing plate 1906 has a multiple voids 1916 extending from the surface 1910 through the backing plate 1906 to a second surface 1918. The fastener 1900 can include multiple screws 1920. The voids 1916 accept the screws 1920. The screws 1920 pass through the voids 1916 to couple the fastener 1900 to the frame 102.

The outer diameter 1902 of the knob 1904 is less than the width 1812 (an inner dimension) of the first portion 1810 of the first slot 1806. An outer diameter 1922 of the shaft 1908 is less than an inner dimension 1866 (that is the diameter) of the aperture 1814 (the second portion) of the first slot 1806. The knob 1904 of the fastener 1900 passes through the first portion 1810 of the first slot 1806 at the first location 1820 to couple the fastener 1900 to the bracket 1800. The shaft 1908 slides in the first portion 1810 from the first location 1820 to the second location 1824 where the shaft 1908 enters the aperture 1814. The aperture 1814 defines a seat to hold the shaft 1914 fastener 1900 so that the bracket 1800 is pivotally coupled on the shaft 1908.

Referring to FIGS. 18A-20E, the bracket 1800 is installed in a display case 100 having the frame 102 and the door 104. In one implementation, a method includes positioning the bracket 1800 such that the knob 1904 of the fastener 1900 of the frame 102 passes through the first portion 1810 of the first slot 1806 in the bracket 1800. Before positioning the bracket 1800 such that the knob 1904 passes through the first portion 1810 of the first slot 1806, the method can include coupling the fastener 1900 with a frame member 2016 of the frame 102 of the display case 100.

The method includes moving the bracket 1800 relative to the fastener 1900 such that the shaft 1908 of the fastener 1900 moves along the first slot 1806. Moving the bracket 1800 relative to the fastener 1900 can include applying a sufficient force to the bracket 1800 to overcome at least the first detent 1834 between the first portion 1810 and the second portion 1814 (the aperture 1814) of the first slot 1806.

The method includes engaging the shaft 1908 of the fastener 1900 in a seat 1814 (in this example, defined by the aperture in the second portion) of the first slot 1806, such that when the shaft 1908 of the fastener 1900 is engaged in the seat 1814, the bracket 1800 is pivotally coupled on the shaft 1908 of the fastener 1900 and the knob 1904 inhibits the bracket 1800 from separating from the fastener 1900.

The method can include coupling the first end 1818 previously described which includes the first pair of spring arms 1802*a* and 1802*b* to the door 104. The second end 1822 of the bracket 1800 is coupled to the door 104 of the display case 100 before positioning the bracket 1800 such that the knob 1904 of the fastener 1900 of the frame 102 passes through the first portion 1810 of the first slot 1806.

In some implementations, a hold open bracket includes an offset between the frame-mounted portion of the bracket and the door-mounted portion of the bracket. An offset bracket can accommodate a gap (e.g., vertical misalignment) between the frame of a display case and a rail of a door to which the hold open is coupled.

Figure 22:
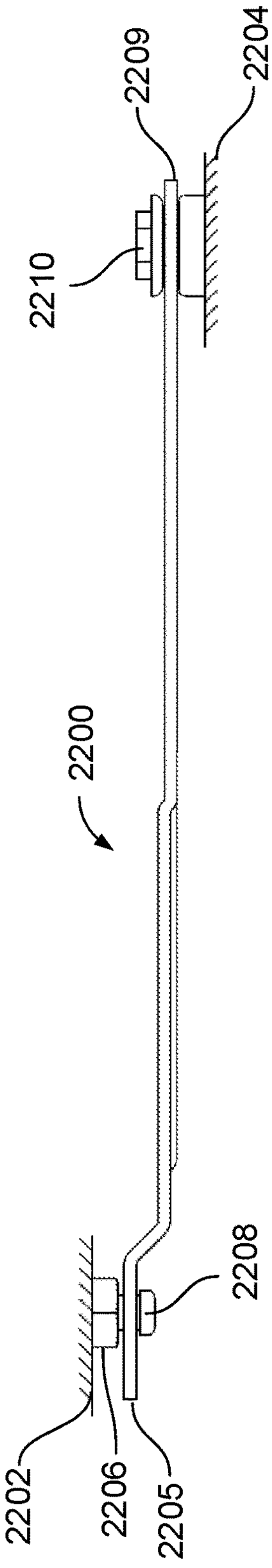
FIG. 22 is a schematic front view of a hold open bracket including an offset according to one implementation.

FIG. 22 is a front view of a hold open bracket according to one implementation. In this example, the hold open bracket is in the form of a Z-bracket. Bracket 2200 is coupled between frame 2202 and door 2204. On the frame end, bracket 2200 is installed between pivot standoff 2206 and fastener 2208. On the door end, bracket 2200 is slidably coupled on door 2204 by way of fastener 2210.

Figure 23A:
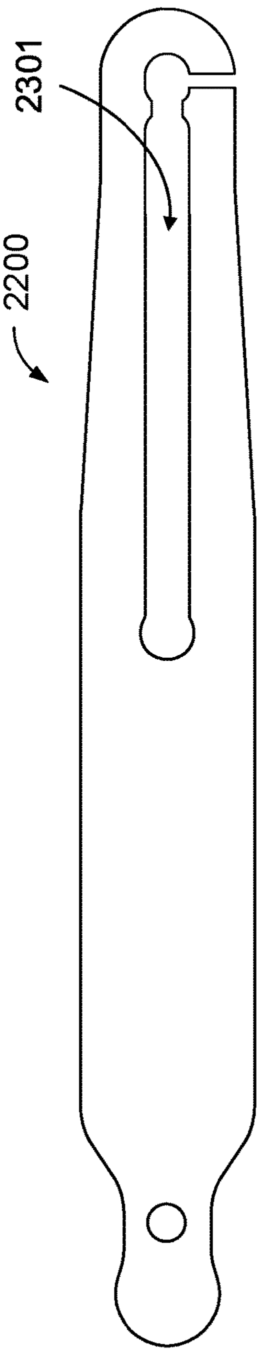
FIG. 23A is a top view illustrating the bracket shown in FIG. 22.
Figure 23B:
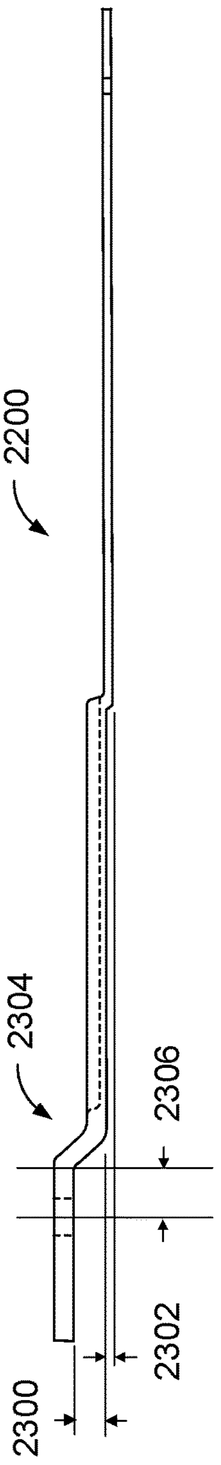
FIG. 23B is a side view illustrating the bracket shown in FIG. 22.

FIG. 23A is a top view illustrating bracket 2200 shown in FIG. 22. Bracket 2200 includes slot 2301. FIG. 23B is a side view illustrating bracket 2200. In this example, bracket 2200 includes two offsets, first offset 2300 and second offset 2302. First offset 2302 is near the frame end of bracket 2200. First offset 2302 is provided in the form of a bend 2304 in bracket 2200. In one implementation, first offset 2300 is in a range of 0.250 to 0.260 inches. Flat 2306 can be at least about 0.375 inches or more. Second offset 2304 can be about midway between the ends of bracket 2200. In one example, second offset 2302 is about 0.05 inches.

In one example, bracket 2200 is produced (e.g., stamped) from sheet metal. Bracket 2200 can also be produced by machining, casting, molding, 3-D printing, or other manner.

An offset bracket can reduce loads on the door rail, frame, or mounting hardware. The offset can better align a hold open to reduce forces applied to standoffs. In some cases, an offset bracket can avoid stresses on a standoff reaching the standoff's material yield limit. In the example shown in FIG. 22, the offset in bracket 2200 can reduce loads (e.g., bending loads) on pivot standoff 2206.

In some implementations, an offset creates a dampening effect that reduces the shock applied to the standoffs. For example, the door may be swung open and comes to a full stop when the detent bolt reaches the end of the hold open slot. As the standoffs pull away from each other, the developed inertia may cause the hold open offset to try to straighten. The material, heat treat, and temper provide can be selected to provide spring properties to stay under the elastic limit so the hold open returns to the original shape.

In some implementations, an offset bracket is selected based on gap between a door and a frame. In one example, an offset bracket is selected at a production facility. In other another example, the offset bracket is selected and installed while the display case door is in service. In certain implementations, brackets with different offsets are provided. A bracket can be selected based on the combination of door and frame for a particular installation or door/frame configuration.

In the example shown in FIGS. 22, 23A, and 23B, bracket 2200 includes two offsets. In other implementations, a bracket includes only one offset, or more than two offsets.

In some implementations, a hold open system for a door includes a hold open bracket connected to a frame by away of a pivot standoff, and connected to a door by way of a detent bolt. The pivot hardware can mounted on the frame by way of a backing plate. The detent hardware can be coupled to the door by way of a backing plate.

Figure 24:
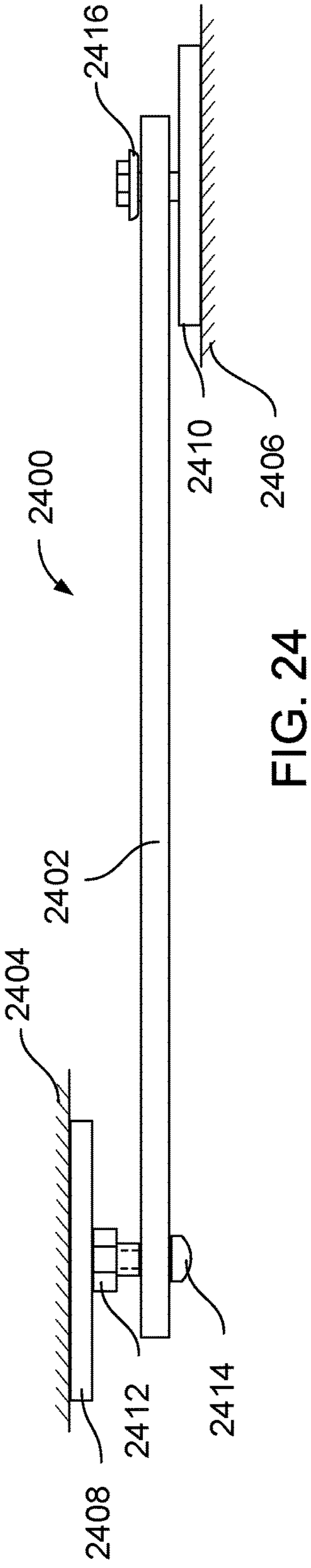
FIG. 24 is a schematic front view of a hold open system according to one implementation.

FIG. 24 is a schematic front view of a hold open system 2400 according to one implementation. Hold open system 2400 includes bracket 2402. Bracket 2402 is coupled between frame 2404 and door 2406. Frame-side backing plate 2408 is coupled to frame 2404. Door-side backing plate 2410 is coupled to door 2406. The backing plates can be secured using screws or other fasteners.

Pivot standoff 2412 is threaded into frame-side backing plate 2408. Fastener 2414 is installed in in pivot standoff 2412. Bracket 2402 pivots at the frame end on fastener 2414.

Detent bolt 2416 is threaded into door-side backing plate 2410. Bracket 2402 slidably engages detent bolt 2416.

Figure 25:
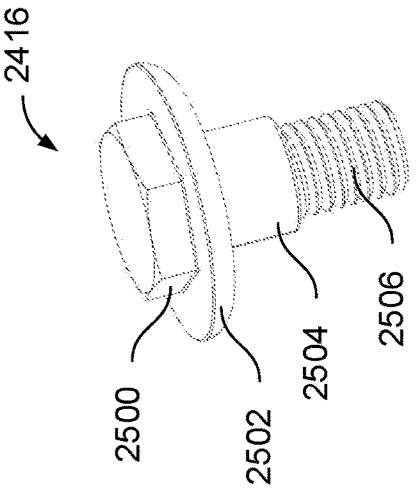
FIG. 25 is a perspective view of a detent bolt.

FIG. 25 is a perspective view of a detent bolt. Detent bolt 2416 includes head 2500, rim 2502, and shank 2504. The diameter of rim 2502 is larger than shank 2504. Shank 2504 includes threads 2506. Detent bolt 2416 can be heat treated to a core hardness of HRC 28-38 and case hardness of HRC 45 or more. In some instances, a nylon patch such as ND-3141 or epoxy ND 593S is applied around the threads.

Figure 26A:
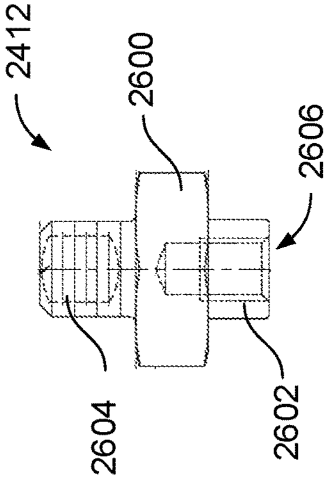
FIG. 26A is a top view of a pivot standoff.
Figure 26B:
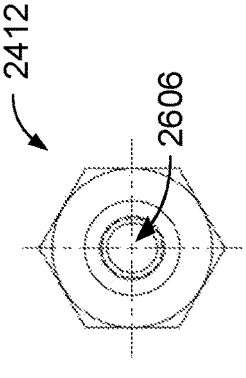
FIG. 26B is a side view of a pivot standoff.

FIG. 26A is a top view of a pivot standoff. FIG. 26B is a side view of a pivot standoff. Pivot standoff 2412 includes hex flats 2600, post 2602, and threaded portion 2604. Bore 2606 can include threads to receive fastener (shown in FIG. 24). In one example, fastener 2414 includes 8-32 UNC threads. Pivot standoff 2412 can be heat treated to a core hardness of HRC 28-38 and case hardness of HRC 45 or more. In some instances, a nylon patch such as ND-3141 or epoxy ND 593S is applied around the threads.

In one example, detent bolt and pivot standoff are a low carbon steel. In some implementations, a corrosion resistive coating is included. In one example, a Xylan coating (produced by PPG Industries) is applied to a portion of detent bolt 2416 and pivot standoff 2412.

Figure 27:
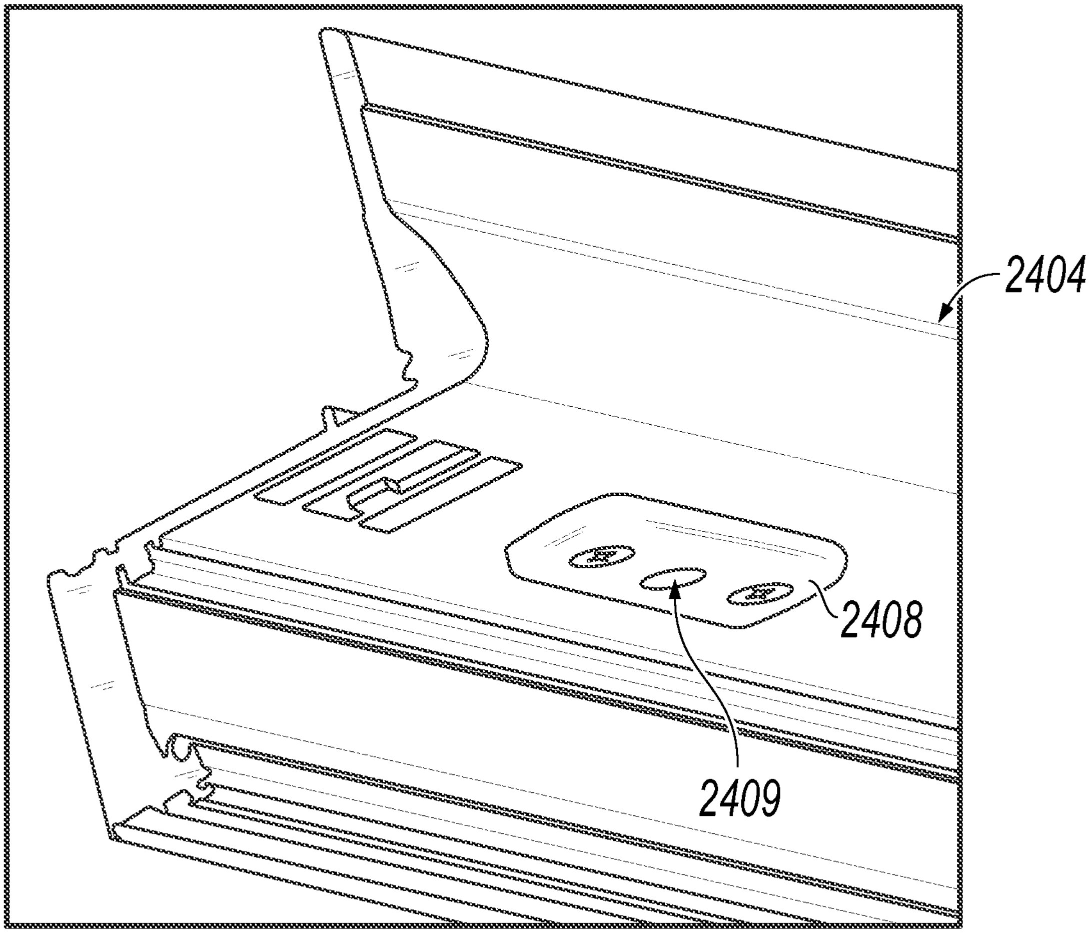
FIG. 27 is a perspective view of a surface-mounted backing plate installed on a frame.

FIG. 27 is a perspective view of a backing plate installed on a frame. In this example, frame-side backing plate 2408 is surface mounted on frame 2404. Frame-side backing plate 2408 includes threaded hole 2409. Threaded hole 2409 can receive pivot standoff 2412 (shown in FIGS. 26A and 26B).

Figure 28:
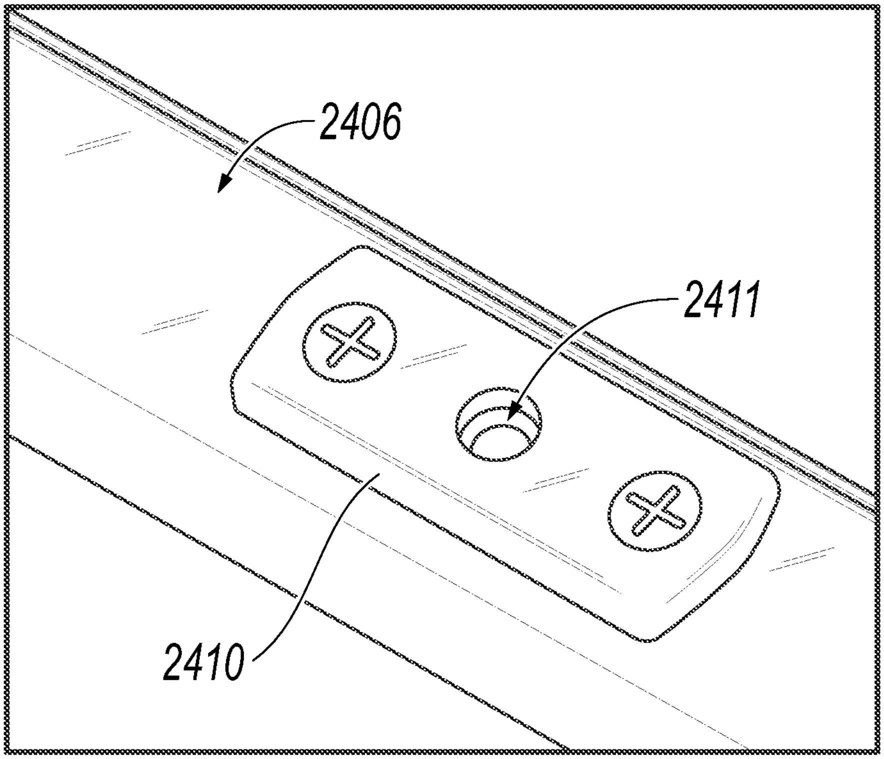
FIG. 28 is a perspective view of a surface-mounted backing plate installed on a door.

FIG. 28 is a perspective view of a backing plate installed on a door. In this example, door-side backing plate 2410 is surface mounted on door 2406. Threaded hole 2411 can receive detent bolt 2416 (shown in FIG. 25).

Figure 29:
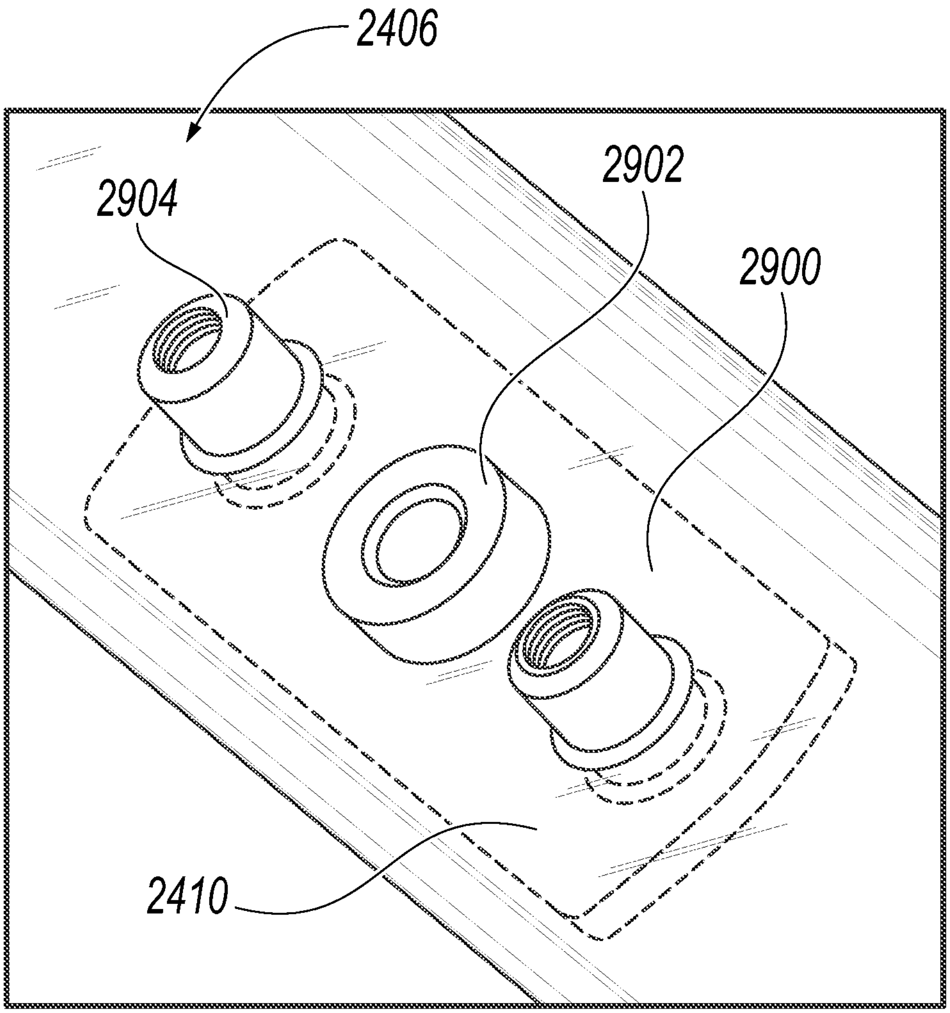
FIG. 29 is a perspective view of a surface-mounted backing plate, as seen from the back side of the plate.

FIG. 29 is a perspective view of a surface-mounted backing plate from the back side of the plate. Door-side backing plate 2410 includes body 2900 and boss 2902. Boss 2902 includes internal threads for receiving a portion of detent bolt 2416 (shown in FIG. 25). Fasteners can be installed in threaded inserts 2904 to secure door-side backing plate 2410. Threaded inserts 2904 can be pre-installed on door 2406.

For illustrative purposes, FIG. 29 shows a backing plate installed on a rail of door. A backing plate installed on the frame can include similar features to that shown in FIG. 29.

In certain implementations, the bracket in installed in the hold open system described in FIGS. 24 through 29 is a z-bracket, such as the one shown in FIGS. 22, 23A, and 23B.

Figure 30:
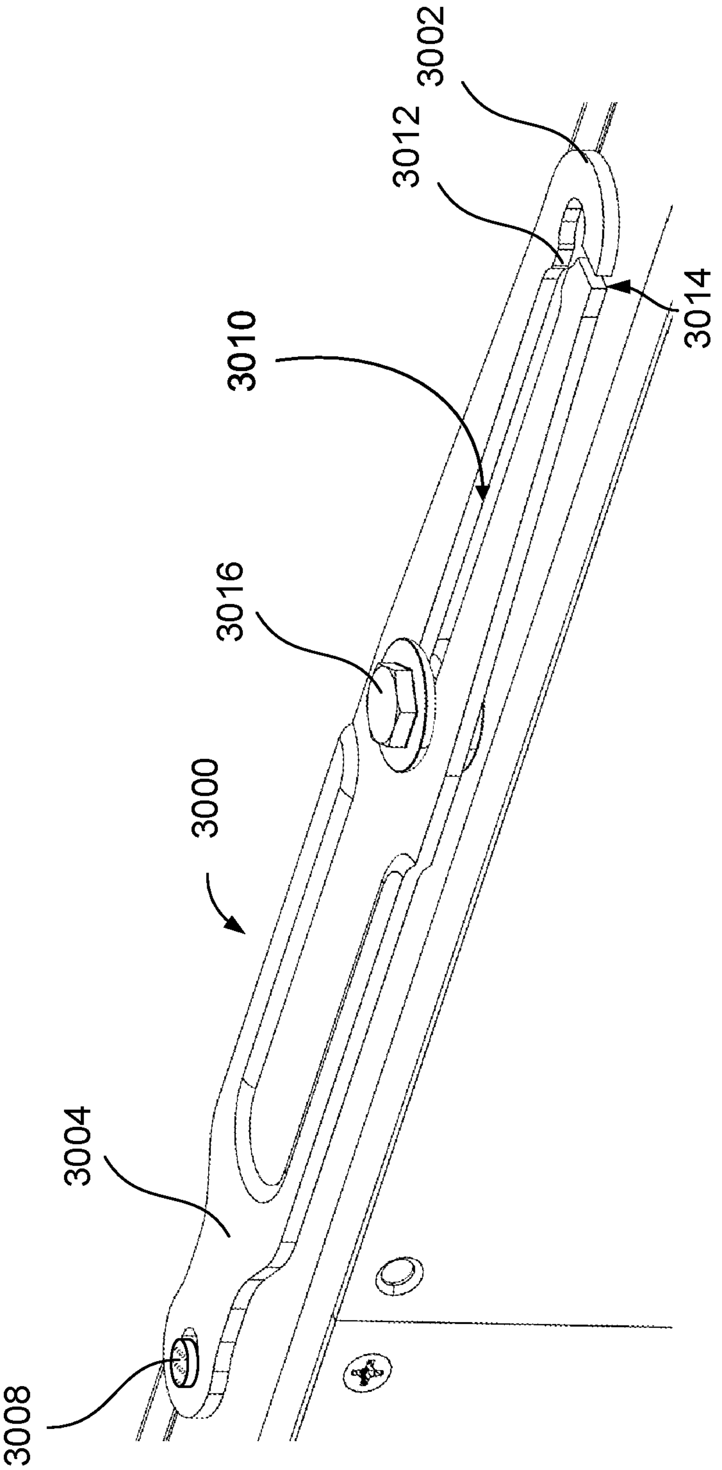
FIG. 30 is a perspective view of a bracket installed on a door.

In various implementations described above, a bracket includes a breakaway feature at one end of the bracket. A bracket can, nevertheless, in some implementations not have a breakaway feature at either end of the bracket. FIG. 30 is a perspective view of a bracket 3000 installed on a door (the frame is omitted for clarity). Bracket 3000 includes door end 3002 and frame end 3004. Frame end 3004 includes an aperture that accommodates a pivot fastener 3008. Door end 3002 includes main slot 3010, detent 3012, and transverse slot 3014. Detent bolt 3016 is slidably coupled to bracket 3000 in main slot 3010. Bracket 3000 pivots at frame end 3004 on pivot fastener 3008.

In the example shown in FIG. 30, there is one detent before reaching the end of main slot 3010. Door end 3002 can, however, include two or more detents. Each detent can provide a tactile indication to the user that the limit of the hold open is approaching.

While a number of examples have been described for illustration purposes, the foregoing description is not intended to limit the scope of the invention, which is defined by the scope of the appended claims. There are and will be other examples and modifications within the scope of the following claims. Furthermore, one of skill in the art would appreciate that features described in reference to a specific embodiment are not limited to that embodiment and can be interchanged with features of other embodiments.

What is claimed is:

1. A display case comprising:

a frame coupled to the display case, the frame comprising a first fastener;

a door mounted to the frame, the door comprising a second fastener coupled to a surface of the door; and a bracket pivotably coupled to the frame at a first end of the bracket by the first fastener and the door at a second end of the bracket by the second fastener, the bracket comprising:

a first pair of spring arms at the first end of the bracket, each spring arm of the first pair of spring arms comprising:

a first aperture configured to be placed about the first fastener;

a plurality of concave regions, where the plurality of concave regions together form a second aperture sized to accept the first fastener, the second aperture coupled to the first aperture, the second aperture configured to receive and accept a portion of the first fastener from the first aperture; and a first opening coupled to the plurality of concave regions, the first opening through which the first fastener is permitted to pass, upon application of a first holding force sufficient to overcome the first pair of spring arms, and, thereby, disconnect the bracket from the frame; and a second pair of spring arms at the second end of the bracket, the second pair of spring arms comprising:

a slot therebetween in which the second fastener of the door slides as the door is pivoted between open and closed positions; and a first detent on at least one of the spring arms of the second pair of spring arms.

2. The display case of claim 1, wherein the first detent is configured to apply a second holding force to the first fastener, the second holding force resisting further movement of the door beyond a first open angle.

3. The display case of claim 2, wherein the first detent extends into the slot between the second pair of spring arms, thereby, reducing a width of the slot to a distance that is narrower than a diameter of the second fastener.

4. The display case of claim 2, wherein an inner diameter of the first aperture of the first pair of spring arms is greater than an outer diameter of the second fastener.

5. The display case of claim 4, wherein a first portion of the first aperture is ovoid shaped.

6. The display case of claim 5, wherein a terminating end of at least one of the first pair of spring arms comprises a second pair of detents each extending into the first opening between the first pair of spring arms, the second pair of detents defining the first opening through which the first fastener passes to disconnect from the bracket.

7. The display case of claim 6, wherein the second pair of detents is configured to apply a third holding force to the first fastener, the third holding force resisting further movement of the door.

8. The display case of claim 5, wherein a longitudinal axis of the first opening is parallel with a longitudinal axis of the first aperture.

9. The display case of claim 5, wherein a longitudinal axis of the first opening is substantially aligned with a longitudinal axis of the first aperture.

10. The display case of claim 5, wherein a longitudinal axis of the first opening is offset from a longitudinal axis of the first aperture.

11. The display case of claim 5, where a second portion of the first aperture is configured to hold the first fastener in the first aperture when a force on the door is less than a third holding force.

12. The display case of claim 7, wherein the first fastener comprises:

a backing plate configured to couple to the frame;

a shaft extending from a surface of the backing plate; and a knob coupled to an end of the shaft opposite the backing plate.

13. The display case of claim 12, wherein the first fastener further comprises a plurality of screws, the backing plate further comprises a plurality of voids configured to allow the screws to pass through the backing plate and couple the backing plate to the frame.

14. The display case of claim 12, wherein an outer diameter of the knob is less than an inner dimension of a first portion of the first aperture.

15. The display case of claim 12, wherein an outer diameter of the shaft is less than an inner dimension of a second portion of the first aperture.

16. The display case of claim 1, wherein a terminating end of at least one of the first pair of spring arms comprises an outer surface, the outer surface defined, in part, by:

a first outer portion defined by a first outer radius; and a second outer portion adjoined to the first outer portion, the second outer portion defined by a second outer radius less than the first outer radius, the second outer portion closer to the terminating end than the first outer portion.

17. The display case of claim 1, wherein the first fastener comprises:

a shaft extending from a horizontal member of the frame; and a knob coupled to an end of the shaft opposite the horizontal member.

18. The display case of claim 17, wherein:

the first pair of spring arms comprises a first portion and a second portion, the first portion of the first pair of spring arms is configured to allow the knob of the first fastener to pass through, and the second portion of the first pair of spring arms comprises a seat configured to hold the shaft of the first fastener so that the bracket is pivotally coupled on the shaft.

19. The display case of claim 18, further comprising a third pair of detents between the first portion and the second portion of the slot of the first pair of spring arms, wherein the third pair of detents are configured to resist the shaft from engaging in the seat unless a sufficient force to overcome the third pair of detents is applied to the bracket.

20. The display case of claim 18, further comprising a fourth pair of detents between the first portion and the second portion of the first pair of spring arms, wherein the fourth pair of detents are configured to hold the shaft in engagement in the seat.

21. The display case of claim 18, wherein the seat comprises two or more concave portions configured to engage an outer surface of the shaft.

22. The display case of claim 17, wherein the first fastener comprises a threaded fastener coupled to the horizontal member of the frame, wherein the knob comprises a head of the threaded fastener.

* * * * *